United States Patent
Altschuler et al.

(12) 
(10) Patent No.: US 6,556,983 B1
(45) Date of Patent: Apr. 29, 2003

(54) METHODS AND APPARATUS FOR FINDING SEMANTIC INFORMATION, SUCH AS USAGE LOGS, SIMILAR TO A QUERY USING A PATTERN LATTICE DATA SPACE

(75) Inventors: Steven Altschuler, Redmond, WA (US); David V. Ingerman, Princeton, NJ (US); Lani Wu, Redmond, WA (US); Lei Zhao, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/481,615

(22) Filed: Jan. 12, 2000

(51) Int. Cl.[7] .......................... G06F 17/00; G06F 15/18
(52) U.S. Cl. ................. 706/55; 706/11; 706/20; 706/21
(58) Field of Search ....................... 706/55, 11, 20, 706/21

(56) References Cited

U.S. PATENT DOCUMENTS 6,408,428 B1 * 6/2002 Schlansker et al. ............ 716/17

* cited by examiner

*Primary Examiner*—George B. Davis
(74) *Attorney, Agent, or Firm*—Lee & Hayes, PLLC

(57) ABSTRACT

A pattern lattice data space as a framework for analyzing data, in which both schema-based and statistical analysis are accommodated, is defined. Ways to manage the size of the lattice structures in the pattern lattice data space are described. Utilities to classify or cluster, search (find similar data), or relate data using lattice fragments in the pattern lattice data space are also described. Superpattern cone or lattice generation function, which may be used by the classification and clustering functions, is also described. In addition, a subpattern cone or lattice generation process, which may be used by the search (find similar data) and data relating functions, is also described. Finally, a function to label, in readily understandable "pidgin", categories which classify information, is also described.

48 Claims, 58 Drawing Sheets

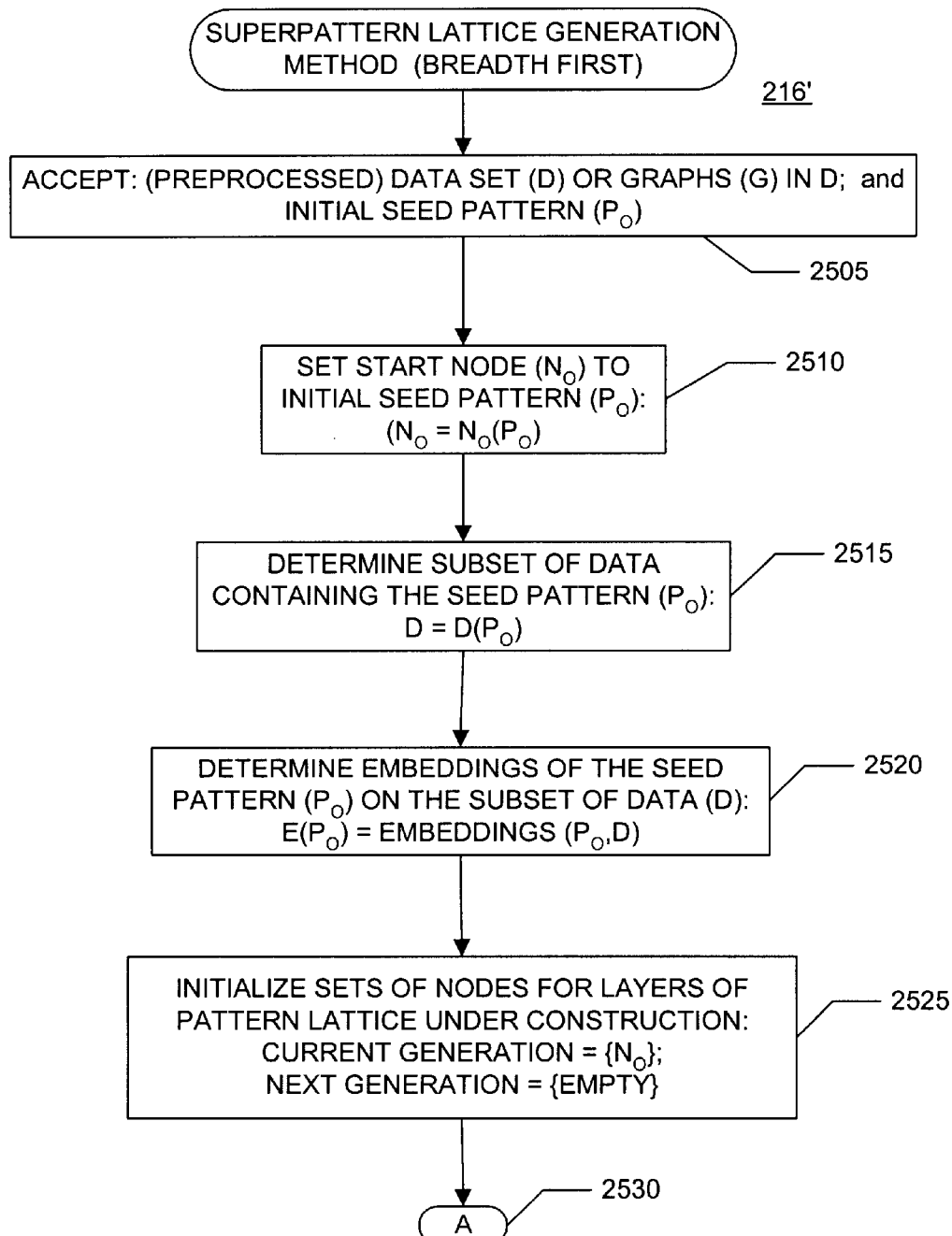

| ENTRY ID | GRAPH PART ID | ENTITY | SOURCE | DESTINATION | VALUE |
|---|---|---|---|---|---|
| 601 | 0 | PERSON | | | |
| 601 | 1 | NAME | | | STEVE ALTSCHULER |
| 601 | 2 | CONTACT_INFORMATION | | | |
| 601 | 3 | PHONE_NUMBER | | | 9369154 |
| 601 | 4 | ROOM | | | 24/1314 |
| 601 | 5 | PERSONAL_EMAIL_ADDRESS | | | STEVEALT |
| 601 | 6 | ORGANIZATION | | | MS |
| 601 | 7 | JOB_TITLE | | | GROUP MANAGER |
| 601 | 8 | HAS_A | 0 | 1 | |
| 601 | 9 | HAS_A | 0 | 2 | |
| 601 | 10 | HAS_A | 2 | 3 | |
| 601 | 11 | HAS_A | 2 | 4 | |
| 601 | 12 | HAS_A | 2 | 5 | |
| 601 | 13 | WORKS_IN | 0 | 6 | |
| 601 | 14 | ASSOCIATED_WITH | 13 | 7 | |
| 601 | 15 | PERSON | | | |
| 601 | 16 | REPORTS_TO | 0 | 15 | |
| 601 | 17 | NAME | | | EDWARD JUNG |
| 601 | 18 | HAS_A | 15 | 17 | |

FIGURE 47

*FOUR LOG ENTRIES*

*QUERY COMPLETION*

CLASSIFYING (AND (HORIZONTAL) PRUNING)

FIGURE 54
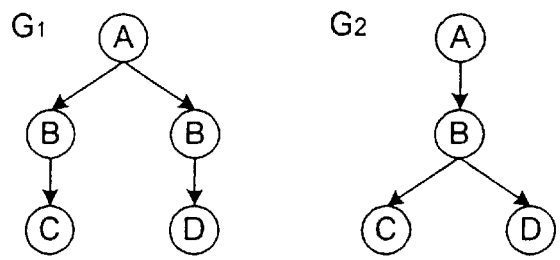
FIGURE 55
Complete Super Pattern Cone
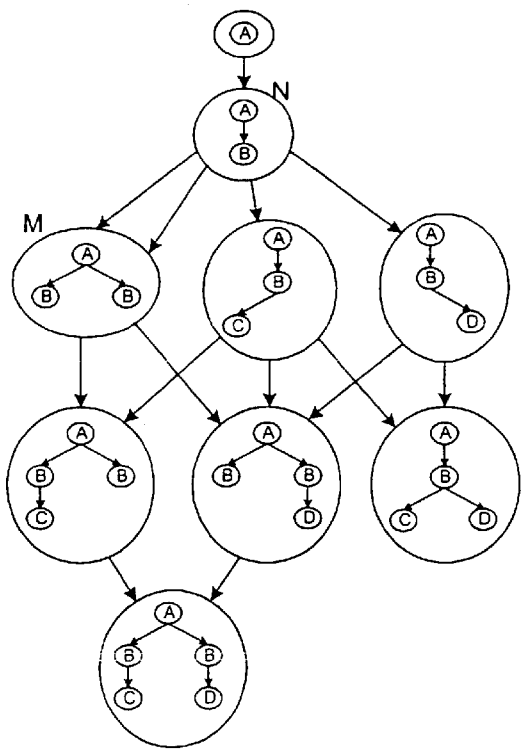
FIGURE 56
Minimally Expanded `SuperPatternCone`

Cleaned Minimal Super Pattern Cone

Super Pattern

Sub Pattern

METHODS AND APPARATUS FOR FINDING SEMANTIC INFORMATION, SUCH AS USAGE LOGS, SIMILAR TO A QUERY USING A PATTERN LATTICE DATA SPACE

§1. BACKGROUND OF THE INVENTION

§1.1 Field of the Invention

The present invention concerns techniques for enhancing the interaction between people and computers. In particular, the present invention concerns techniques for representing, filtering, classifying, and linking semantic data, as well as techniques for rendering semantic data in an intuitive way. Thus, the present invention basically concerns techniques for enhancing the way people find and access stored data.

§1.2 Related Art

§1.2.1 Migration from Data Creation and Processing, to Data and Information Access The way in which people use computing machines has evolved over the last 50 or so years. Initially, these machines were typically used as information processors, and in particular, for performing mathematical operations on numbers. People interacted with such early computing machines by punching and ordering cards to effect a sequence of commands, then by setting switches and viewing light emitting diodes to enter commands, later by entering lines of commands, and finally by using a keyboard and mouse to manipulate icon metaphors of the real world.

To reiterate, early personal computers were typically used to perform mathematical operations, from engineering applications to accounting applications (e.g., spreadsheets). In addition, such early personal computers were used to enter, store, and manipulate information, such as with word processing applications for example, and to effectively access stored information, such as with relational database applications for example. However, in addition to using computers for data entry, storage, and manipulation, people are using computers to access information to an ever increasing degree.

In recent decades, and in the past five (5) to ten (10) years in particular, computers have become interconnected by networks by an ever increasing extent; initially, via local area networks (or "LANs"), and more recently via LANs, private wide area networks (or "WANs") and the Internet. The proliferation of networks, in conjunction with the increased availability of inexpensive data storage means, has afforded computer users unprecedented access to a wealth of content. Such content may be presented to a user (or "rendered") in the form of text, images, audio, video, etc.

The Internet is one means of inter-networking local area networks and individual computers. The popularity of the Internet has exploded in recent years. Many feel that this explosive growth was fueled by the ability to link (e.g., via Hyper-text links) resources (e.g., World Wide Web pages) so that users could seamlessly transition from various resources, even when such resources were stored at geographically remote resource servers. More specifically, the Hyper-text markup language (or "HTML") permits documents to include hyper-text links. These hyper-text links, which are typically rendered in a text file as text in a different font or color, include network address information to related resources. More specifically, the hyper-text link has an associated uniform resource locator (or "URL") which is an Internet address at which the linked resource is located. When a user activates a hyper-text link, for example by clicking a mouse when a displayed cursor coincides with the text associated with the hyper-text link, the related resource is accessed, downloaded, and rendered to the user. The related resource may be accessed by the same resource server that provided the previously rendered resource, or may be accessed by a geographically remote resource server. Such transiting from resource to resource, by activating hyper-text links for example, is commonly referred to as "surfing".

Thus, although people continue to use computers to enter information, manipulate information, and store information, in view of the foregoing developments people are using computers to access information to an ever increasing extent. Although the information people want to access might have been created by them (which would typically reside on the person's desktop computer), it is often information that was not created by them, or even by a company or group to which that person belongs (which would typically reside on a storage server, accessible via a local area network). Rather, given the world wide breadth of the Internet, the information people want to access may likely be created by unrelated third parties (or content providers).

New user interfaces should therefore help people find information that they want, or that they might want. Unfortunately, the very vastness of available data can overwhelm a user; desired data can become difficult to find and search heuristics employed to locate desired data often return unwanted data (also referred to as "noise").

Various concepts have been employed to help users locate desired data. In the context of the Internet for example, some services have organized content based on a rigid hierarchy of categories. A user may then navigate through a series of hierarchical menus to find content that may be of interest to them. An example of such a service is the YAHOO™ World Wide Web site on the Internet. Unfortunately, content, in the form of Internet "web sites" for example, must be organized by the service and users must navigate through a predetermined hierarchy of menus. If a user mistakenly believes that a category will be of interest or include what they were looking for, but the category turns out to be irrelevant, the user must backtrack through one (1) or more hierarchical levels of categories. In the context of personal computers, people often store and retrieve data using a fixed hierarchy of directories or "folders". While a person who created their own hierarchy is less likely to mis-navigate through it, changes to the hierarchy to reflect refinements or new data or insights are not automatic—the person must manually edit the hierarchy of directories or folders. Further, if a particular file should be classified into more than one (1) of the directories or folders, the person must manually copy the file into each of the desired directories or folders. This copying must be done each time the file is changed.

Again in the context of the Internet for example, some services provide "search engines" which search databased content or "web sites" pursuant to a user query. In response to a user's query, a rank ordered list, which includes brief descriptions of the uncovered content, as well as a hypertext links (text, having associated Internet address information (also referred to as a "uniform resource locator" or "URL"), which, when activated, commands a computer to retrieve content from the associated Internet address) to the uncovered content is returned. The rank ordering of the list is typically based on a match between words appearing in the query and words appearing in the content. Unfortunately, however, present limitations of search heuristics often cause irrelevant content (or "noise") to be returned in response to a query. Again, unfortunately, the very wealth of available content impairs the efficacy of these search engines since it is difficult to separate irrelevant content from relevant content. In the context of files stored on a personal computer, computer programs such as Tracker Pro from Enfish, Inc. of Pasadena, Calif., Alta Vista Discovery from Compaq, Inc. of Houston, Tex., and Sherlock, from Apple, Inc. of Cupertino, Calif. permit people to organize, filter, and search files on their personal computer. Unfortunately, it is believed that these programs merely group (or organize) and cross-reference files based on a word or phrase (or "tracker") in the files. Thus, the name (or "tracker") "John Smith" might group word processing files (e.g., letters, memos, etc.) having the name "John Smith", e-mail files to, from, or having a message containing "John Smith", etc. These programs are believed to be too unsophisticated to derive a higher meaning (e.g., what was the purpose of the e-mail to John Smith) from the computer files. These programs can filter files based on simple criteria such as the file type or date, but are believed to be too unsophisticated to filter files based on some higher meaning (e.g., all e-mail that scheduled a meeting to discuss project X and attended by John Smith.). Similarly, these programs can sort files based on a simple property such as file name, file type, date file was created or modified, file location, file author, file size, etc., but are believed to be too unsophisticated to sort, or classify files based on some higher meaning.

In the foregoing, the term "information" referred to content, such as text files, audio files, image files, video files, etc. However, information can be more broadly thought of as actions taken by a user or users, or as tasks performed by a user or users. For example, content type information may be a text file of a movie review, while a task may be actions taken by a person to plan a date with dinner and movie. Thus, users may want to perform tasks that they have already performed in the past (such as scheduling a meeting, for example), or tasks that are similar to those that they have performed in the past (such as scheduling a meeting with different attendees at a different location, for example), much as they may want to revisit a favorite Internet site.

§1.2.2 Information Storage and Access Utilities

A number of utilities provide a foundation for storing, locating, and retrieving information. Such utilities may be provided for searching or for filtering information, classifying information, and relating (or linking) information. Such utilities are introduced below.

§1.2.2.1 Searching for (Filtering) Information

As discussed in §1.2.1 above, hierarchical directories and search engines are available to help people navigate to desired information. Forms may be employed to restrict the type or range of the information returned. For example, a prospective home buyer may want to search for homes with at least three (3) bedrooms, but under $200,000. Alternatively, natural language query engines may be employed to restrict the range of information returned. Further, information may be sorted to help people navigate to desired information. For example, the Outlook™ contact management program (from Microsoft Corporation of Redmond, Wash.) allows users to sort a list of sent e-mail messages by date sent, recipient, importance, etc.

In each of the foregoing examples, the searching (or filtering) techniques were for searching content type information (such as a text file of a movie review, for example), not task or action based information (such as planning a date with dinner and a movie).

Further, in each of the foregoing examples, information must either be arranged in a predetermined hierarchy or searched or sorted using some indices or fields. Unfortunately, arranging information in a hierarchy requires that the information be classified, either manually or automatically. Further, the efficiency with which information can be located using a hierarchy may depend a lot on predefined classes and sub-classes. Moreover, searching or sorting information using some indices or fields does not consider relationships among the fields—such relationships may be useful for focusing the search. Thus, improved searching utilities are needed.

§1.2.2.2 Classifying Information

Information is often classified so that it may be more easily found when needed later. For example, books may be classified based on the Dewey-decimal system, files may be classified by an account number, etc. As discussed in §1.2.1 above, web pages may be arranged-in a classification hierarchy, and computer files may be arranged in directories or folders. Such simple classification schemes work well when the type of information so classified is constrained (such as only books, only invoices, only business telephone directories), but may become useless when trying to classify across different information types. Further, such simple classification schemes may become cumbersome when extensive cross-classification-referencing is required.

As mentioned in §1.2.1 above, the efficiency with which information can be located using a hierarchy may depend a lot on predefined classes and sub-classes. The classes and sub-classes may be defined manually, or automatically, such as by using clustering algorithms for example. Manually defining classes takes time and expertise to be done well. Automatically defining classes is often done based on features of the information, but typically will not consider relationships between such features. Thus, improved classification utilities are needed.

§1.2.2.3 Relating (Linking) Information

In addition to navigating to desired information, people may be interested in the relationship(s) between different pieces of information. For example, two (2) restaurants may be related by the type of food they serve, a review rating, a price range, their location, etc., or two (2) meetings may be related if they occurred in the same room, occurred at the same time, had at least some common attendees, were scheduled by the same person, etc. Information may be referenced by a list of features, also referred to as a "feature vector". For example, a textual file may be represented by a list of the number of times certain words appear in the file. If information is represented by a feature vector, relationships between various information may be inferred by finding common features in the feature vectors of the various information. Unfortunately, defining exactly what a common feature is, is somewhat subjective—that is, determining whether features must exactly match or just fall under a more general common category is subjective. Furthermore, relationships between different features are not considered when determining relationships between the information represented by the features. Thus, improved utilities for uncovering the relationships between information are needed.

§1.2.3 Representing Usage Data

Information, such as usage data for example, may be represented in many different ways. As mentioned above, information may be represented by values associated with a list of features (or a "feature vector"). Usage data may be represented by a "click stream"; that is, as a stream of discrete user inputs. Alternatively, information may be represented as related entities. An example of such a semantic representation is an entity relationship diagram (or "ERDs"). Entity relationship diagrams were introduced in the paper, Peter Pin-Shan Chen, "The Entity Relationship Model-Toward a Unified View of Data," *International Conference on Very Large Databases*, Framingham, Mass. (Sep. 22–24, 1975), reprinted in *Readings in Database Systems, Second Edition*, pp. 741–754, edited by Michael Stonebraker, Morgan Kaufmann Publishers, Inc., San Francisco, Calif. (1994).

§1.2.3.1 Limitations Imposed When Analyzing Only Usage Statistics

Without any semantic information, relationships among users' activities cannot be determined with certainty from usage logs. Log files consisting of click stream information may be used to answer simple questions such as "who accessed a file?", "when did they access the file?", "from where did they access the file?", and "how many users accessed the file yesterday?". However, questions relating to "why" the file was accessed are more difficult. For example, knowing that users transition from URL=52 to URL=644 more frequently than to URL=710 gives an association related to frequency. (URLs, or Uniform Resource Locators, serve as unique indexes to content on the Internet.) However, this analysis gives no indication as to "why" users made these particular page transitions. A more "human" understanding can be gained through interpreting semantic relationships. For example, semantic relationships may reveal that URL=52 is a sports news web page, URL=644 is a web page post team results, and URL=710 is a link to local weather.

§1.2.3.2 Limitations Imposed when Analyzing Only Schema

"Schema analysis" loosely refers to analyzing authored metadata, schema, and instance data. Schema analysis may be used to model semantic associations and instance frequencies but contains no application usage information.

The problem with a strict schema analysis approach is highlighted by the following example. The entities "Redmond Cineplex-8" and "The Amigone Funeral Parlor of Redmond" are both businesses in Redmond and might be connected on a graph representing a city directory schema by, for example, four (4) links (relationships). On the other hand, the link separation between a particular person and his most recent e-mail instance in an e-mail application schema could be, for example, twenty (20). As shown by these examples, schema distances (as defined by the number of relationships separating two (2) entities) may be uncorrelated with typical usage.

Therefore, neither of these two (2) approaches (that is, statistics and schema), taken alone, can lead to a deep understanding of users' tasks and goals and/or of data generated by users. Thus, a new framework for representing and analyzing information, such as computer usage information for example, is needed.

§1.2.4 Unmet Needs

A goal of the present invention is to make information more relevant to users and to make it easier for applications to build reusable and broadly deployable services. To this end, users and applications may obtain, modify, monitor, and annotate information. Another goal of the present invention is to support and offer services that facilitate mapping higher-level semantic interactions to physical data, to thereby liberate users and applications from understanding detailed schemas and the query languages of specific information stores and foreign applications. Consequently, cognitive work required by users to map their mental model of tasks and goals into the framework of applications will be reduced. That is, higher-level semantics will allow users to interact with applications in a more natural way.

Conversely, richly annotated data describing the user's interactions allow models that connect intention with action to be discovered and constructed. Viewed as semantic annotations, these models are available for broadly deployed services whose purpose is to make information more relevant to users.

A further goal of the present invention is to help build models based on usage information. Such models will help applications behave in a more intelligent, personal, predictable, and adaptive manner. The present invention provides automated searching, classifying, linking, and analyzing utilities which surpass, or work well with, heuristics. These situations include cross-domain or application modeling and situations where adaptive models out perform static models.

Thus, it is a goal of the present invention to provide machine understandable representations of users' tasks and/or of data generated by users so that computer performance and human-computer interactions may be improved.

§2. SUMMARY OF THE INVENTION

The present invention defines a pattern lattice data space as a framework for analyzing data in which both schema-based and statistical analysis are accommodated. In this way, the limitations of schema-based and statistical analysis, when used alone (Recall §1.2.3 above.), are overcome.

Since the computational complexity of representing all possible permutations of related entities on a pattern lattice data space becomes enormous, the present invention may function to manage the size of the lattice structures in the pattern lattice data space. That is, in most instances, only sections or fragments of the pattern lattice data space are generated.

The present invention may also function to classify or cluster, search (find similar data), or relate data using lattice fragments in the pattern lattice data space.

The present invention also defines a superpattern cone or lattice generation function which may be used by the classification and clustering functions. In addition, the present invention defines a subpattern cone or lattice generation process which may be used by the search (find similar data) and data relating functions.

The present invention may also function to label, in readily understandable "pidgin", categories which classify information.

Finally, the present invention may function to provide a user interface to cluster, classify, search and link usage information.

§3. BRIEF DESCRIPTION OF THE DRAWINGS

FIG. 1B is also a high level block diagram of a machine in which at least some aspects of the present invention may operate.

FIGS. 3, 4, 5, 6, and 7 are entity-relationship diagrams which may be used to log user activities in a windows address book application, an order form application, a calendar application, a city guide application and an e-mail application, respectively.

Figure 8:
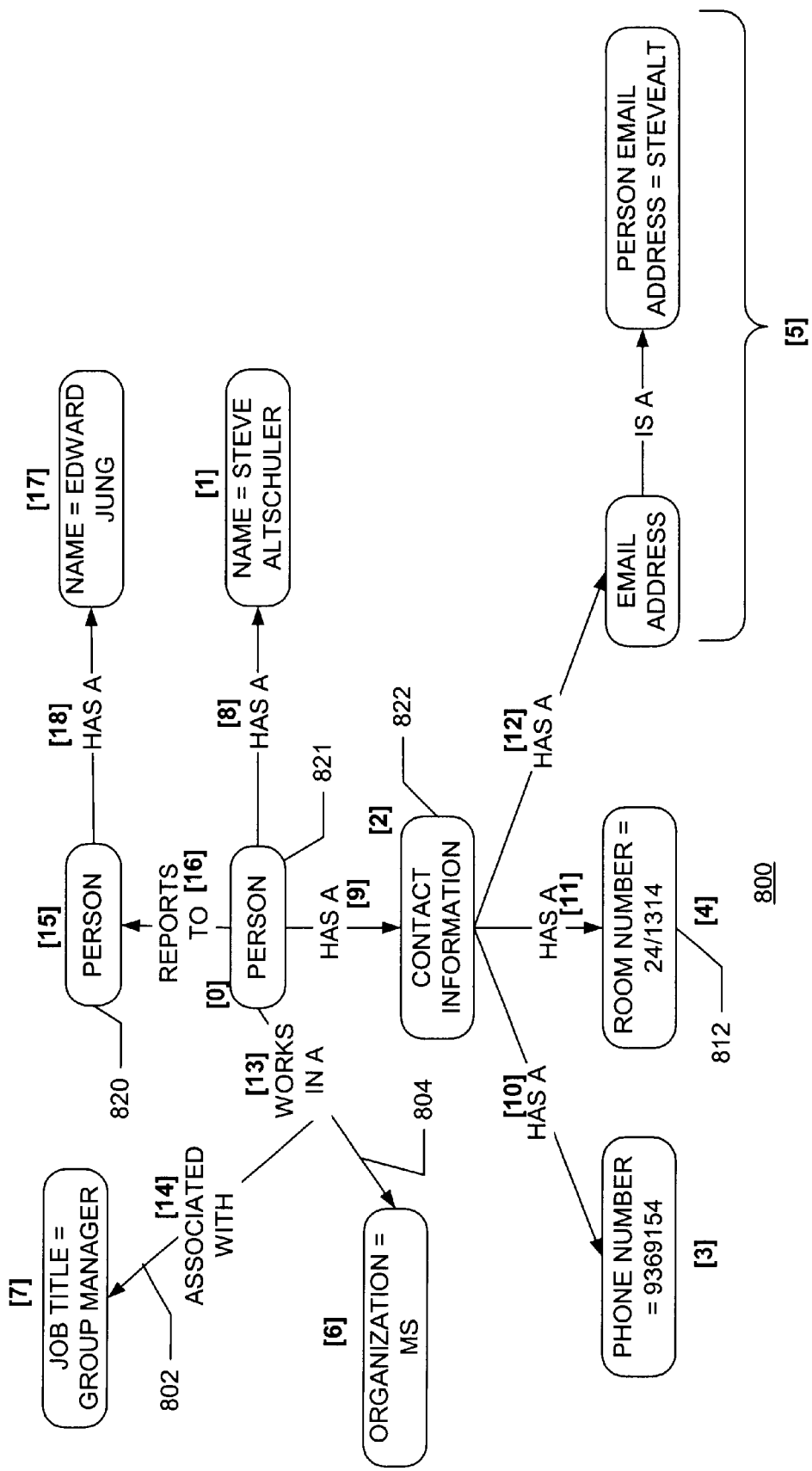

FIG. 8 is a graph depicting an exemplary log entry in a windows address book application.

Figure 9C:
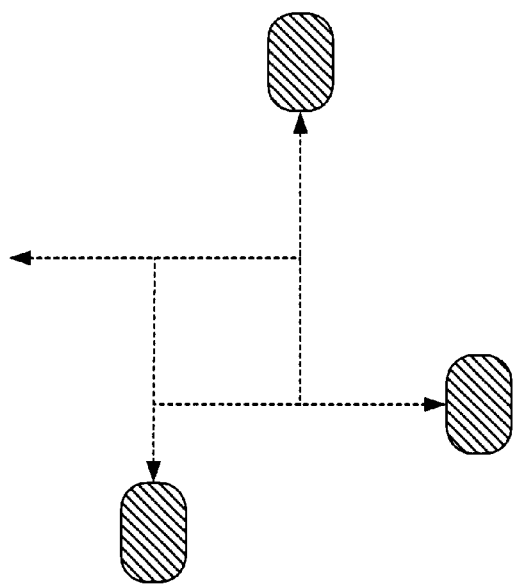
Figure 9B:
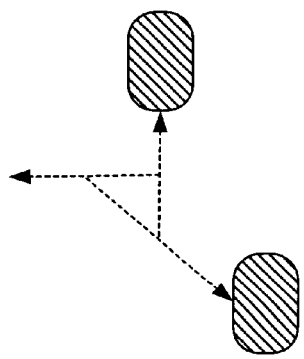
Figure 9A:
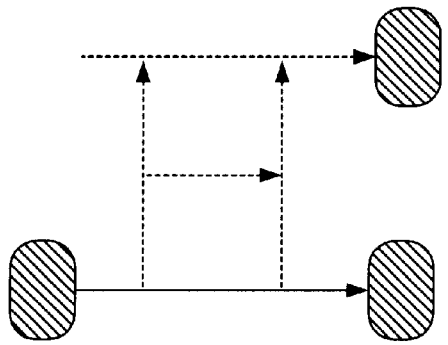

FIGS. 9A and 9B and 9C are graphs which depict a process of legalizing a graph.

Figure 10:
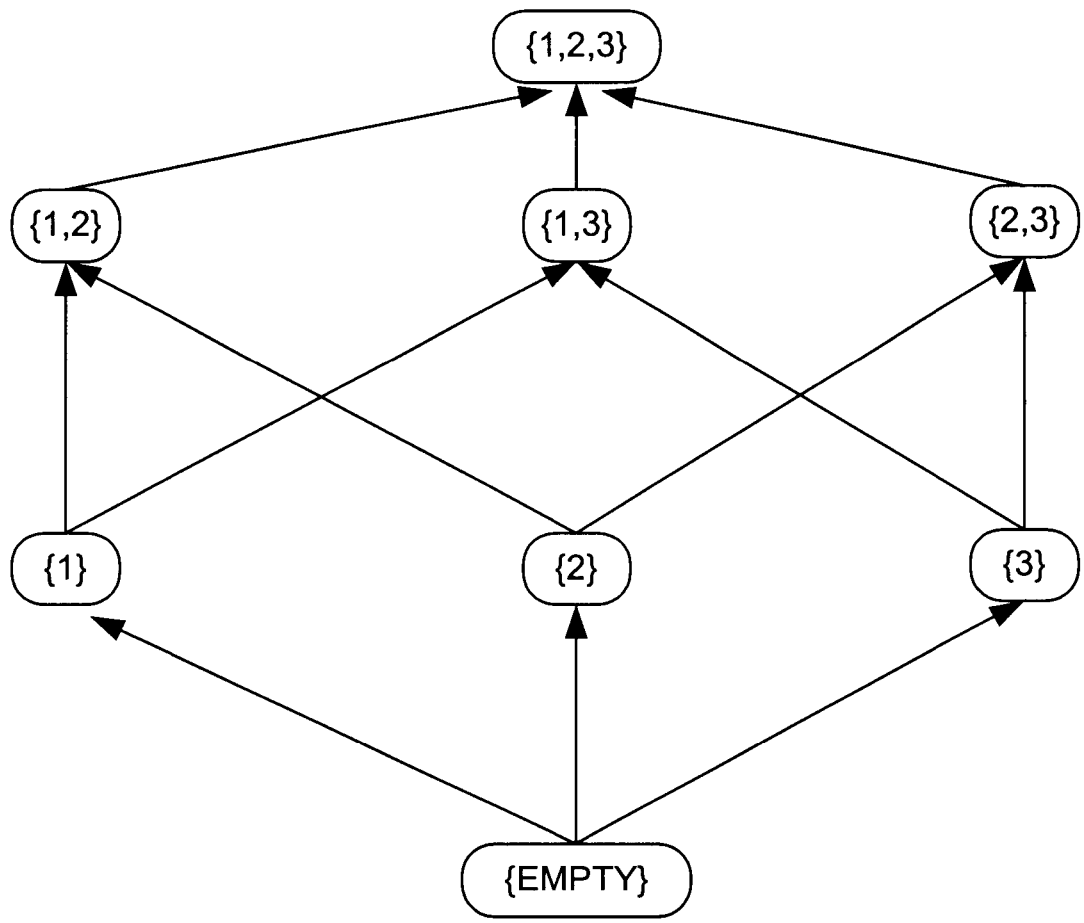

FIG. 10 is a diagram in which, all elements of power set P(S) with set S={1,2,3} are shown as a directed acyclic graph (DAG).

Figure 11:
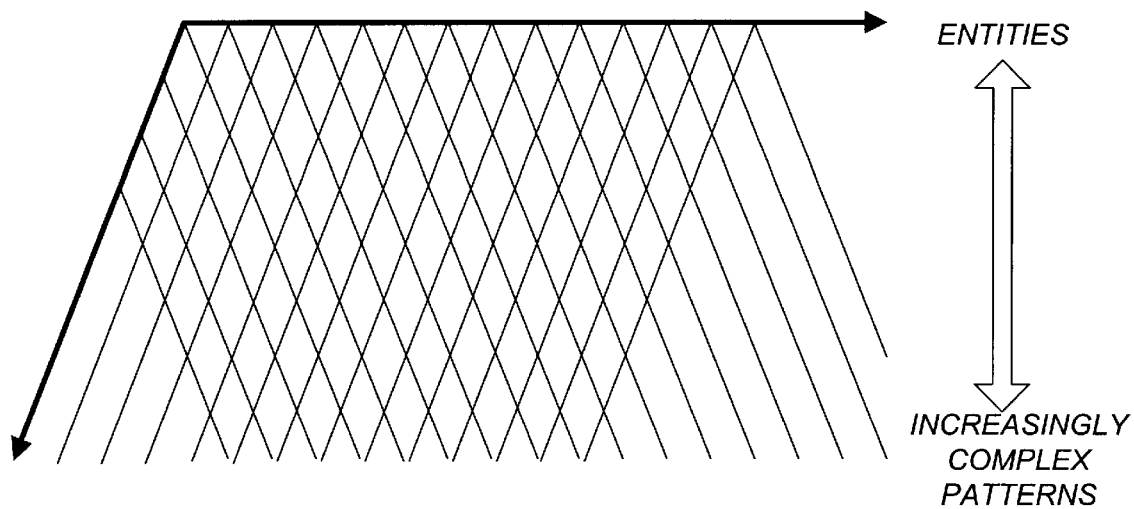

FIG. 11 is a high level diagram of a pattern lattice data space.

Figure 12:
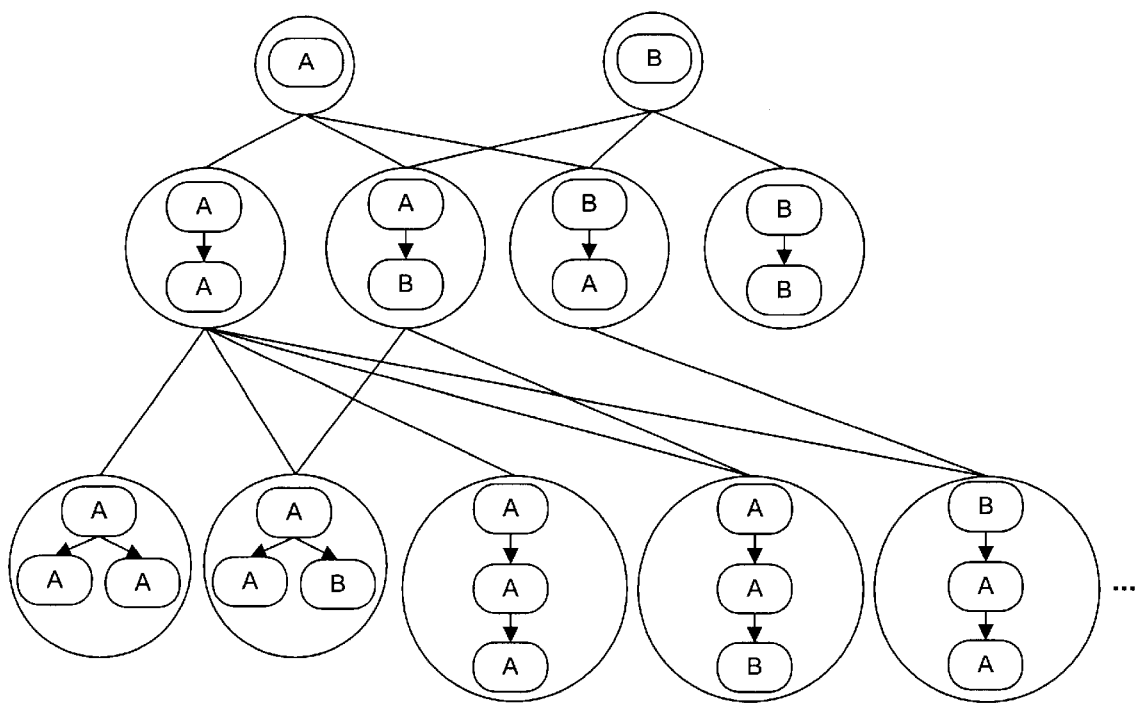

FIG. 12 is an example of a portion of a pattern lattice data space built from two (2) entity nodes.

Figure 13:
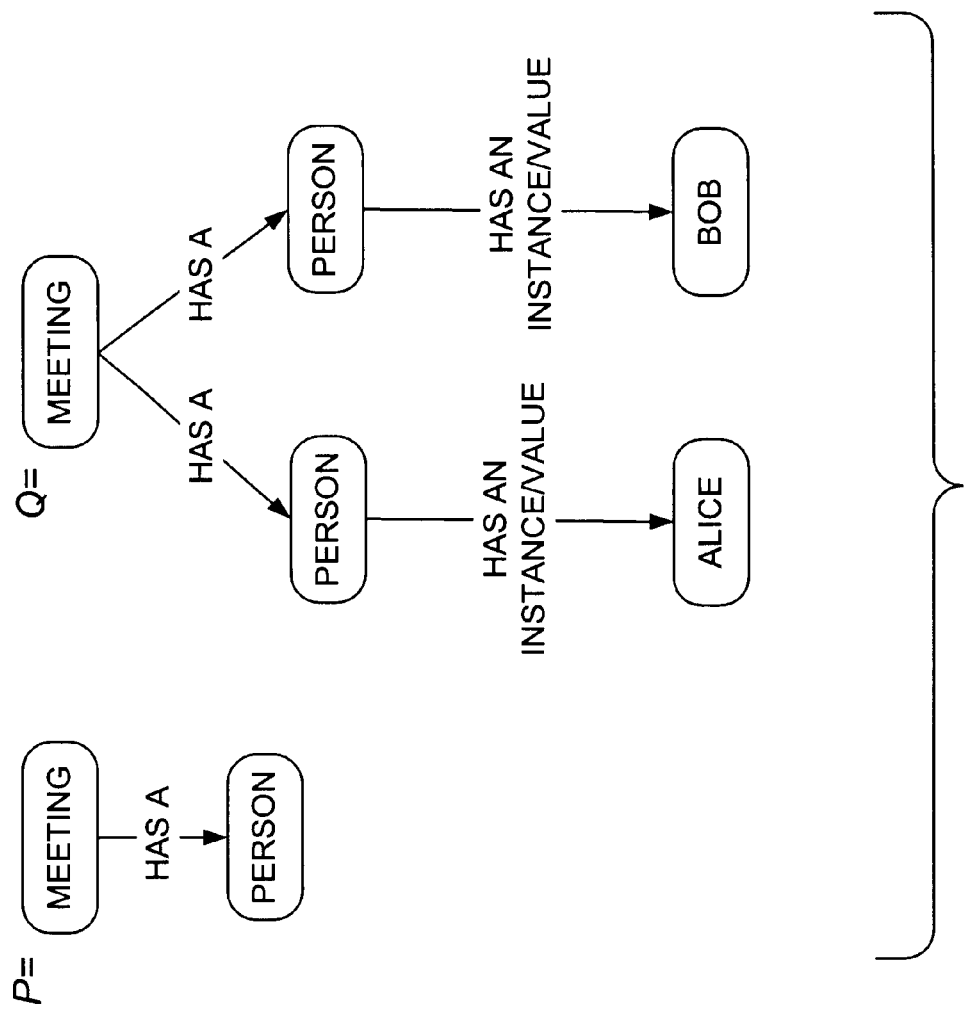

FIG. 13 depicts graphs which are used to illustrate embeddings of one graph into another.

Figure 14:
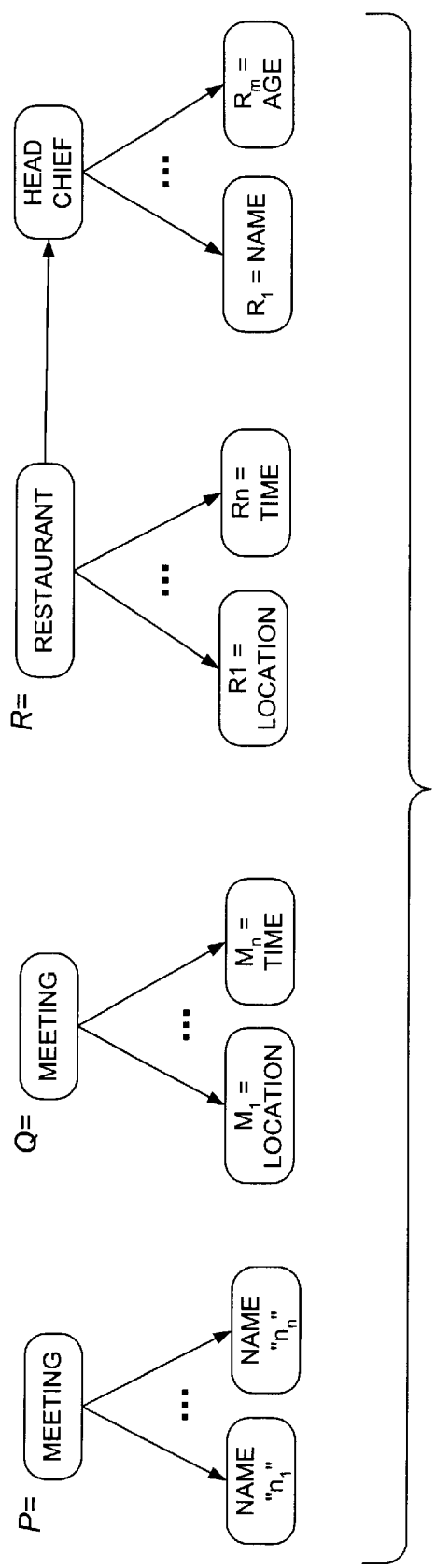

FIG. 14 depicts graphs which are used to illustrate the complexity of the pattern lattice data space.

Figure 15A:
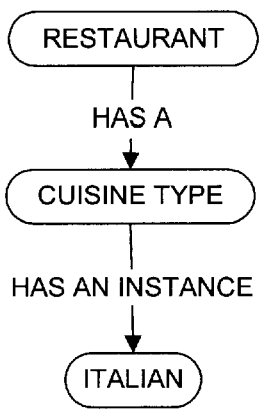
Figure 15B:

FIGS. 15A and 15B the graphs of FIG. 15A after an exemplary graph virtualization.

Figure 16:
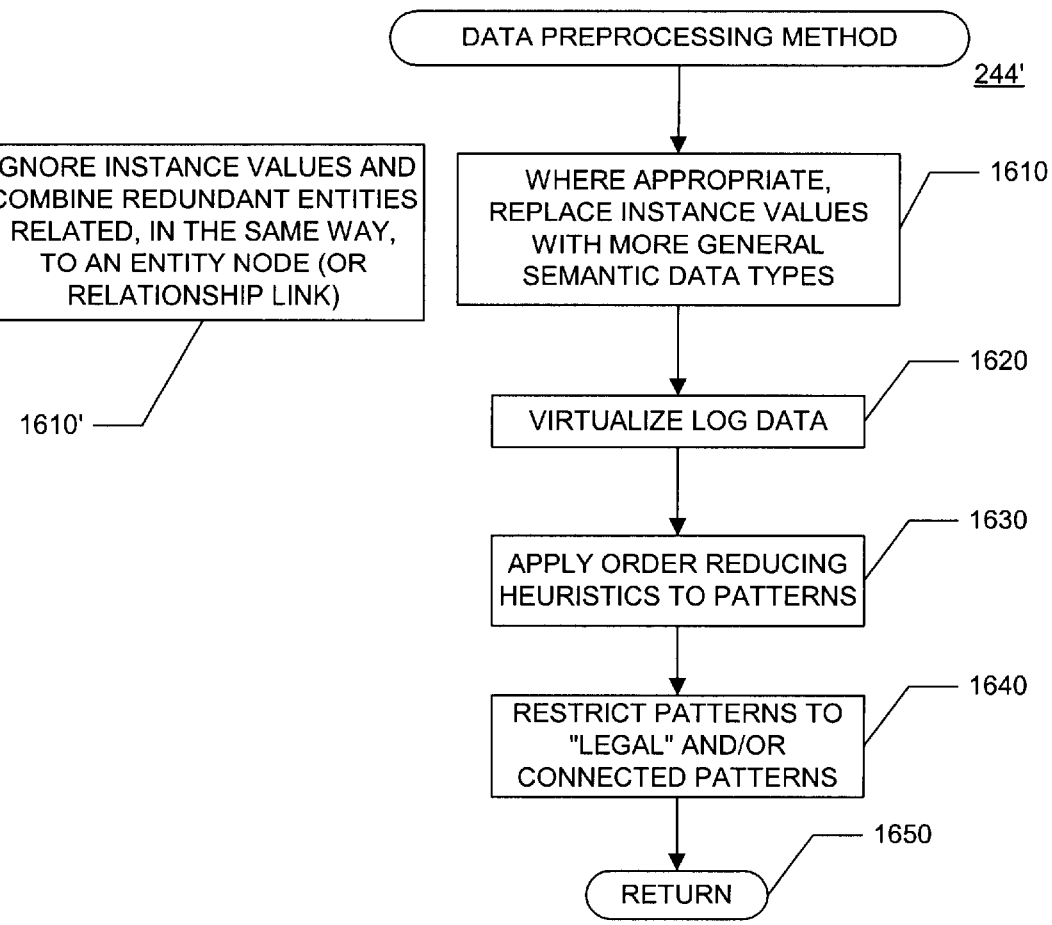

FIG. 16 is a flow diagram of an exemplary data preprocessing method.

Figure 17:
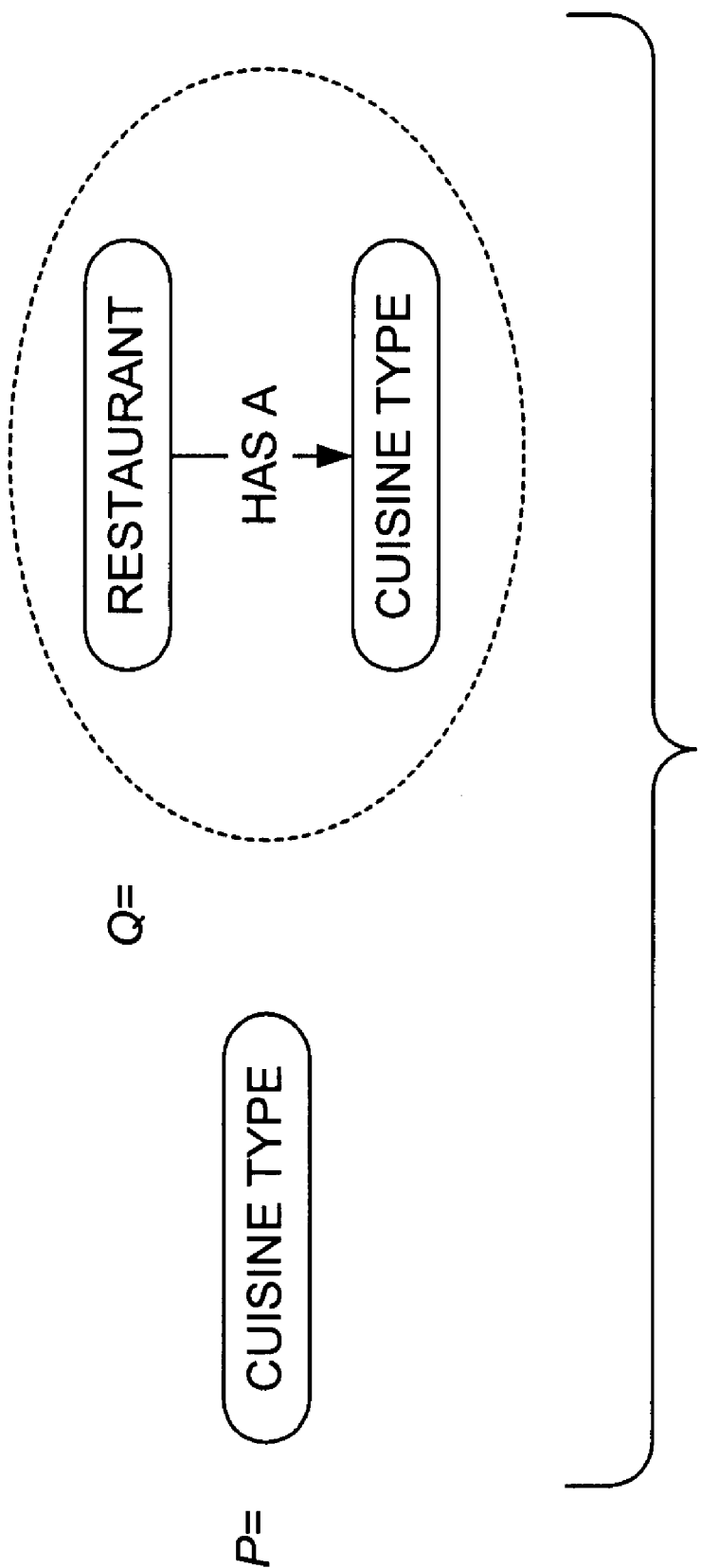

FIG. 17 are graphs which illustrate an exemplary vertical trimming operation.

Figure 18:
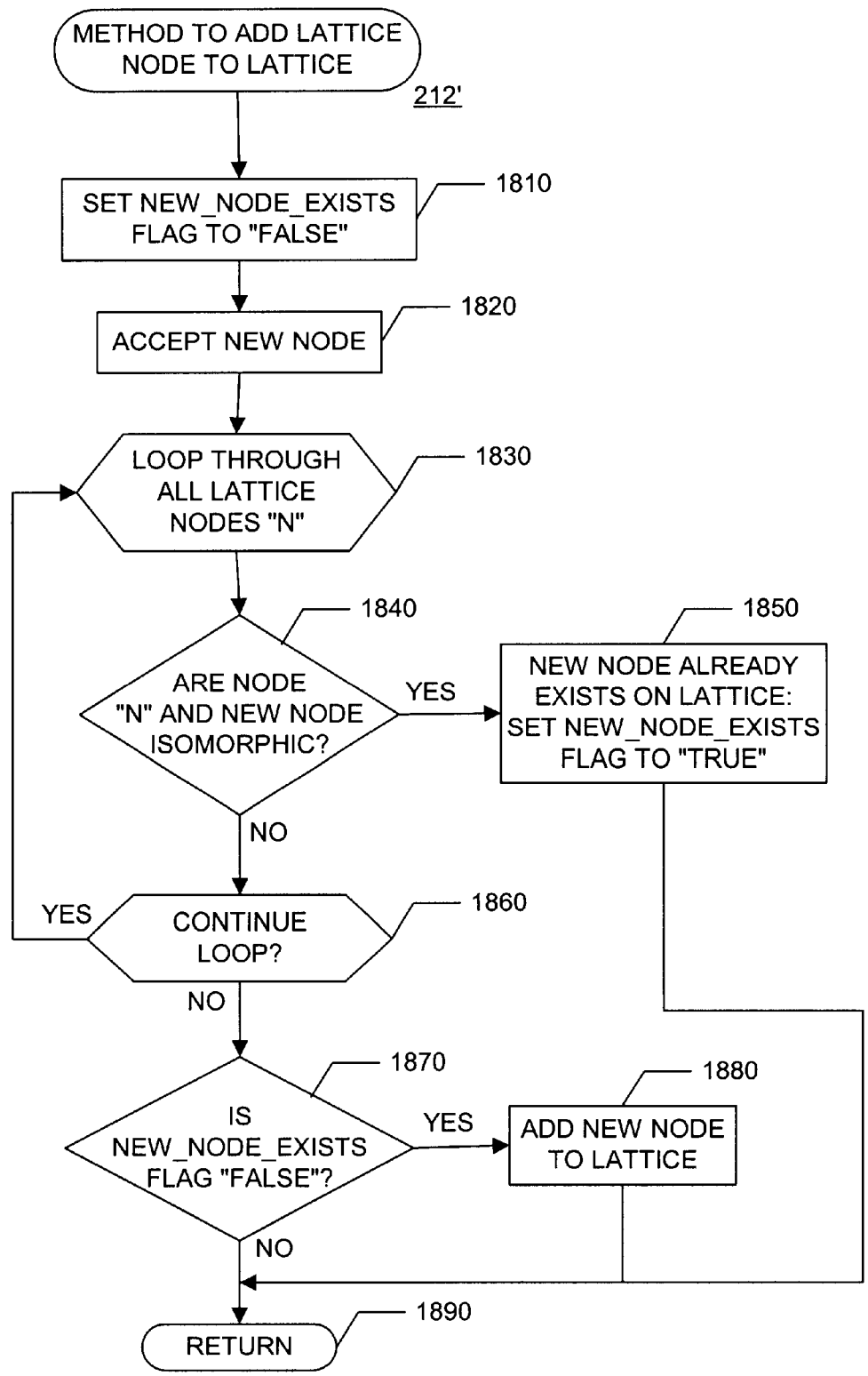

FIG. 18 is a flow diagram of a method to add a lattice node to a lattice structure.

Figure 19:
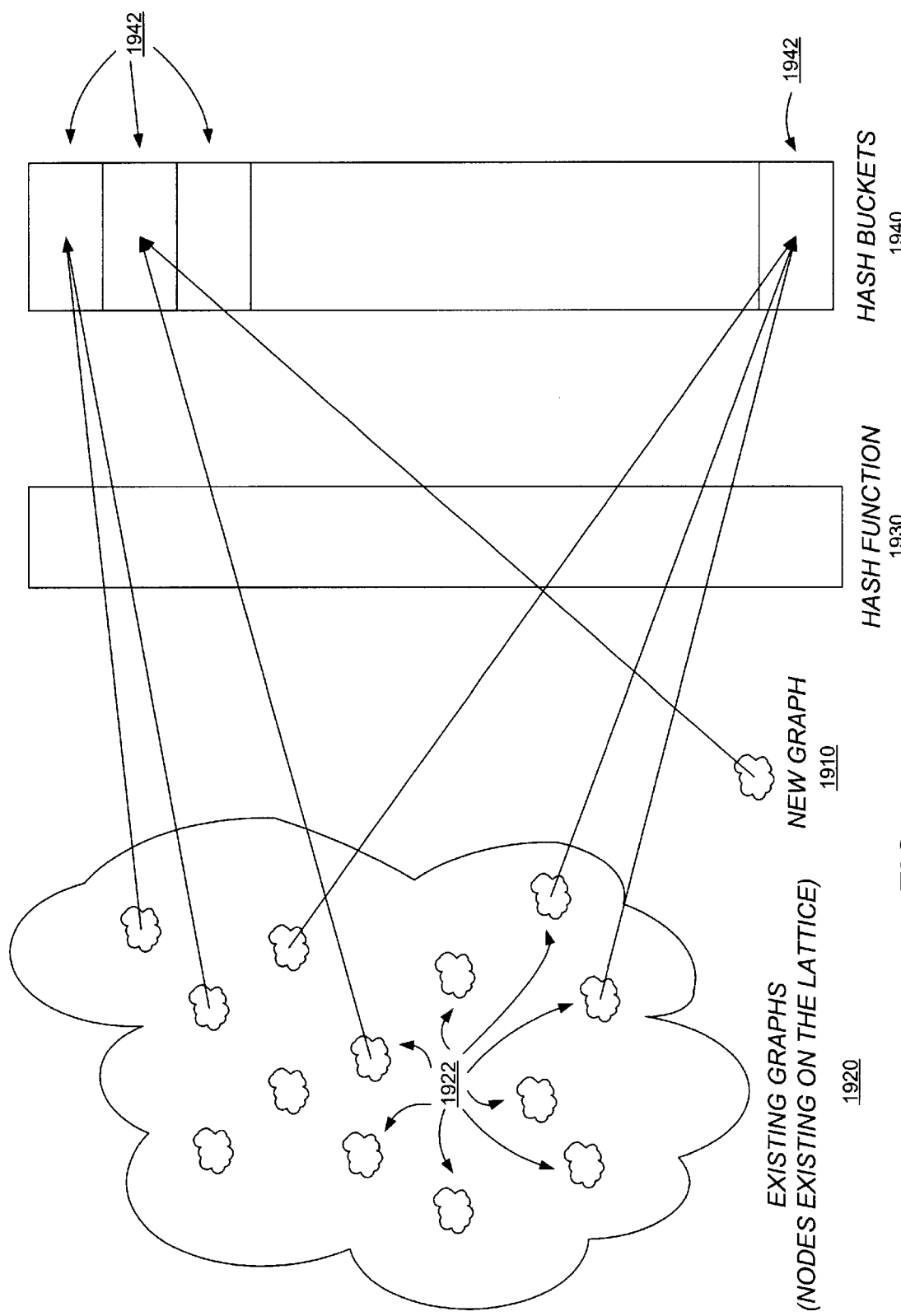

FIG. 19 is a diagram which illustrates the use of hashing to reduce a number of graph isomorphism checks.

Figure 20:
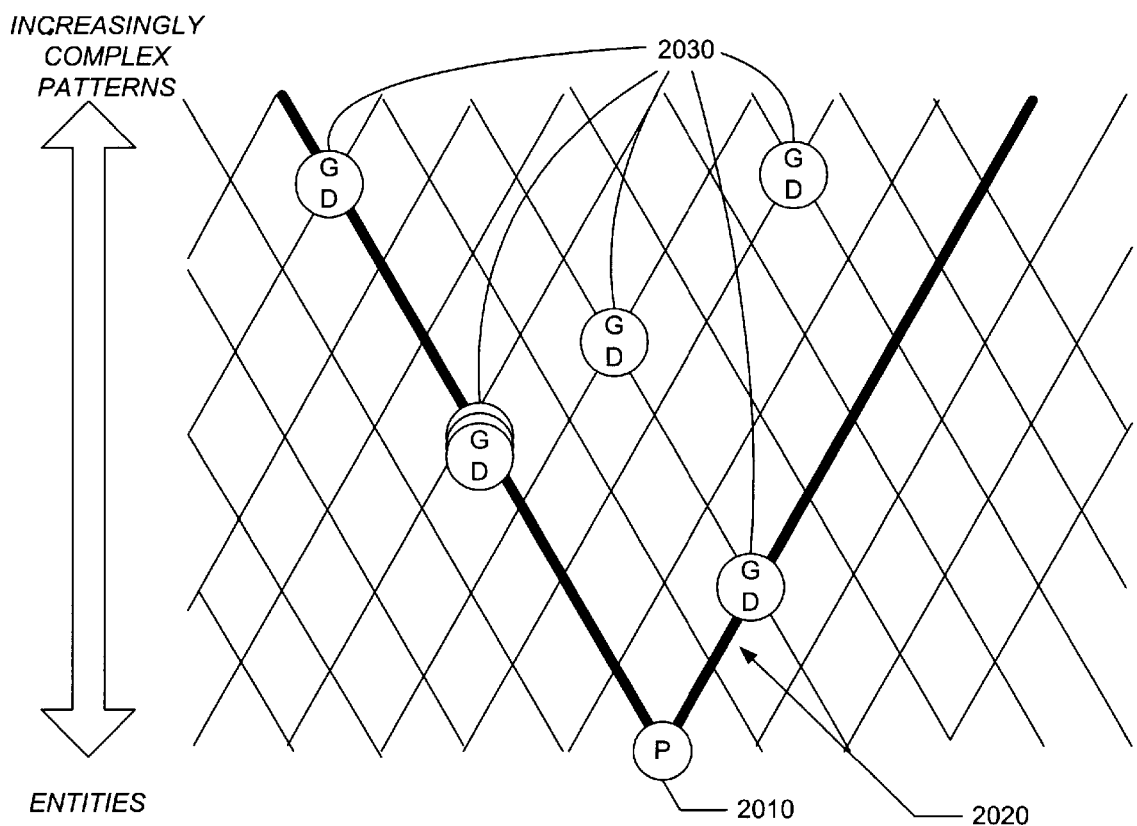

FIG. 20 is an illustration of a superpattern lattice started from a seed pattern given certain graph data.

Figure 21:
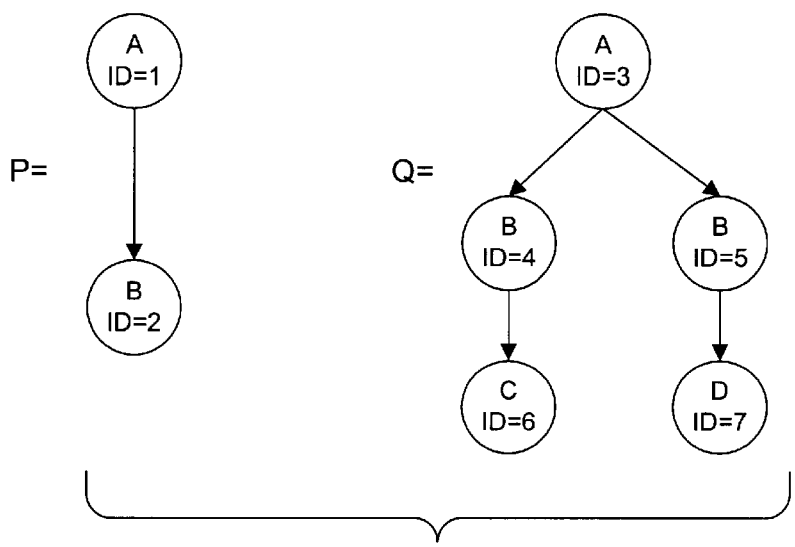

FIG. 21 depicts graphs which are used to illustrate maintaining entity node (and/or relationship link) id's for reducing the task of performing isomorphism checks over all children to a sorting problem.

Figure 22:
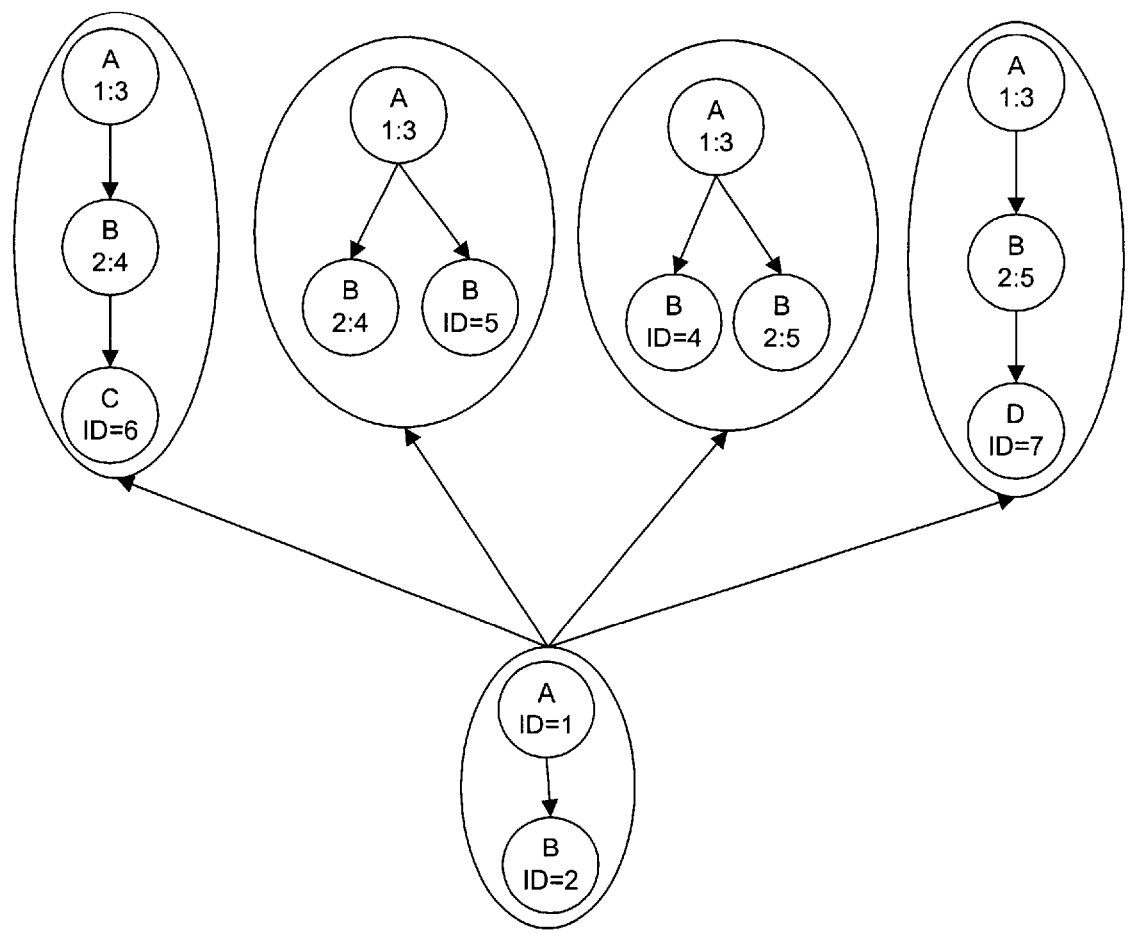

FIG. 22 is a pattern lattice which includes the first level of a superpattern cone generated from the pattern P of FIG. 21 assuming that the only existing data is the graph Q of FIG. 21.

Figure 23:
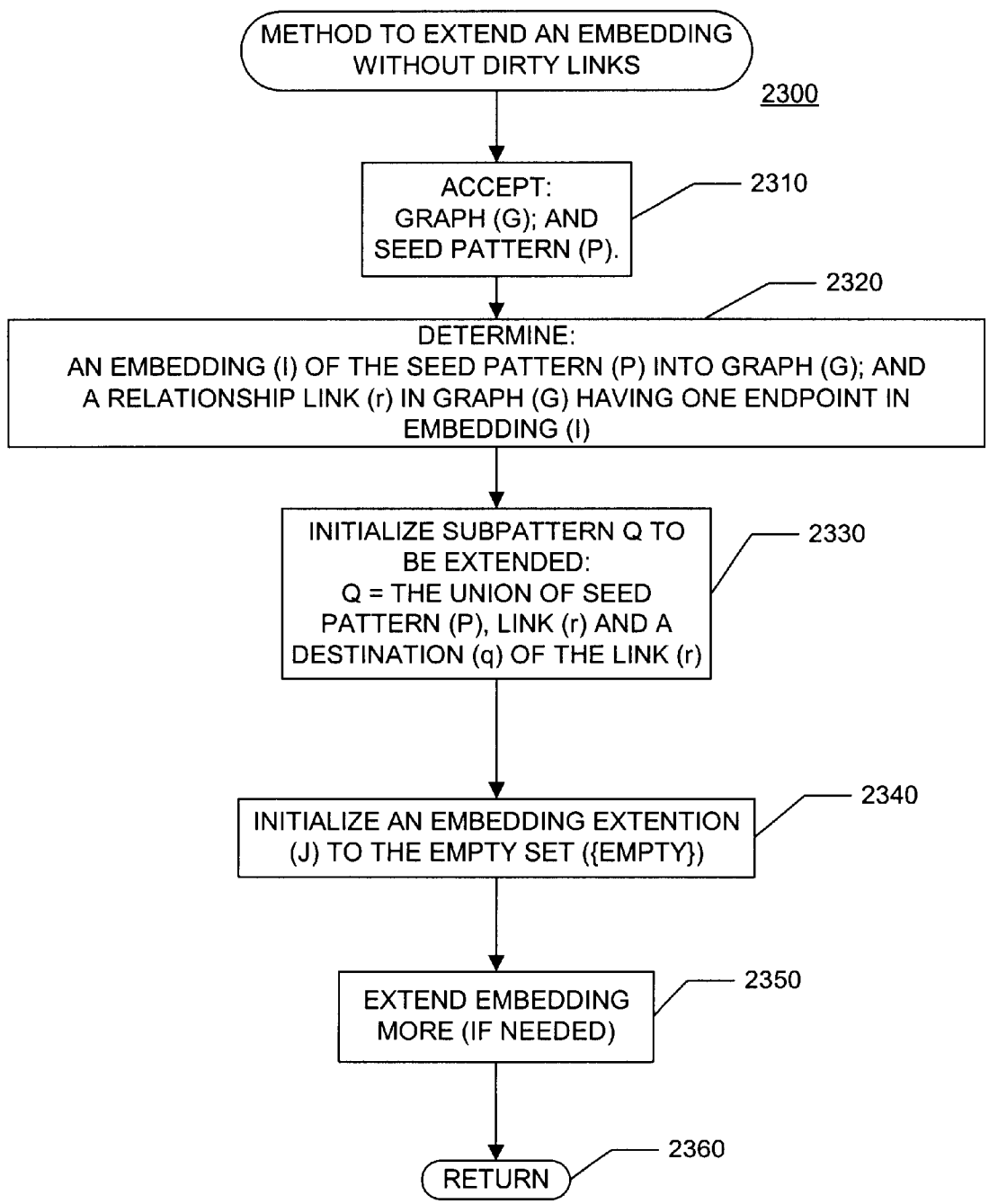

FIG. 23 is a flow diagram of a method to extend an embedding without dirty links.

Figure 24:
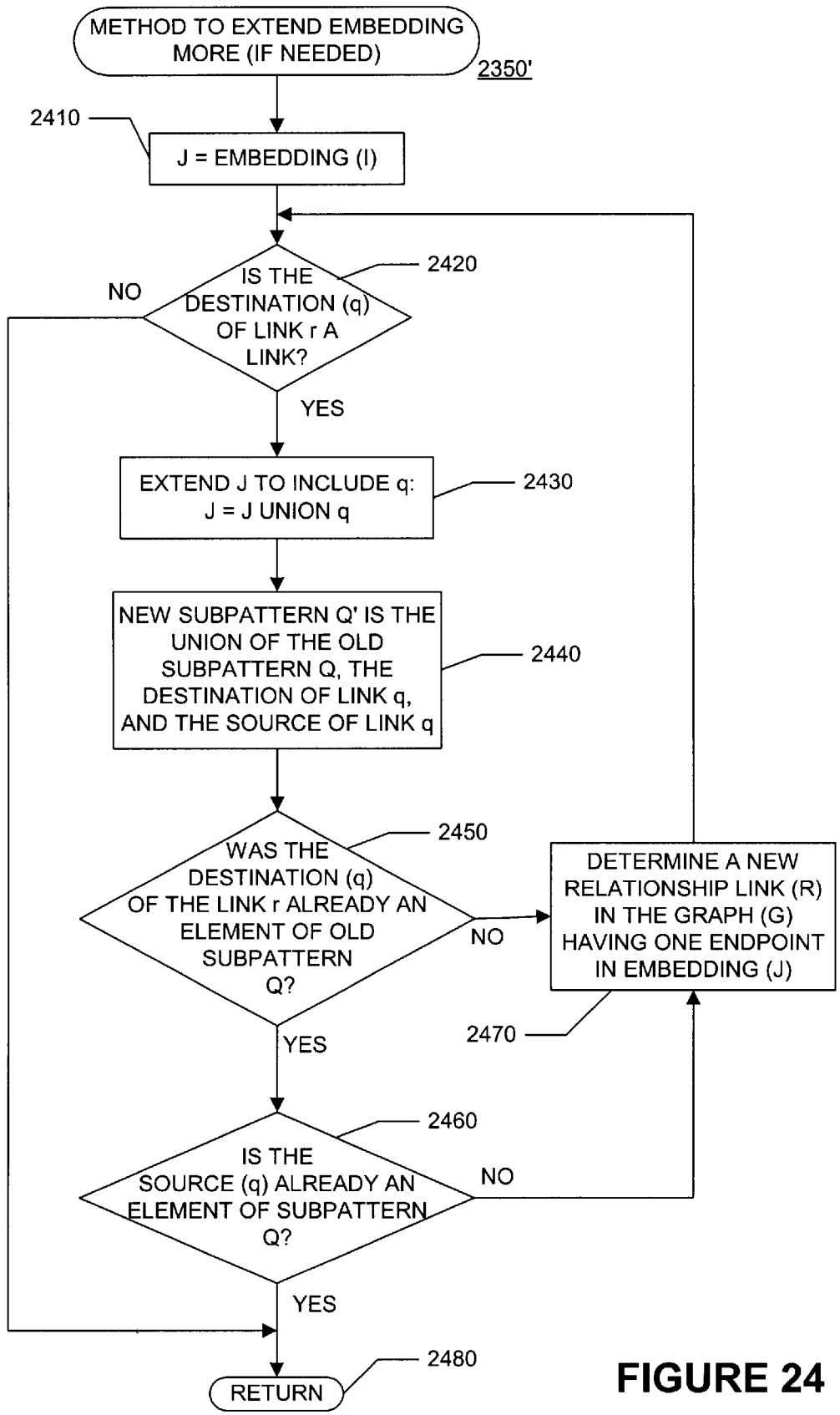

FIG. 24 is a flow diagram of a method to further extend an embedding.

Figure 25B:
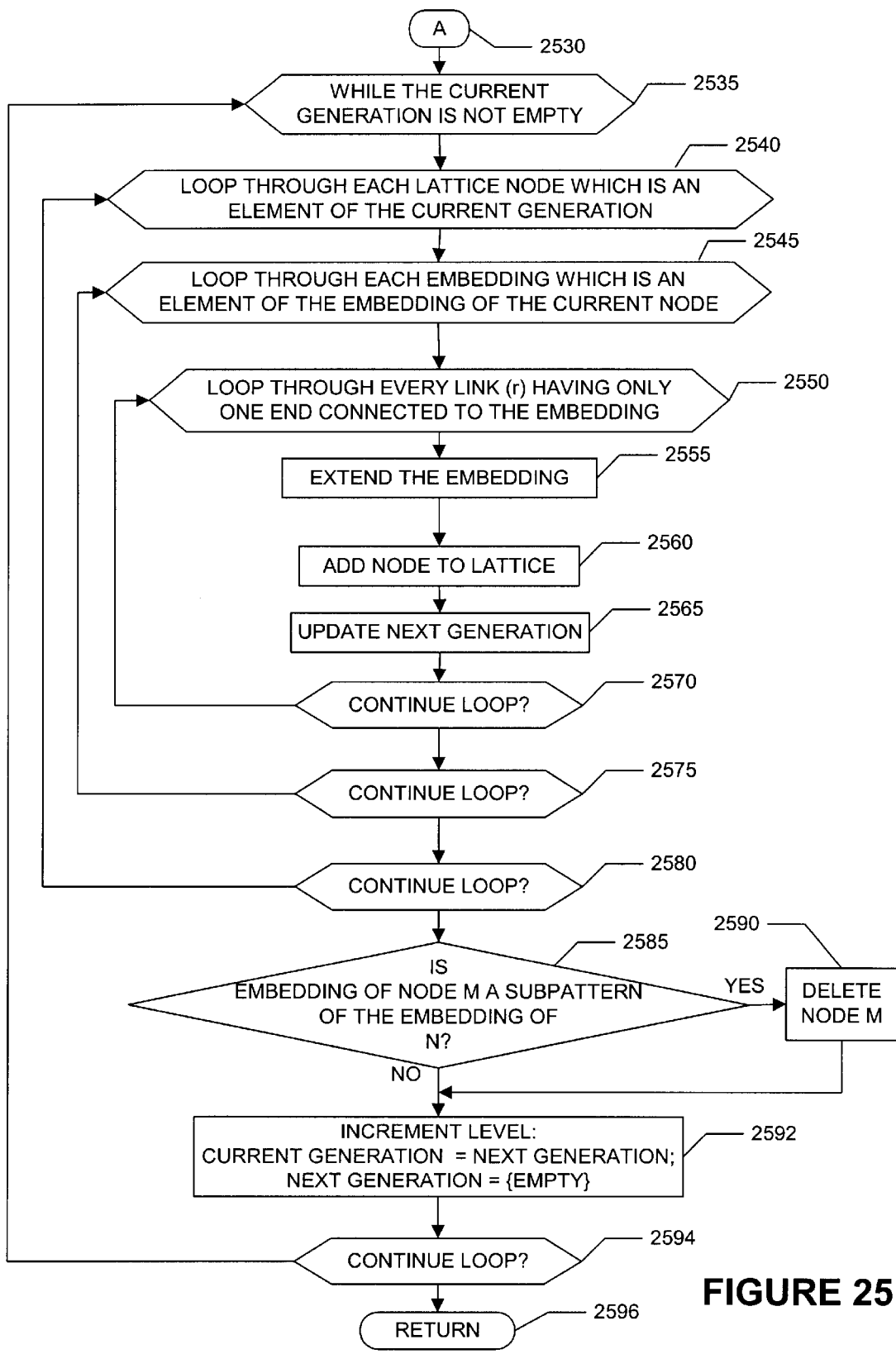

FIGS. 25, 25A and 25B, are flow diagrams of a method for generating a superpattern lattice in a breadth first manner.

Figure 26:
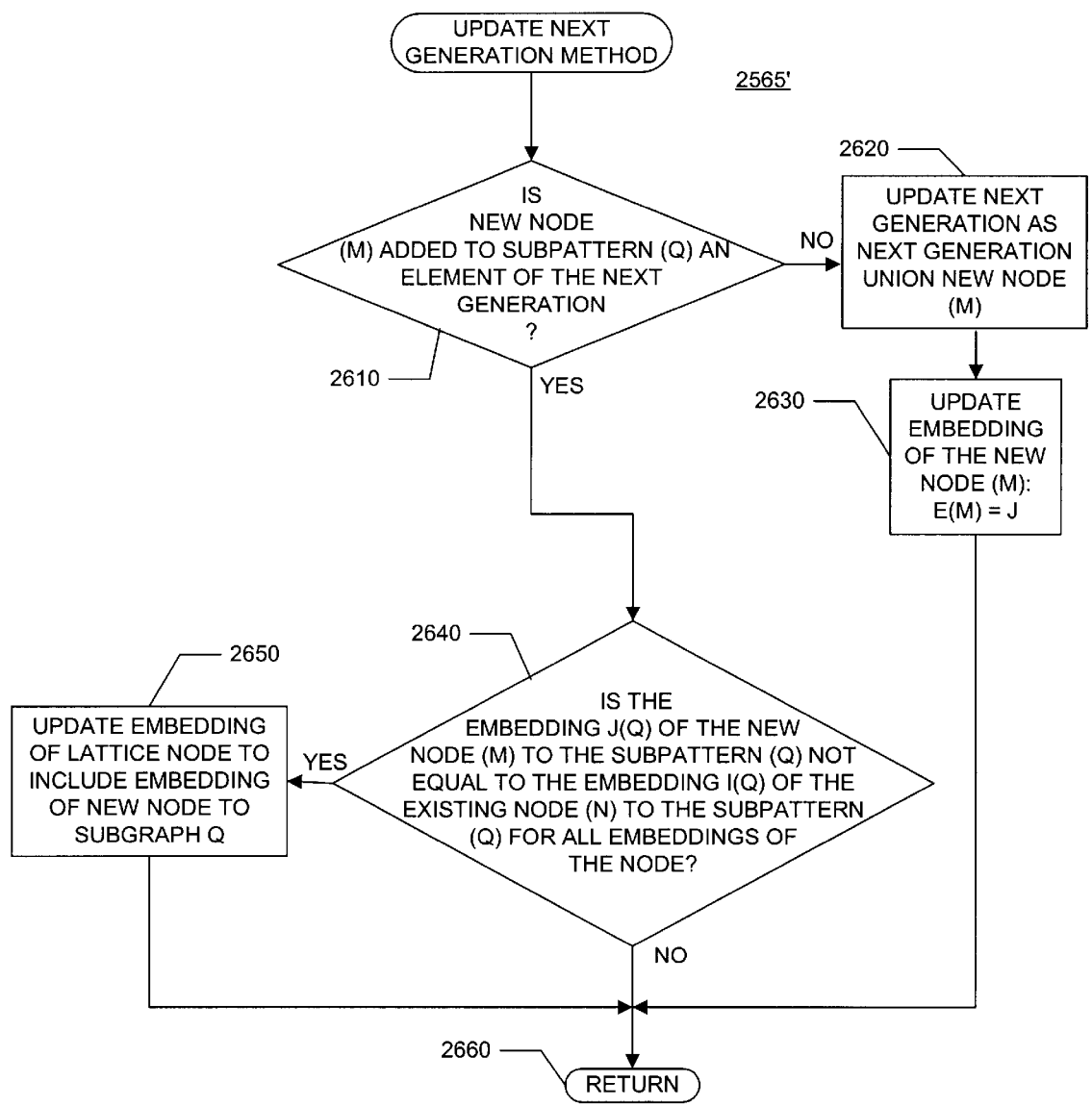

FIG. 26 is a flow diagram of a method for updating a next generation of a superpattern lattice.

Figure 27:
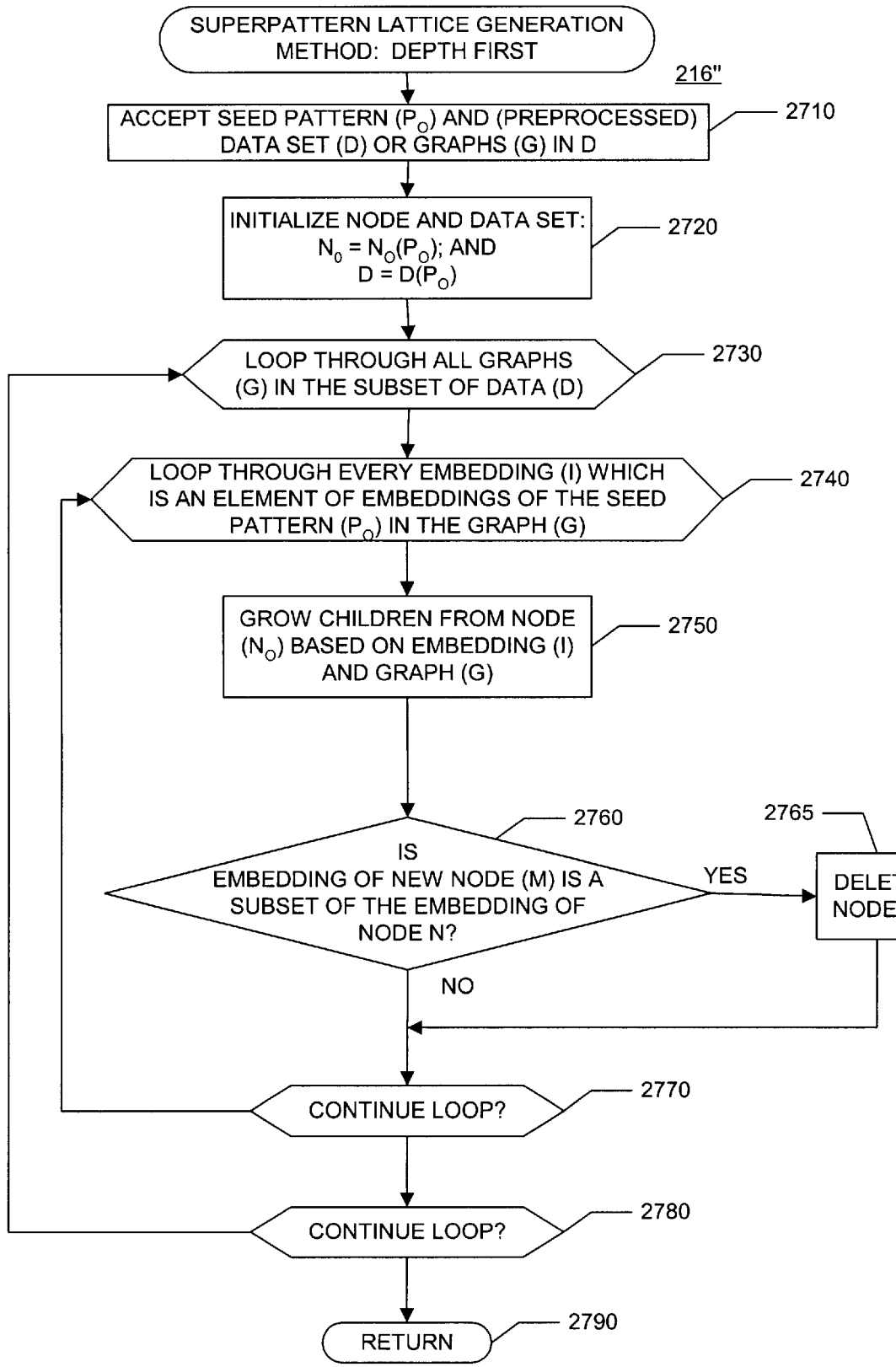

FIG. 27 is a flow diagram of a method for generating a superpattern lattice in a depth first manner.

Figure 28:
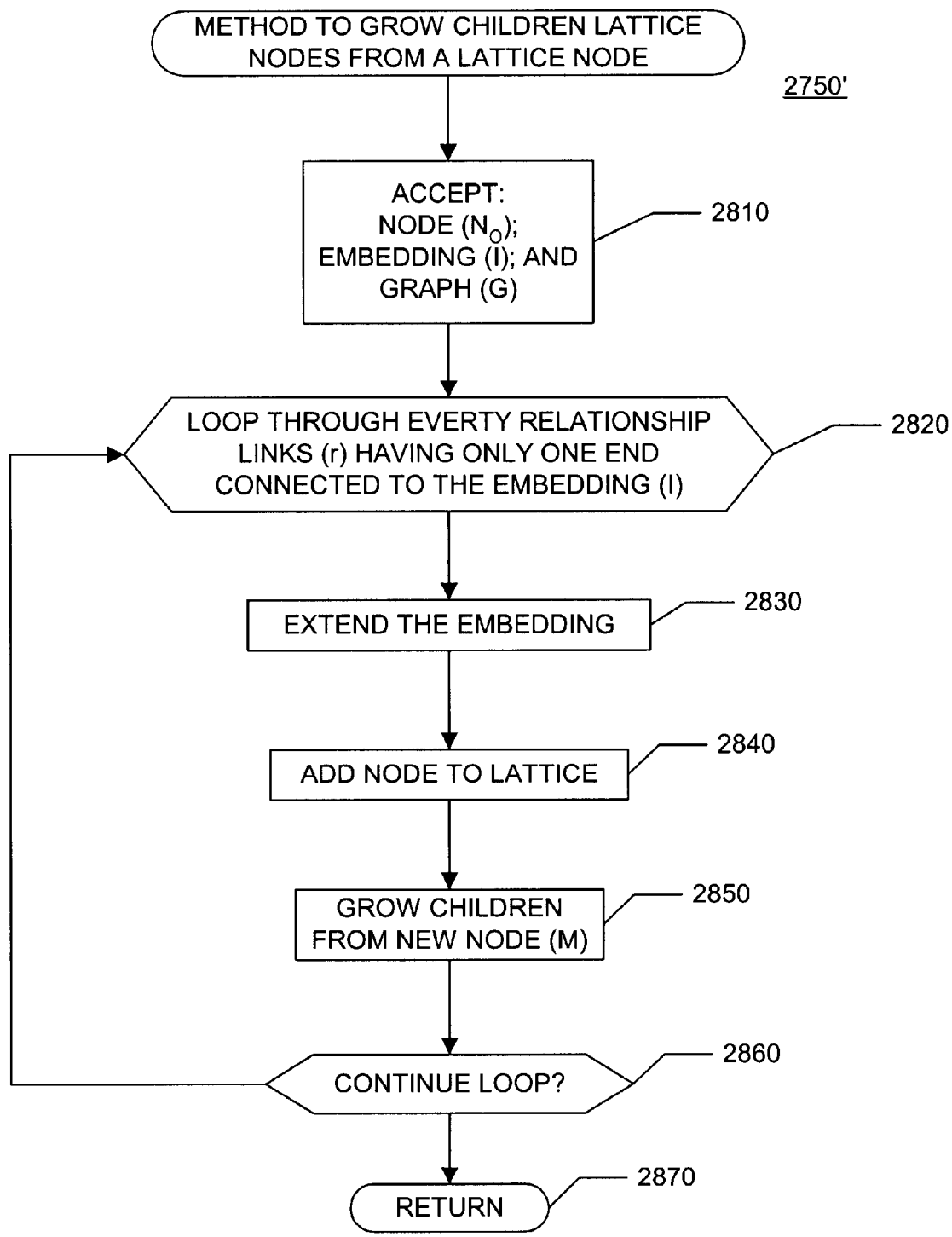

FIG. 28 is a flow diagram of a method to grow children lattice nodes from a lattice node.

Figure 29:
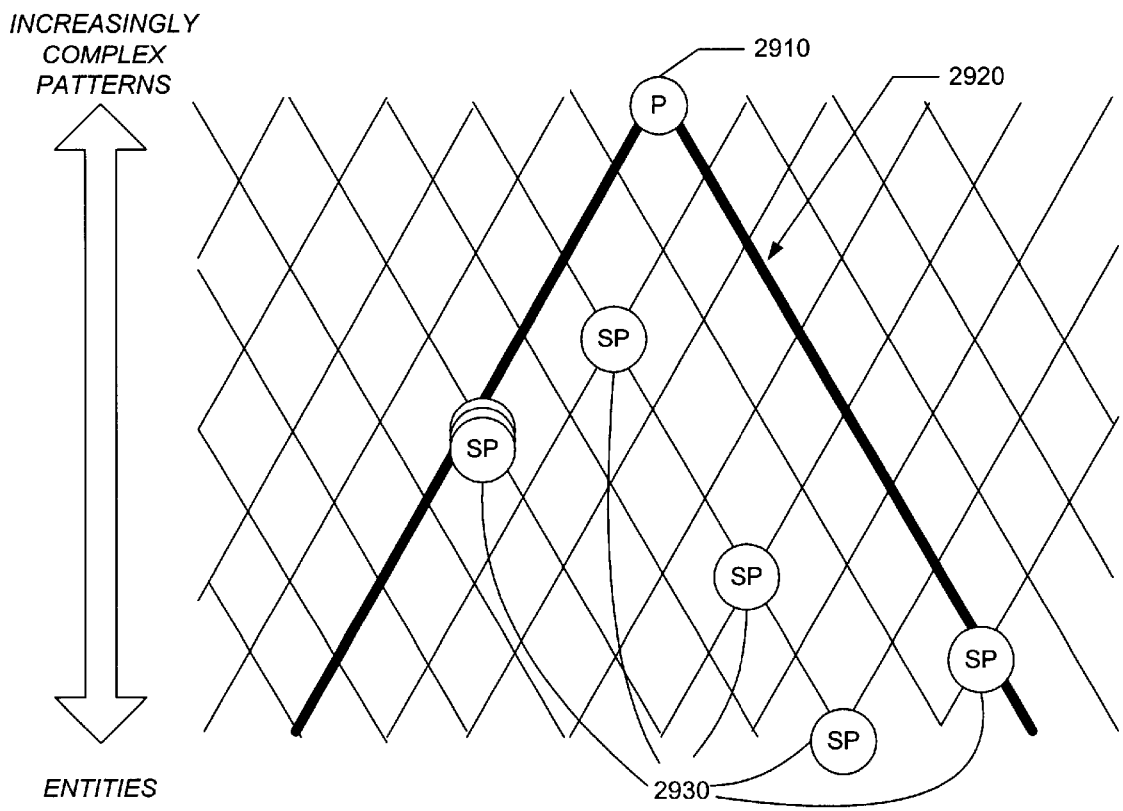

FIG. 29 is a diagram of a subpattern lattice generated from a seed pattern.

Figure 30:
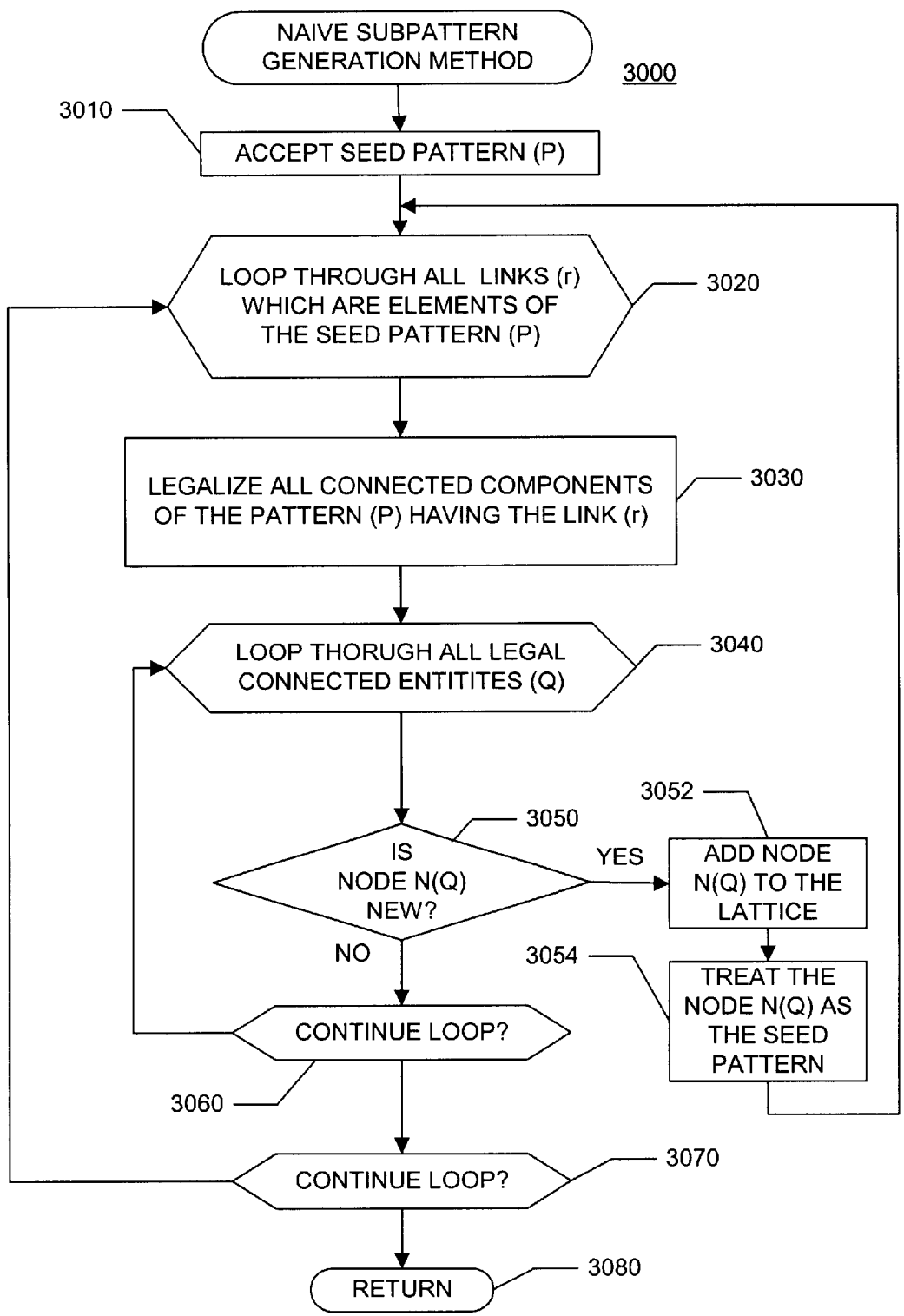

FIG. 30 is a flow diagram of a naive method for generating a subpattern lattice.

Figure 31:
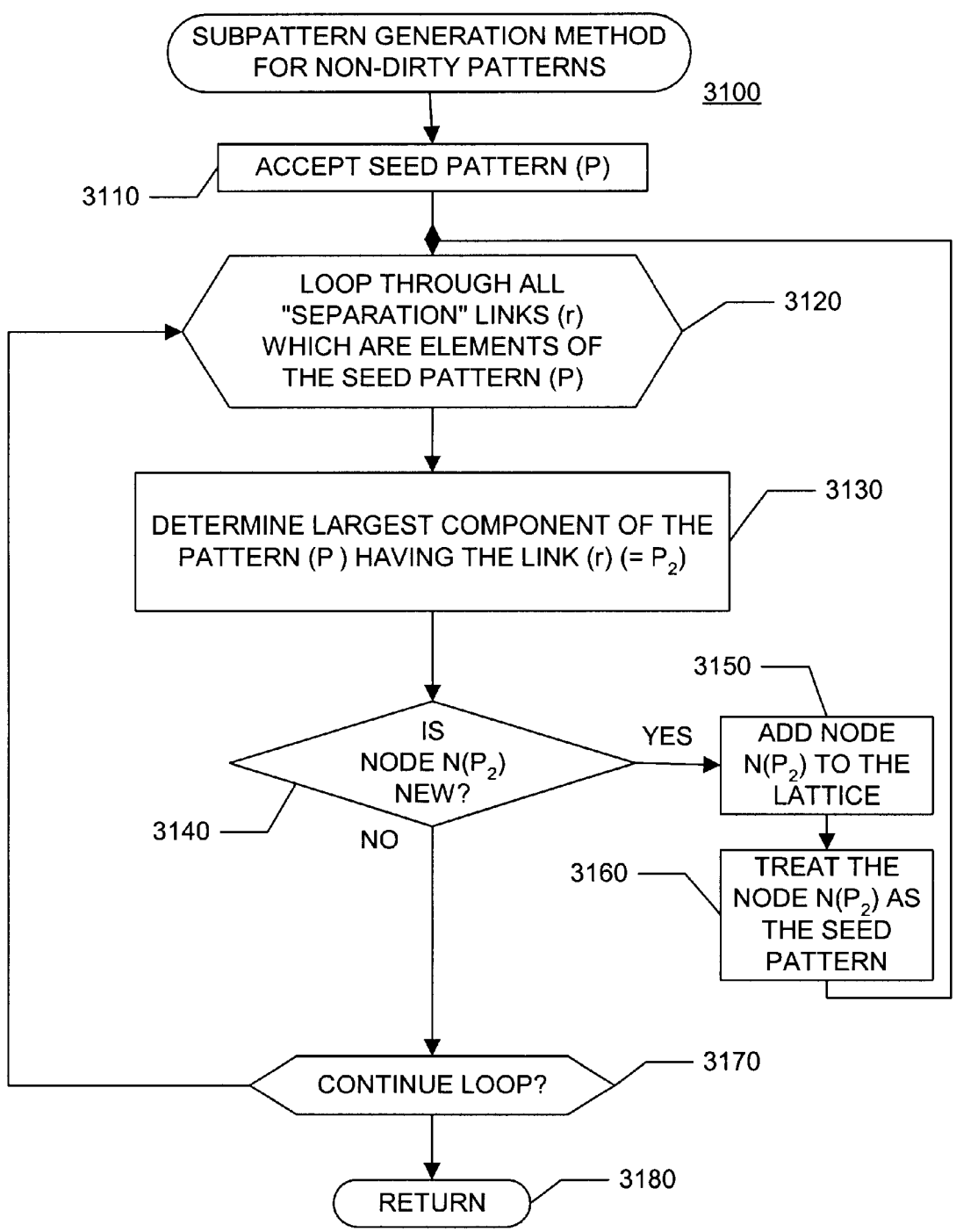

FIG. 31 is a flow diagram of a method for generating a subpattern lattice for non-dirty patterns.

Figure 32A:
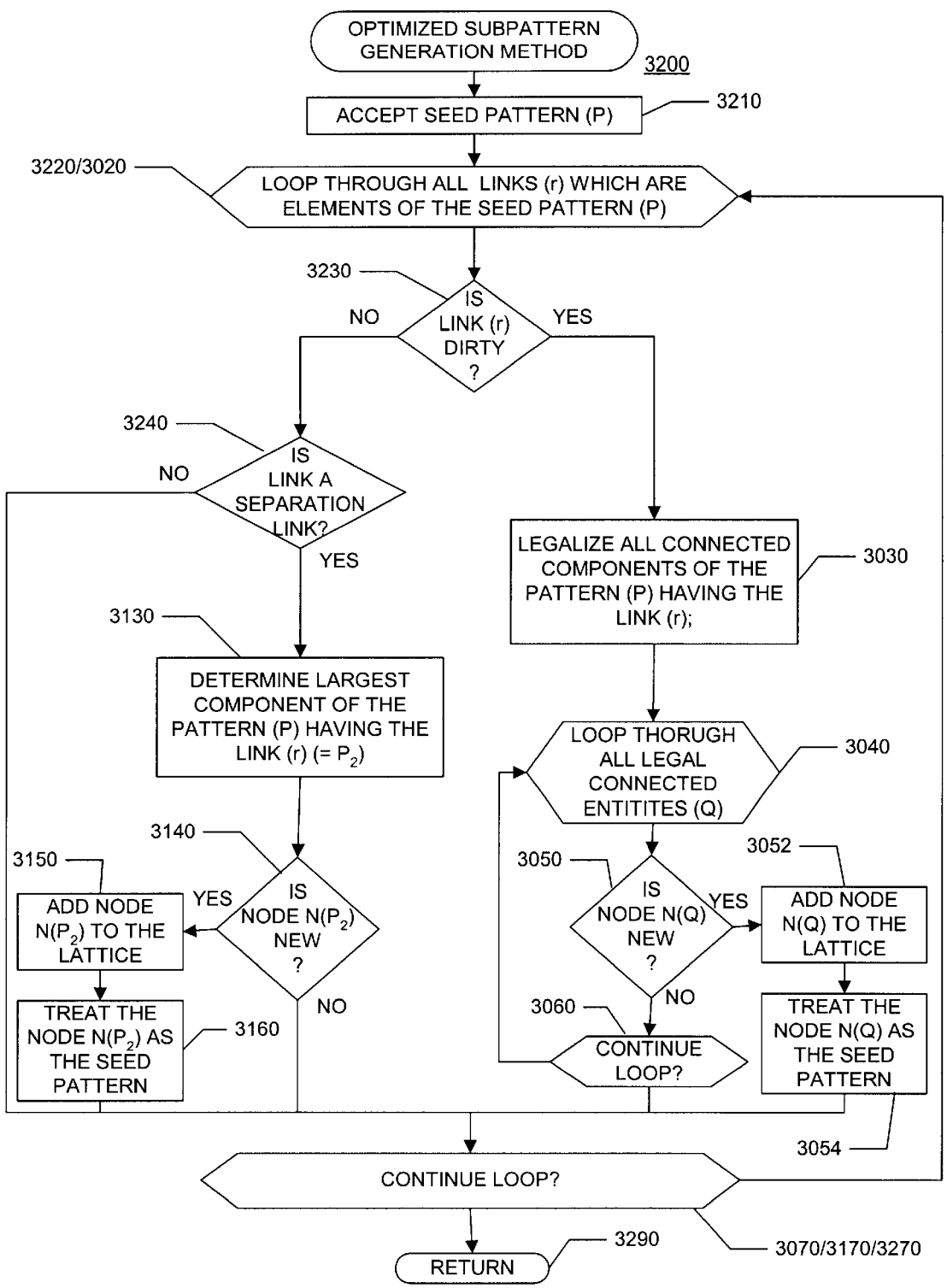
Figure 32B:
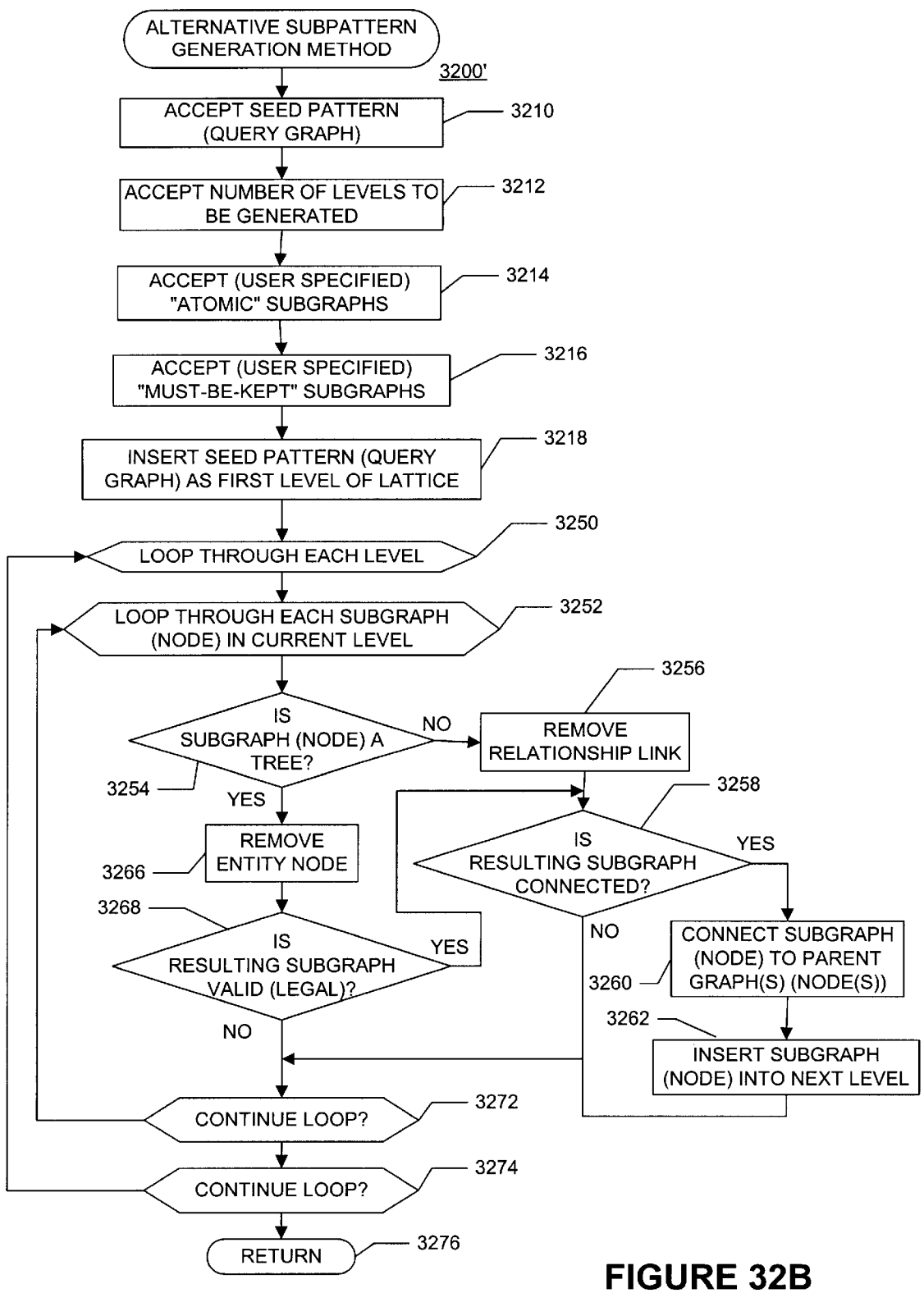

FIGS. 32A and 32B are flow diagrams of an optimized method for generating a subpattern lattice.

Figure 33:
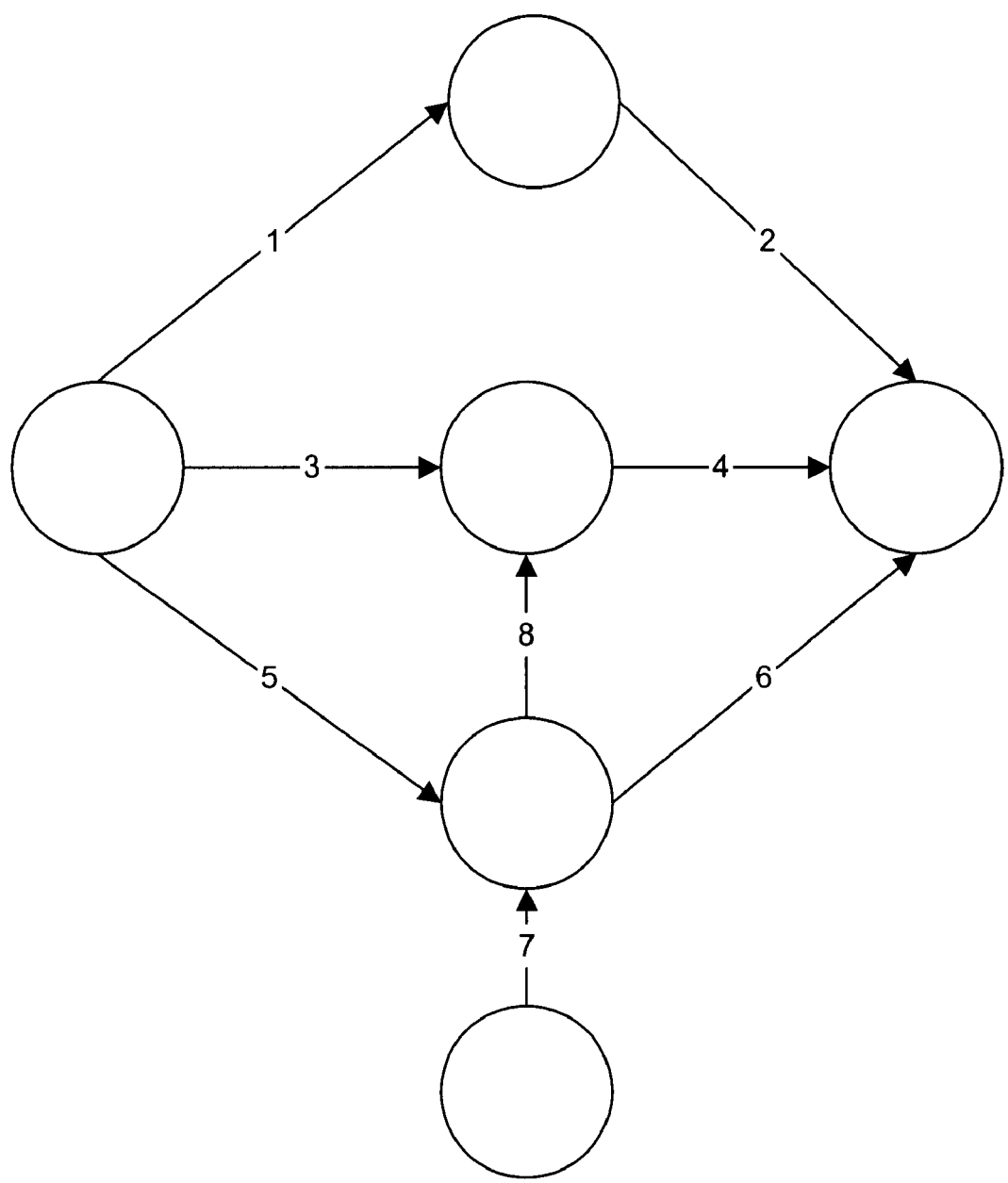

FIG. 33 is a graph which illustrates steps which may be carried out when finding separation links in a graph.

Figure 34:
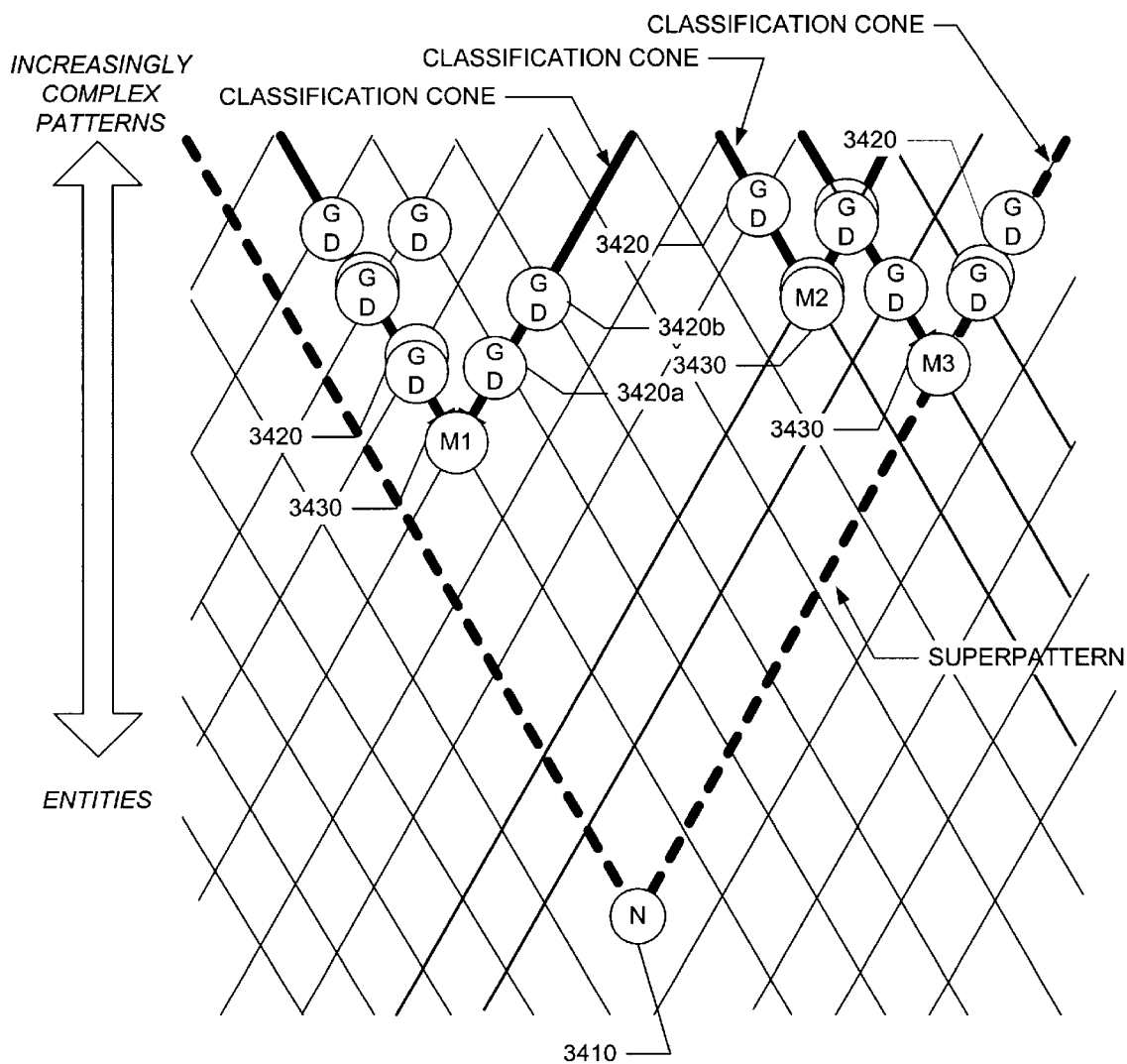

FIG. 34 is a diagram of which illustrates using a superpattern lattice structure for classifying data.

Figure 35:
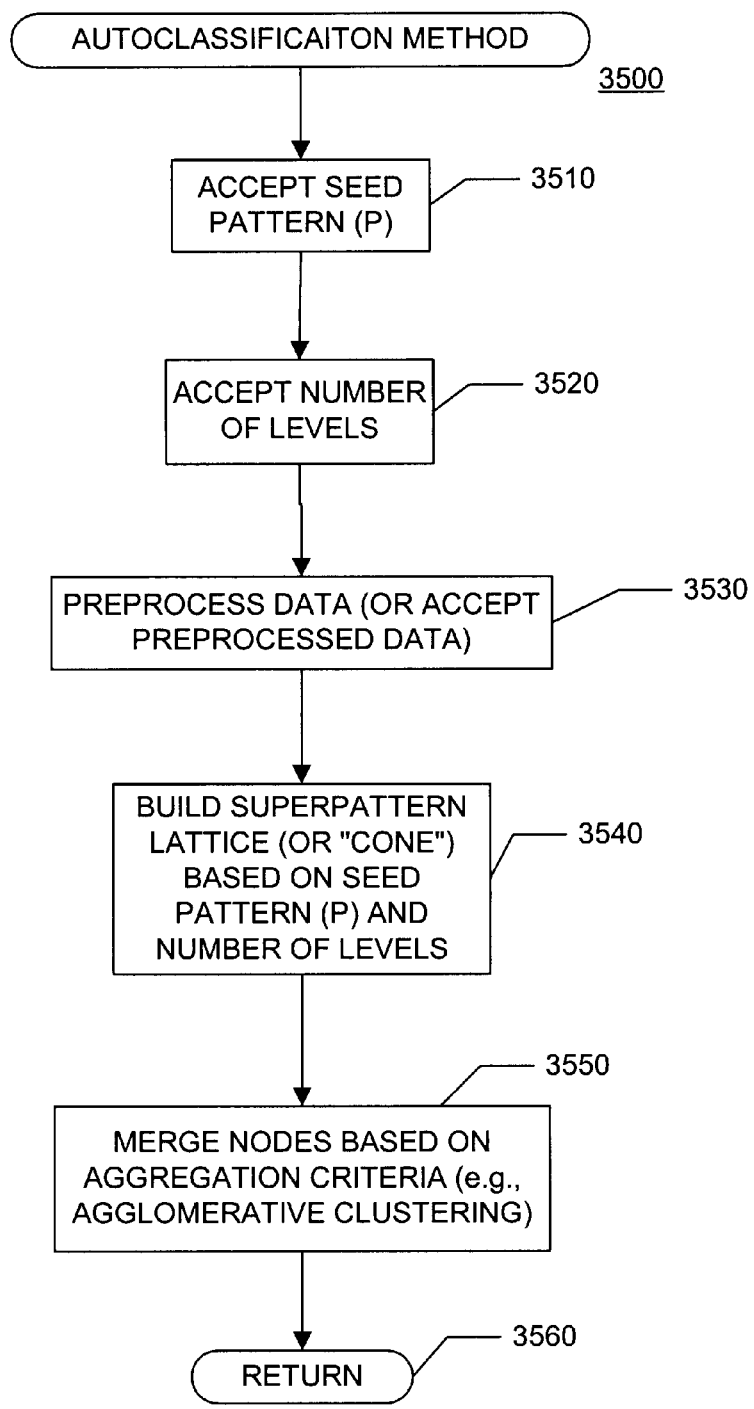

FIG. 35 is a flow diagram of a method for automatically classifying data.

Figure 36:
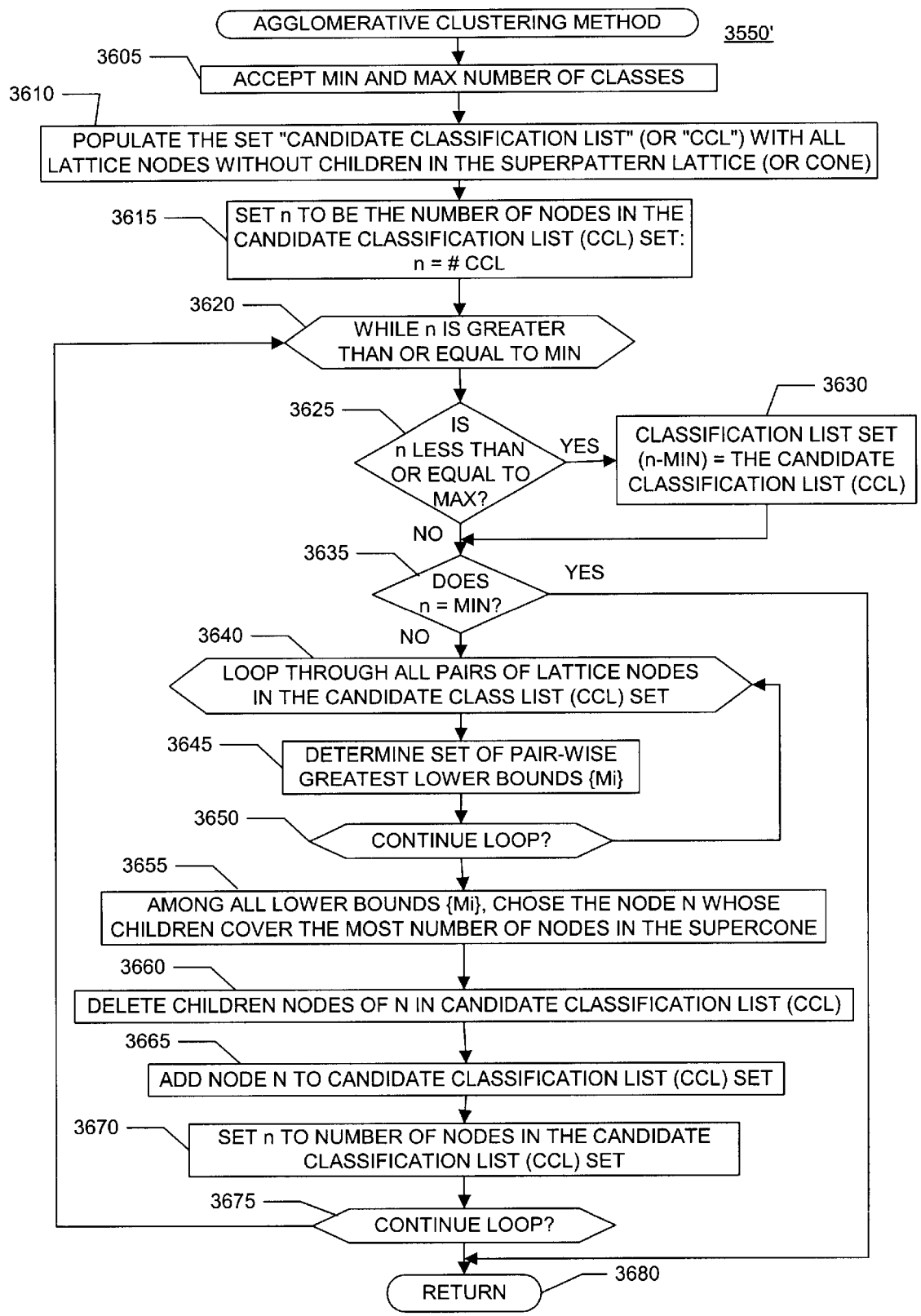

FIG. 36 is a flow diagram of an agglomerative clustering method that may be used by the method of FIG. 35.

Figure 37:
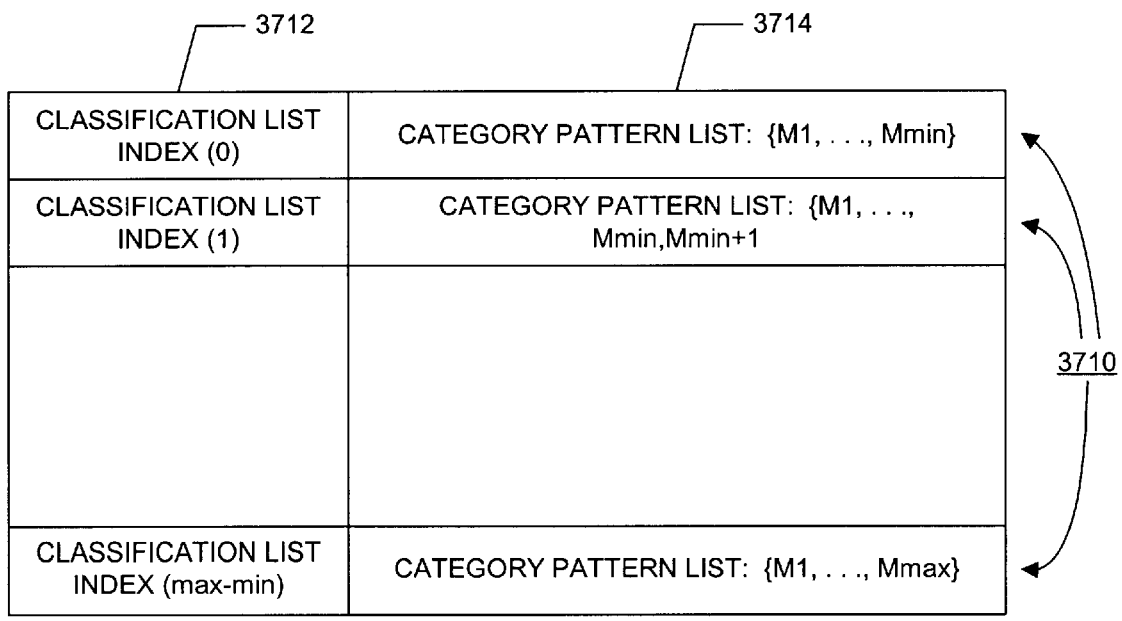

FIG. 37 illustrates a data structure of classification lists generated by the flow diagram of FIG. 36.

Figure 38:
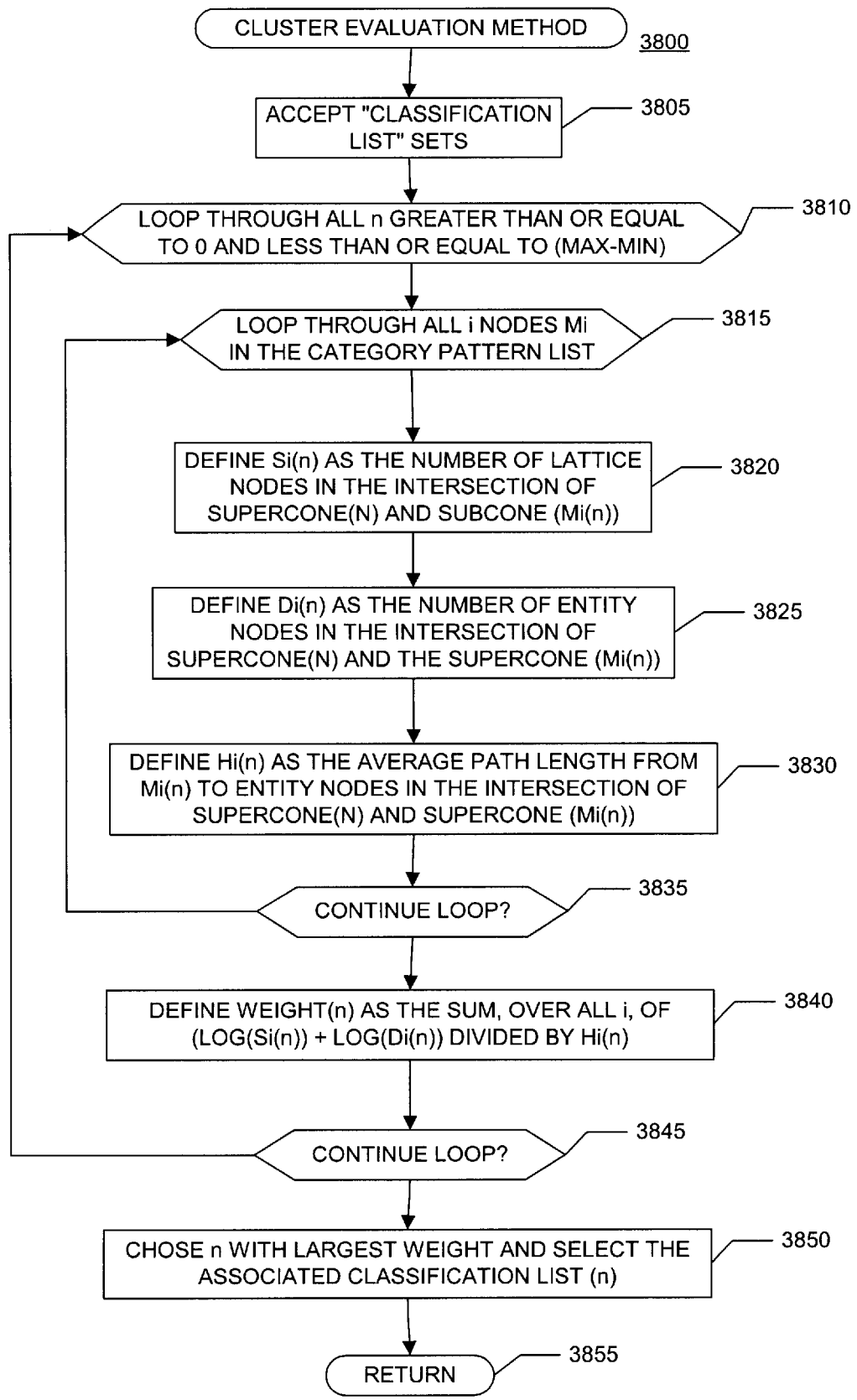

FIG. 38 is a flow diagram of a method for evaluating clusters, such as those generated by the method of FIG. 36.

Figure 39:
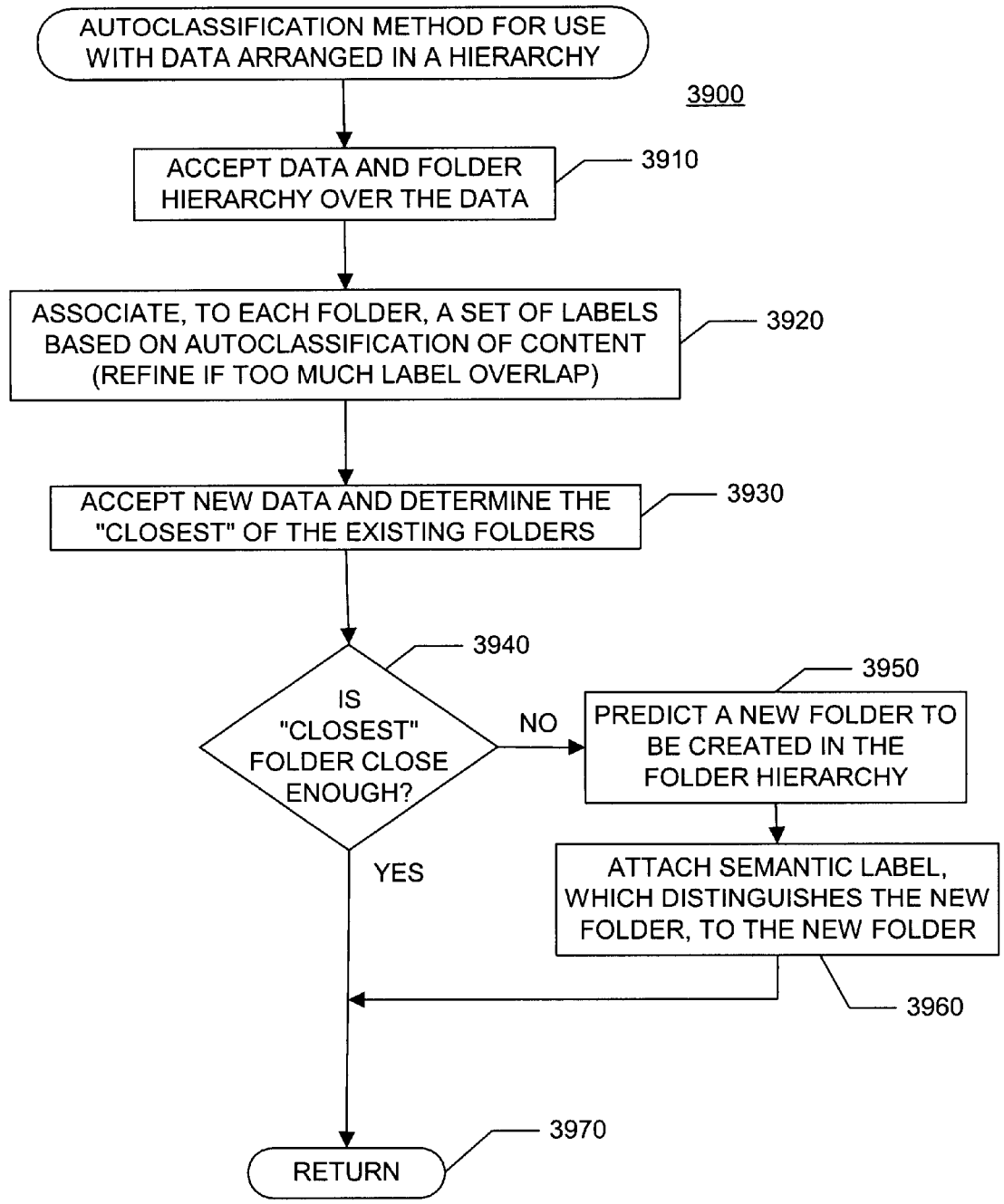

FIG. 39 is a flow diagram of a method for automatically classifying data to be arranged in a hierarchy.

Figure 40:
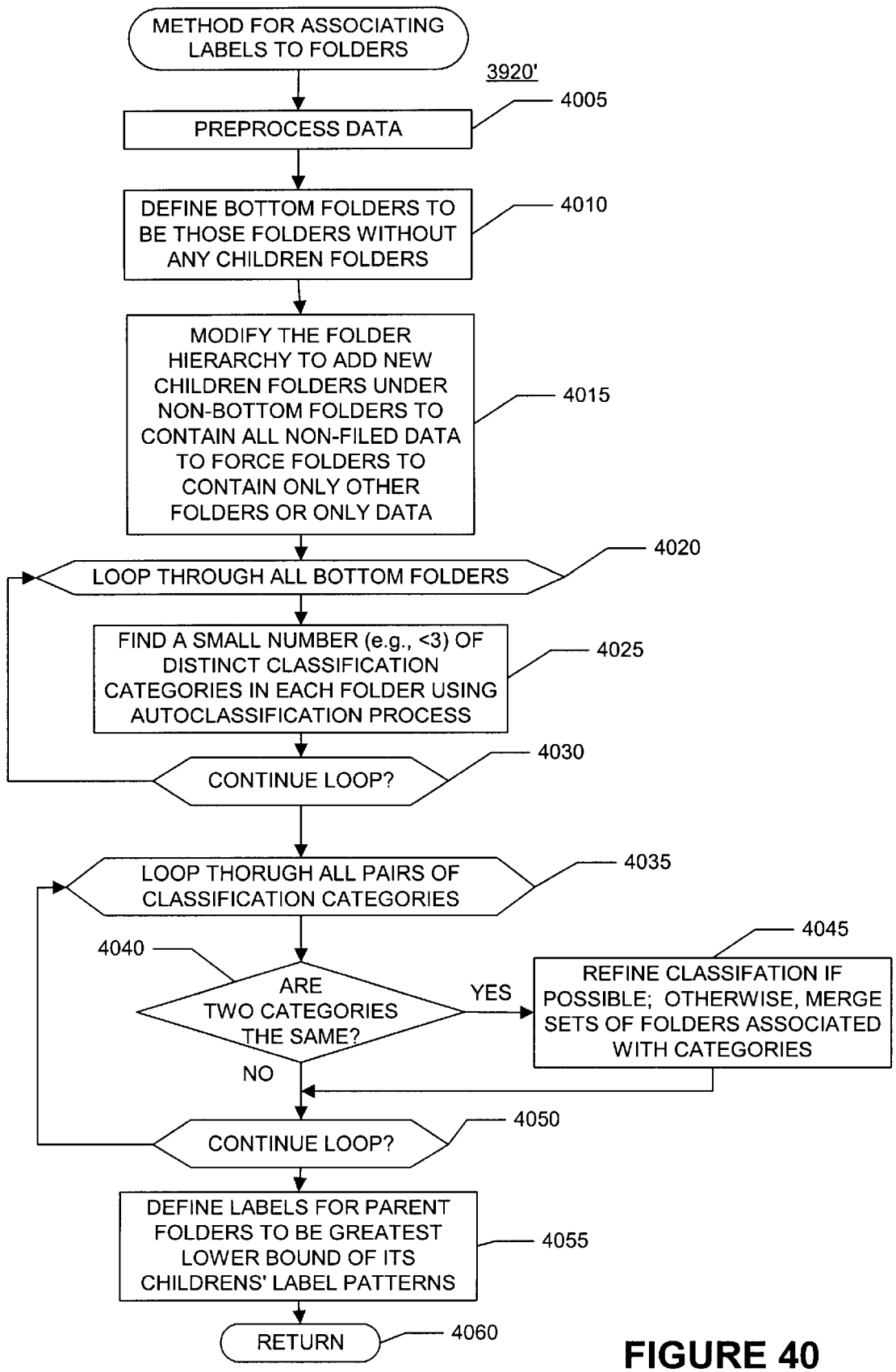

FIG. 40 is a flow diagram of a method for associating labels with folders, which may be used with the method of FIG. 39.

Figure 41:
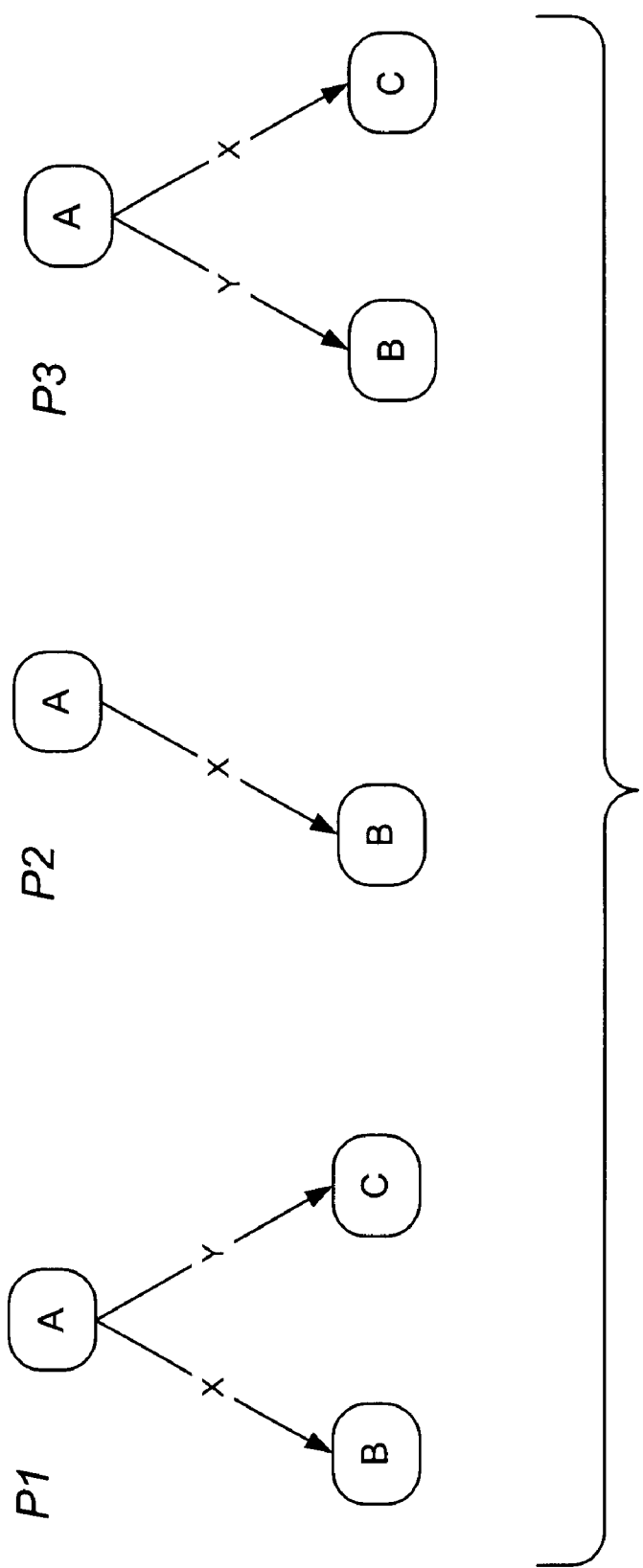

FIG. 41 are graphs which are used to illustrate differing concepts of similarity.

Figure 42:
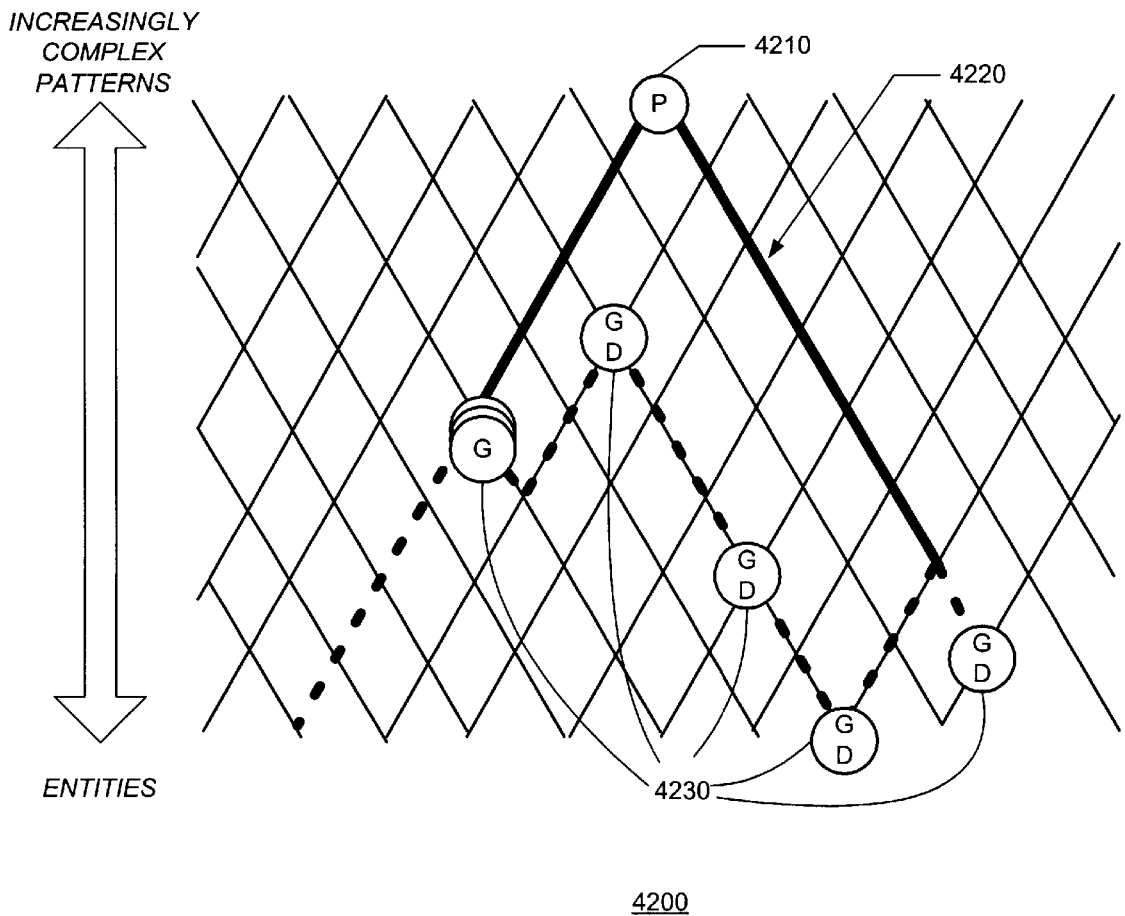

FIG. 42 illustrates a schematic of a subpattern cone (or lattice) constructed from a root lattice node and which reaches lattice nodes that represent patterns that either are subpatterns of data or the data patterns themselves.

Figure 43A:
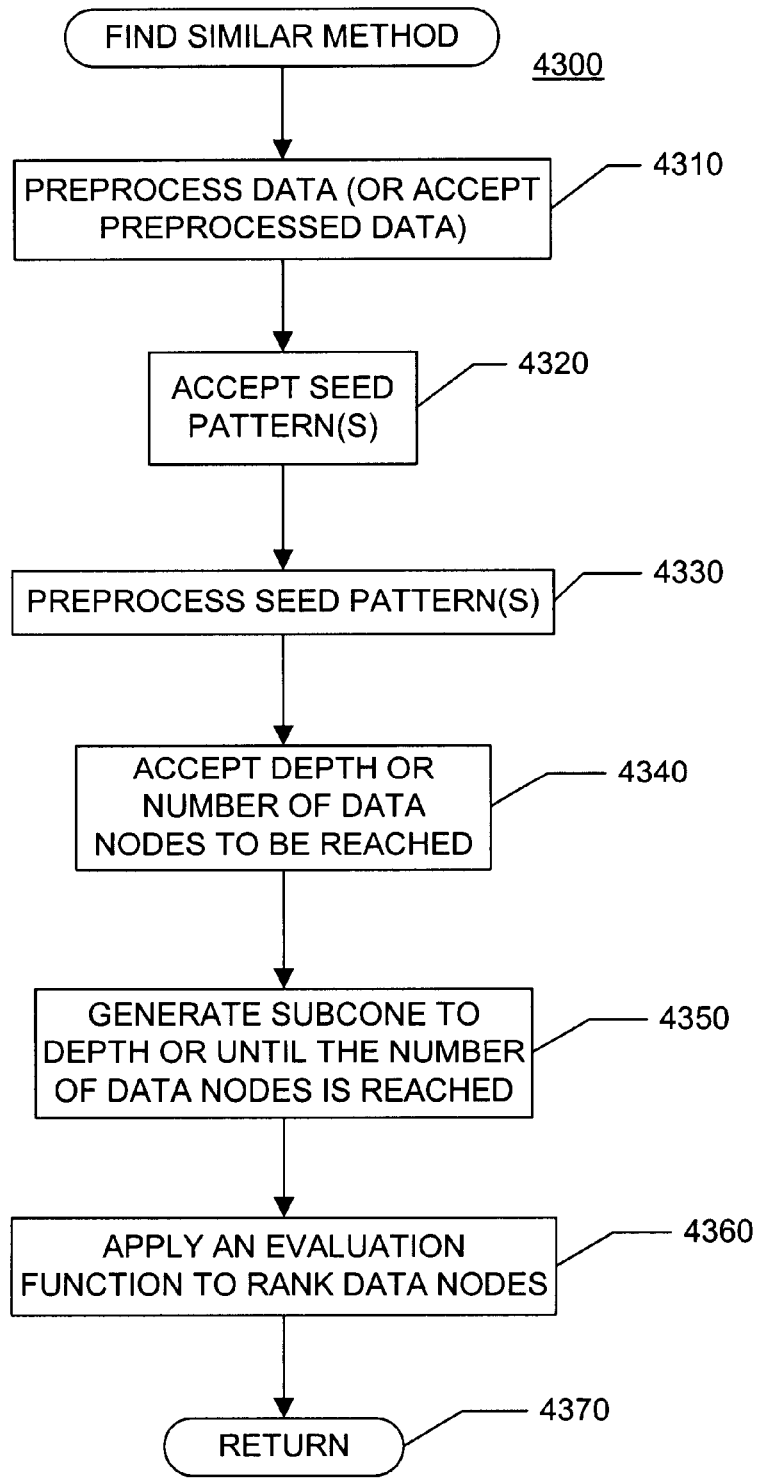
Figure 43B:
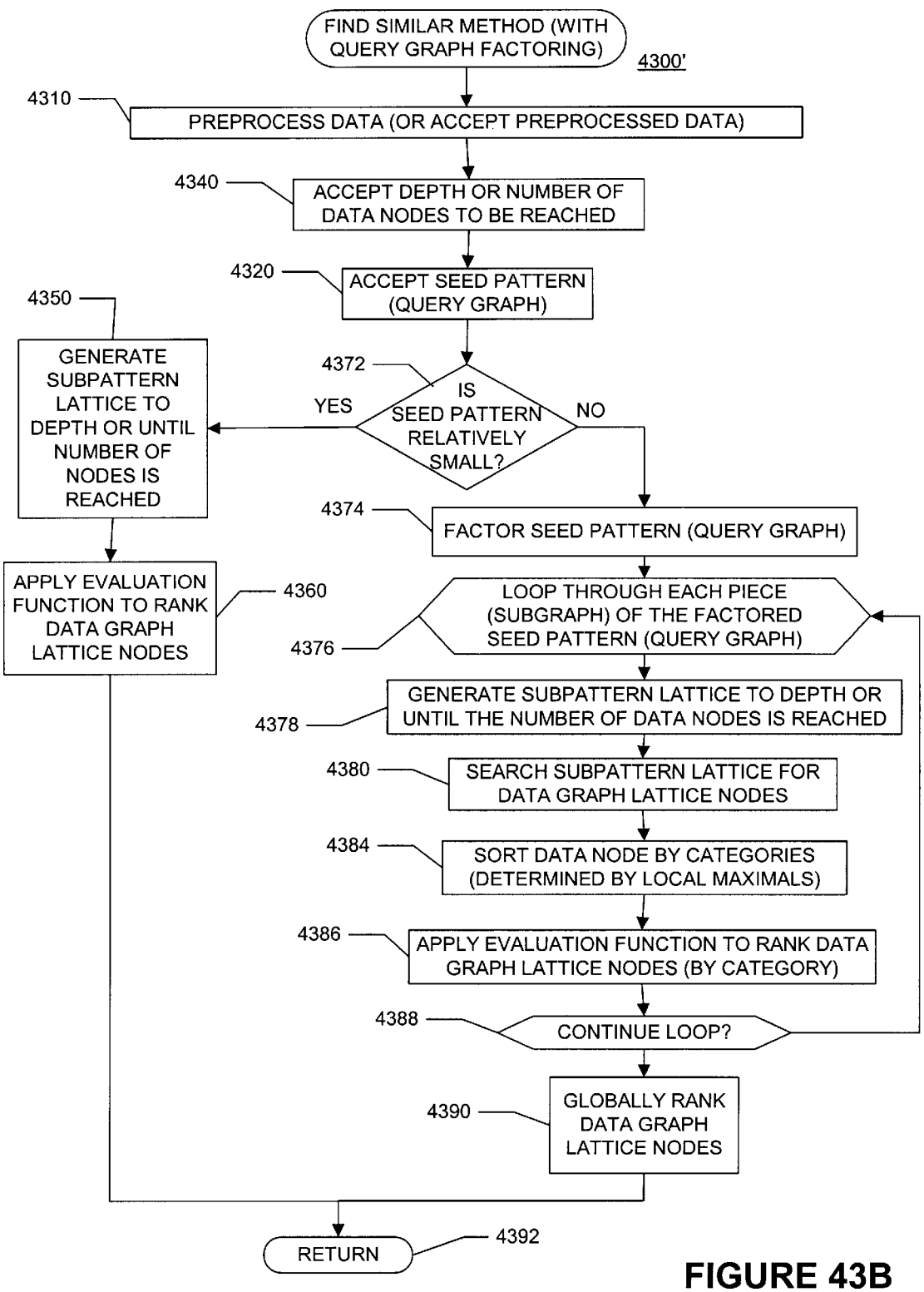

FIGS. 43A and 43B are flow diagrams of a method for finding data similar to a seed pattern.

Figure 44:
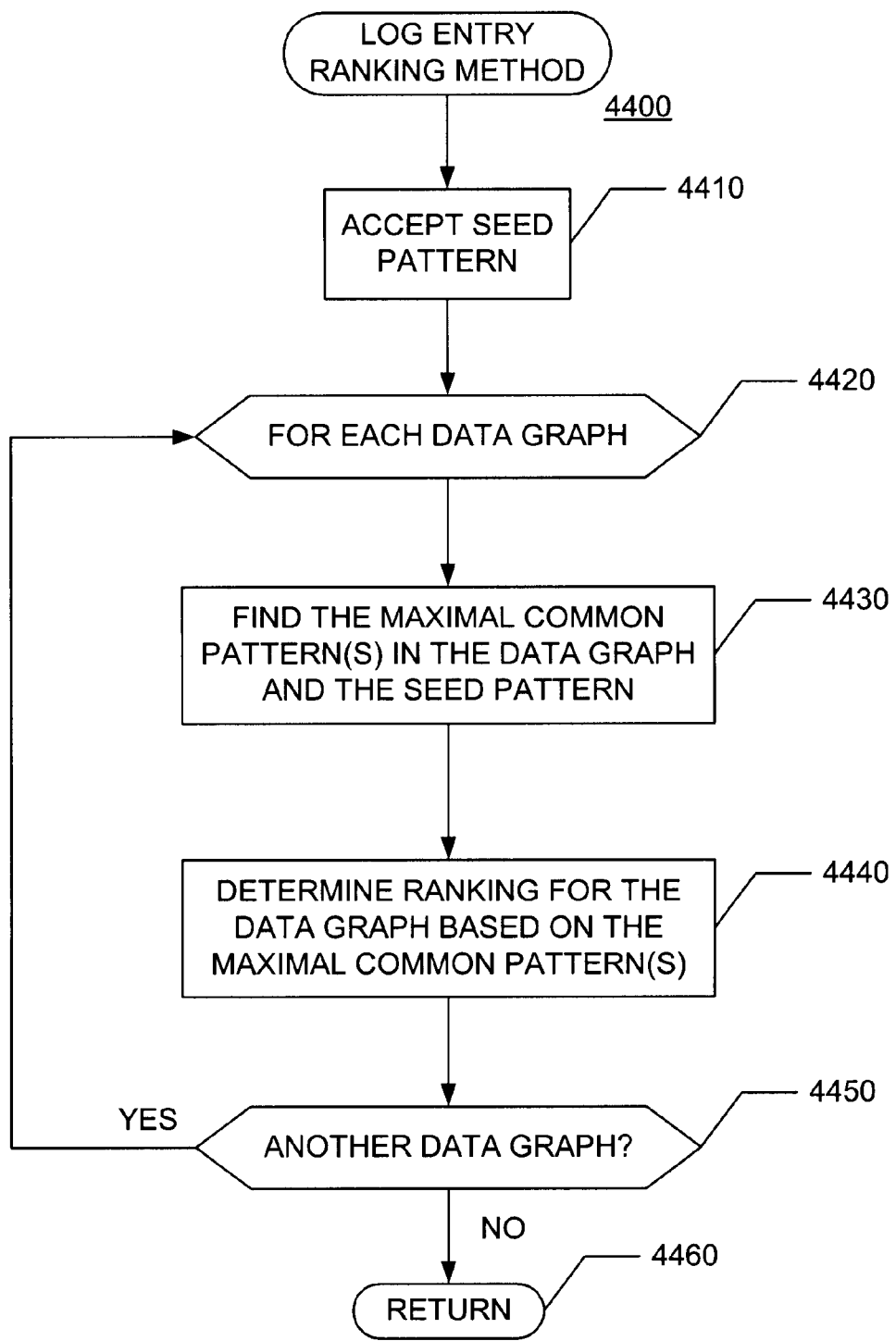

FIG. 44 is a flow diagram of a method for ranking log entries.

Figure 45:
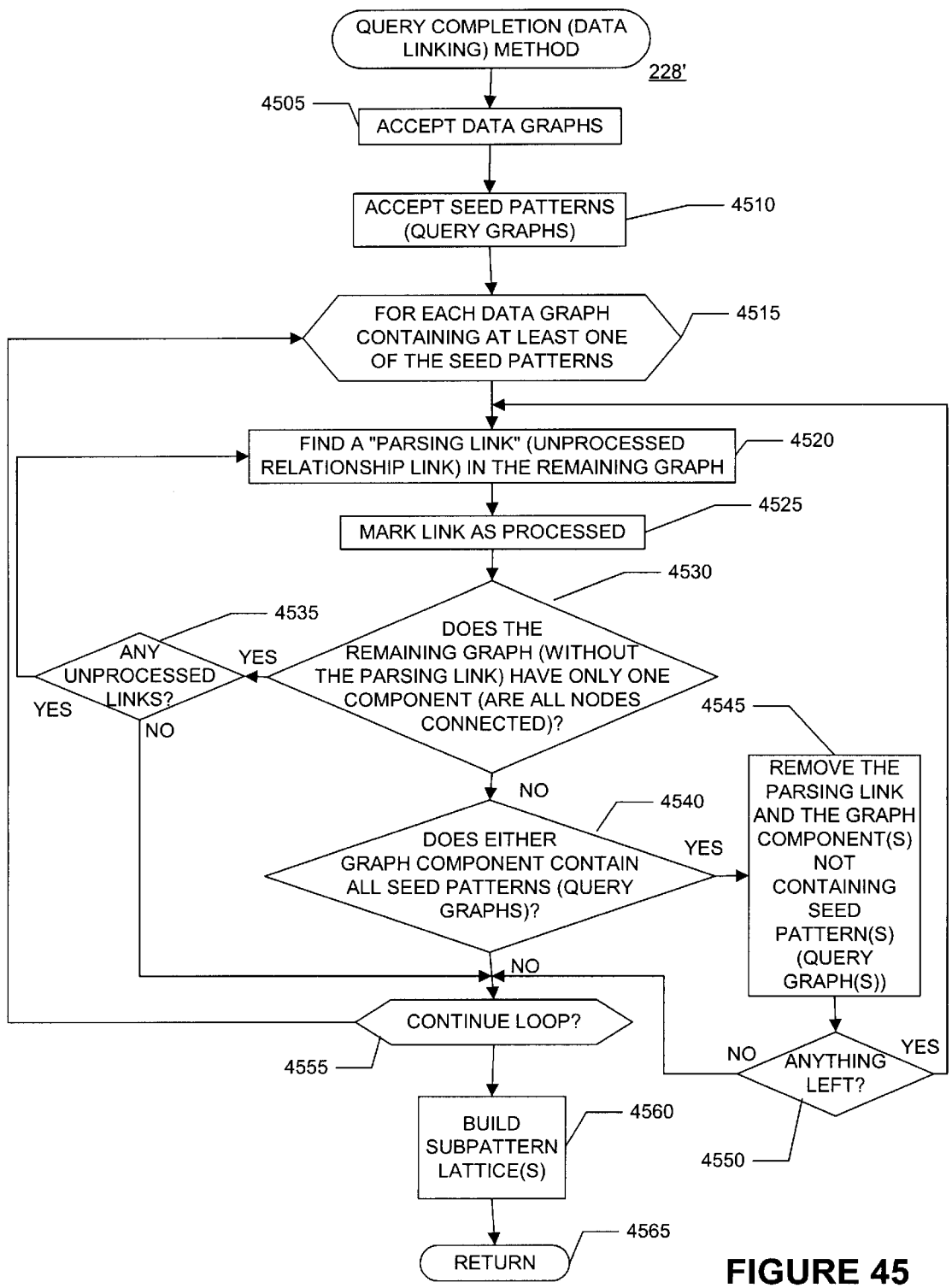

FIG. 45 is a flow diagram of a method for linking query graphs.

Figure 46:
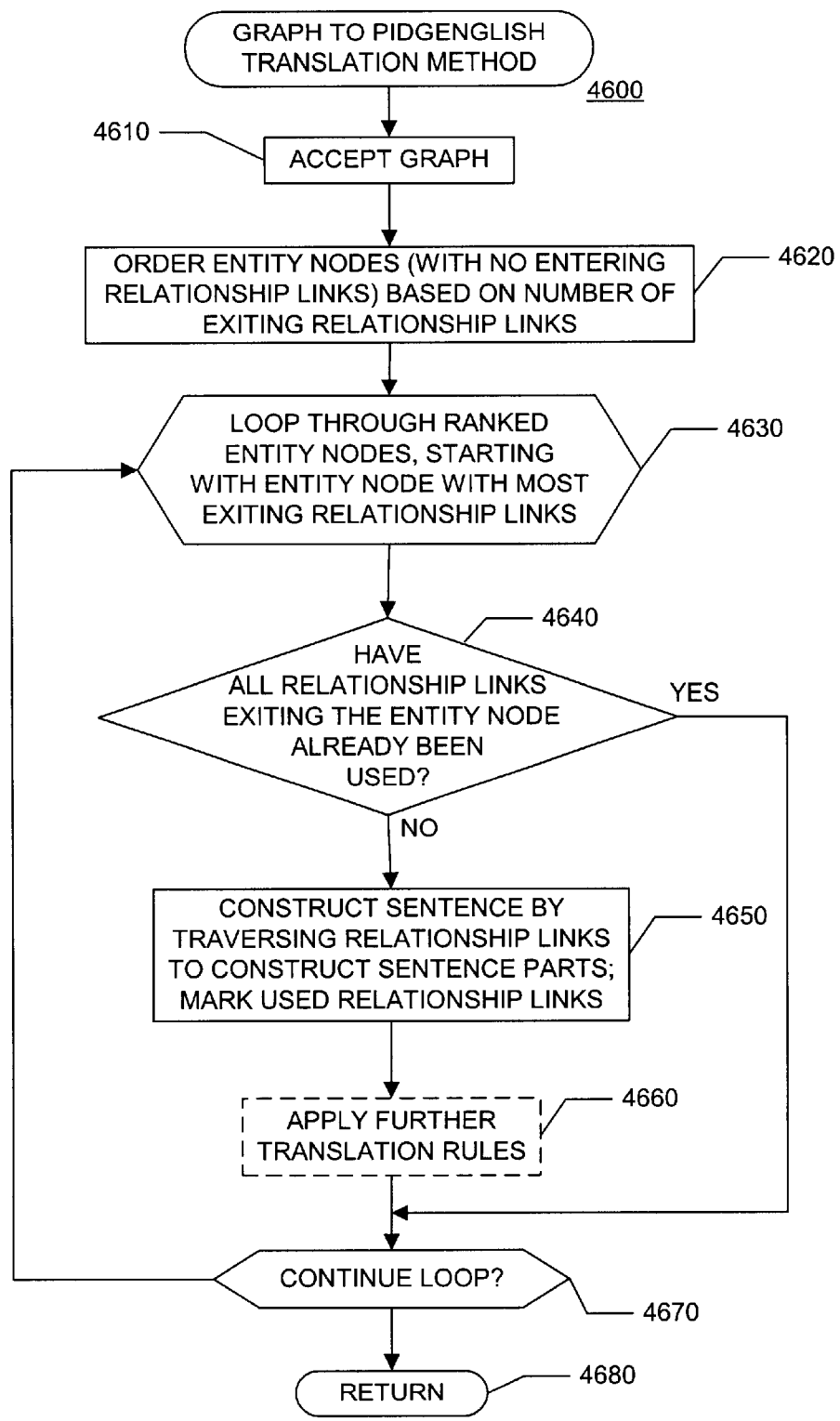

FIG. 46 is a flow diagram of a method for translating a graph to pidgin English.

FIG. 47 is a data structure which may be used to represent the graph of FIG. 8.

Figure 48:
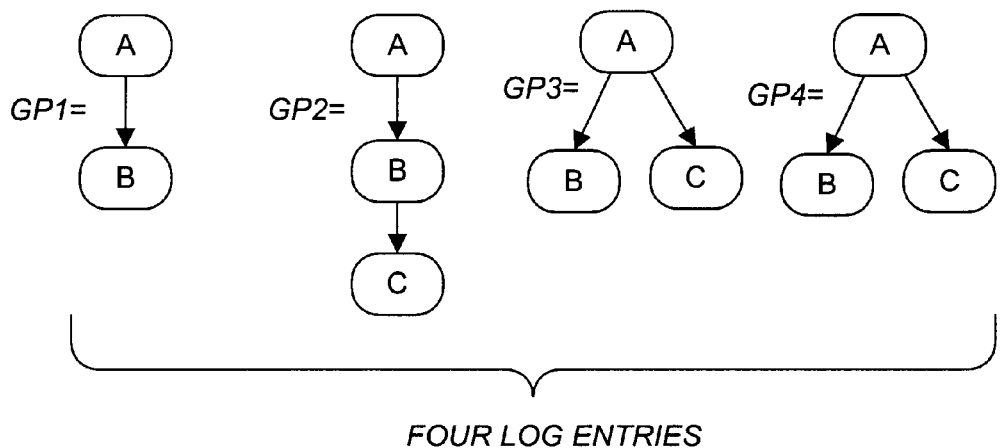

FIG. 48 are graphs of exemplary log entries which are used to illustrate various utilities that may be used by the present invention.

Figure 49:
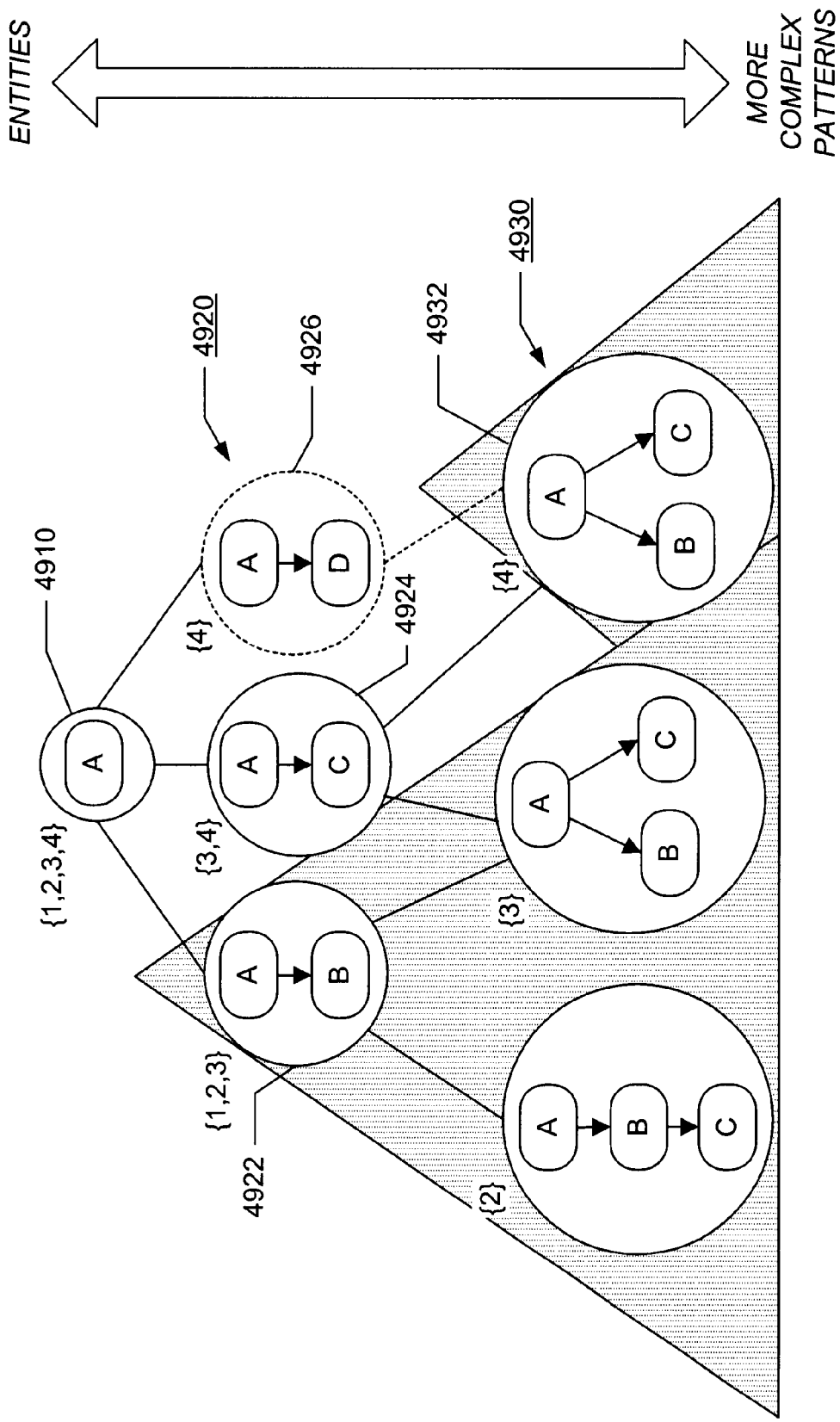

FIG. 49 is a diagram of a classification utility applied to the exemplary data of FIG. 48.

Figure 50:
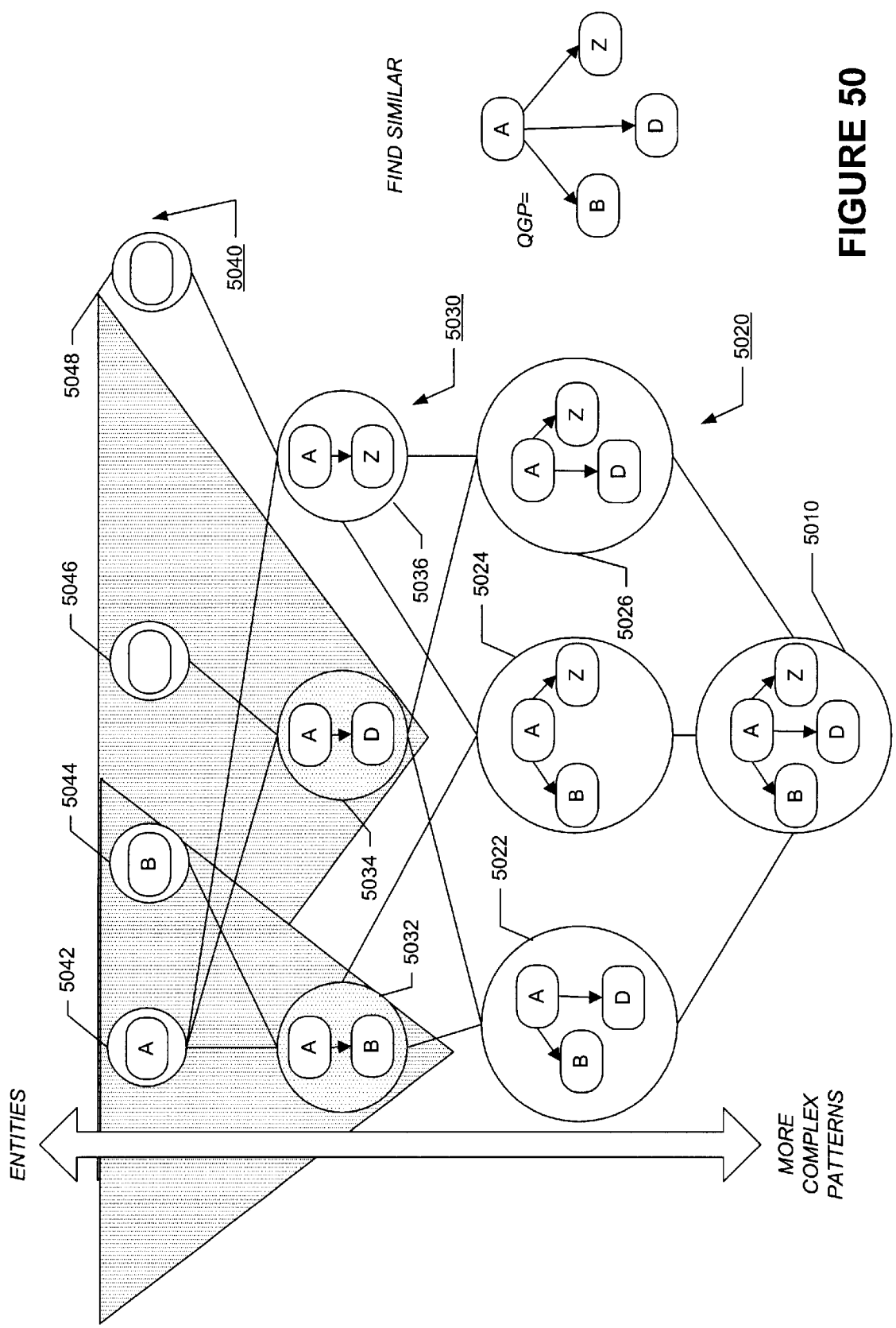

FIG. 50 is a diagram of a find similar utility applied to the exemplary data of FIG. 48.

Figure 51:
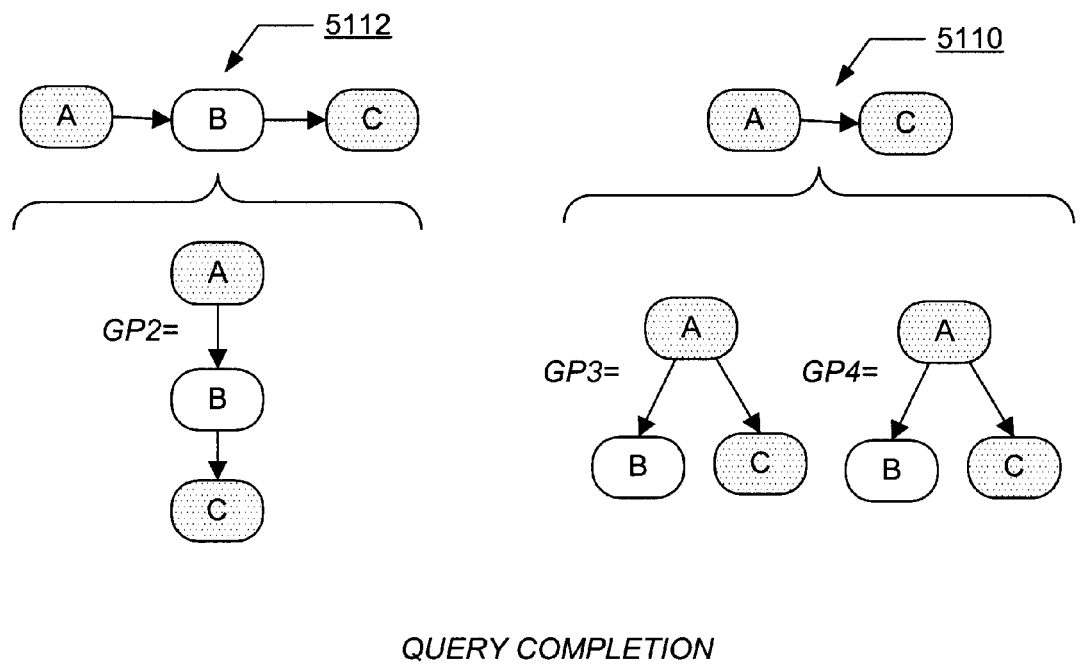

FIG. 51 is a diagram of a data linking (or query completion) utility applied to the exemplary data of FIG. 48.

Figure 52:
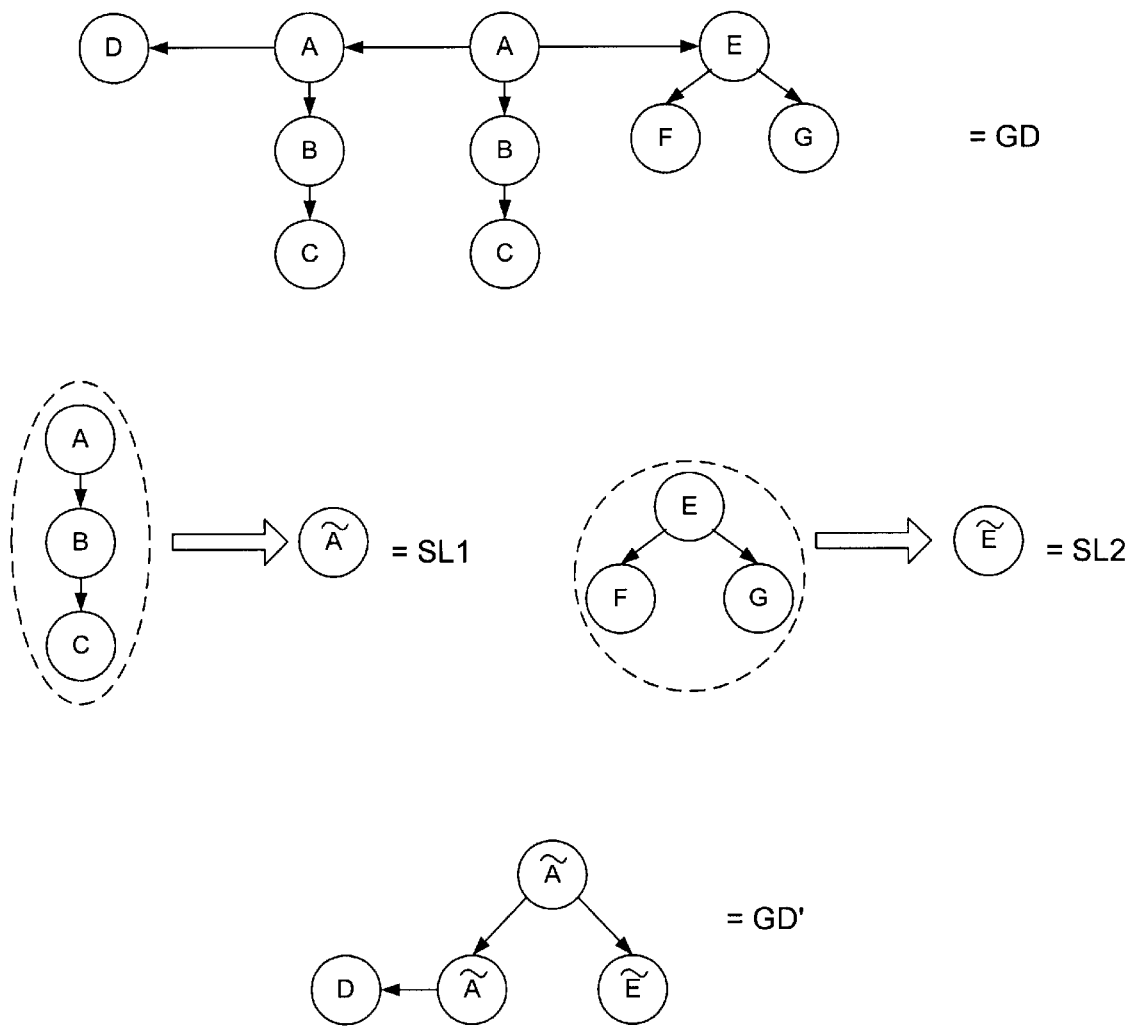

FIG. 52 illustrates a data reduction step in which data is classified with a set of semantic labels.

Figure 53:
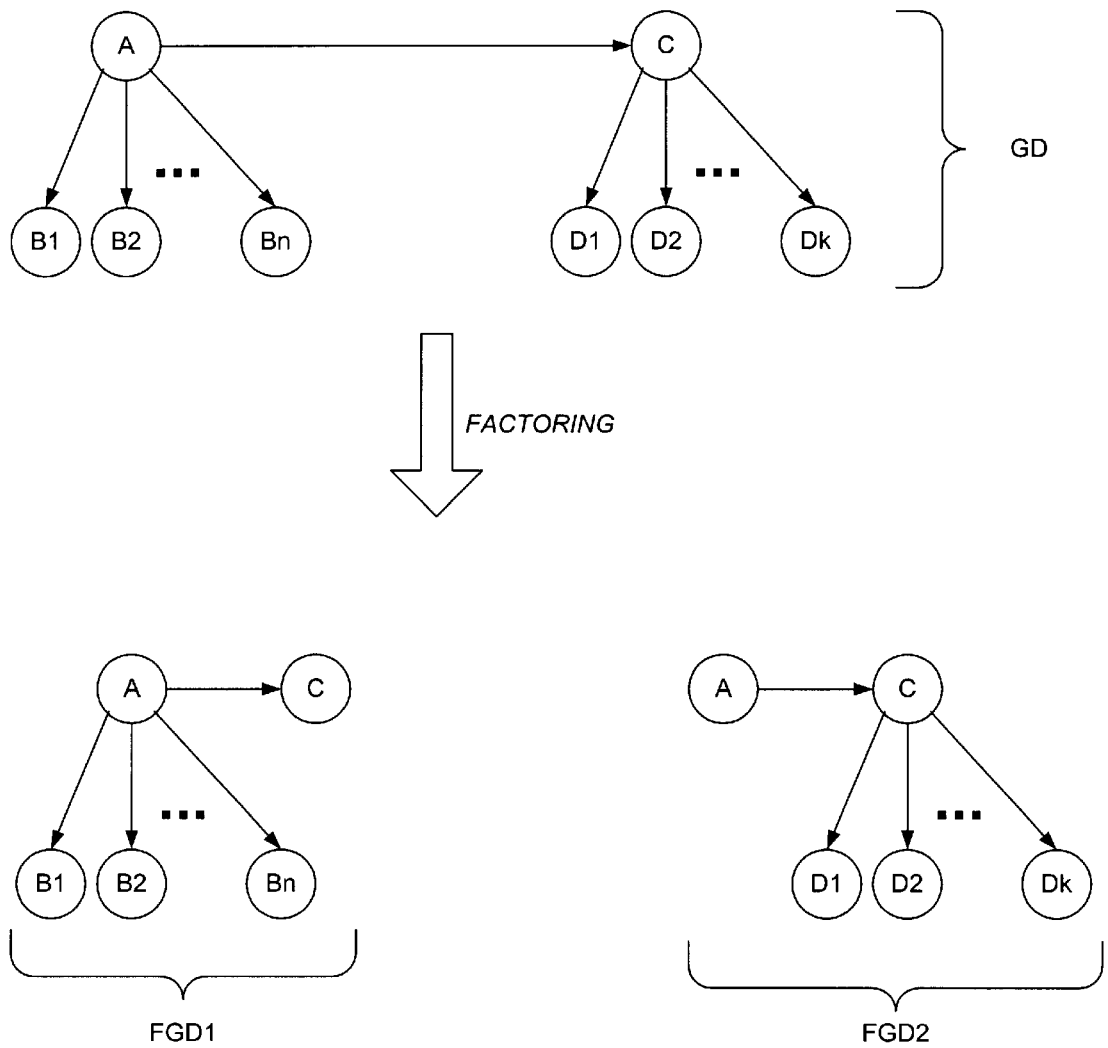

FIG. 53 illustrates the process of factoring a graph.

FIG. 54 illustrates input graphs.

FIG. 55 illustrates a complete superpattern cone.

FIG. 56 illustrates a minimally expanded superpattern cone generated in accordance with an alternative superpattern cone generation method.

Figure 57:
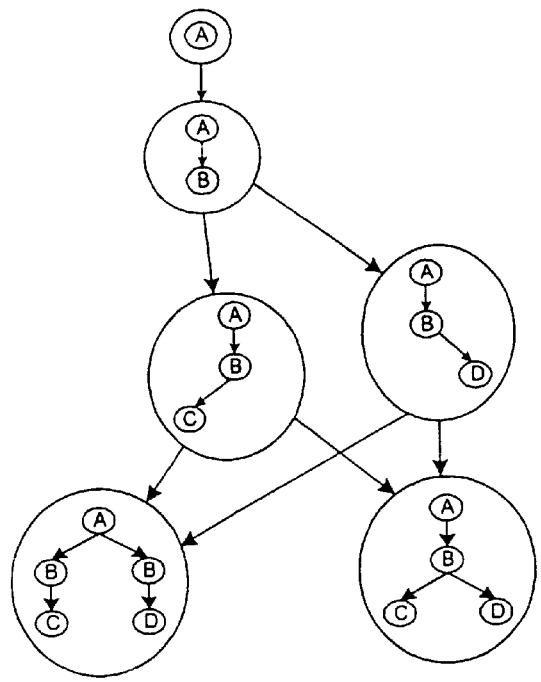

FIG. 57 illustrates the minimally expanded superpattern cone of FIG. 56 when cleaned.

Figure 58:
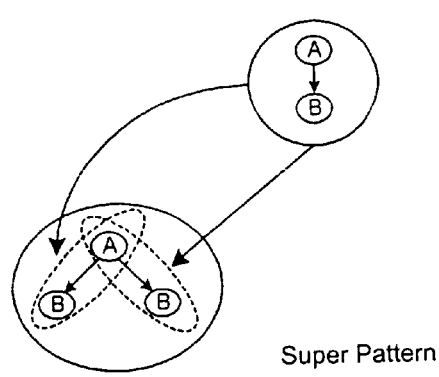

FIG. 58 illustrates multiple embeddings in a subpattern.

Figure 59:
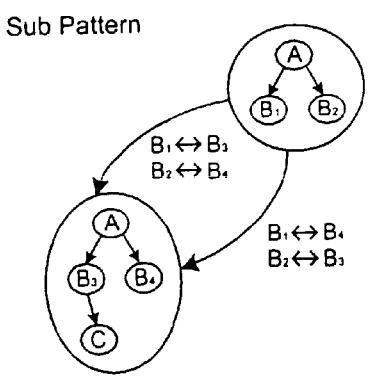

FIG. 59 illustrates multiple embeddings in a superpattern.

Figure 60:
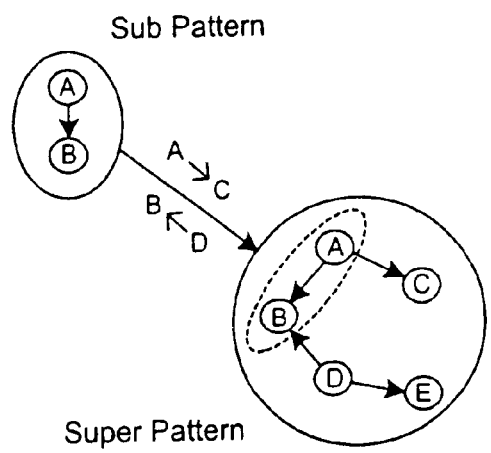

FIG. 60 illustrates frontier links

Figure 61:
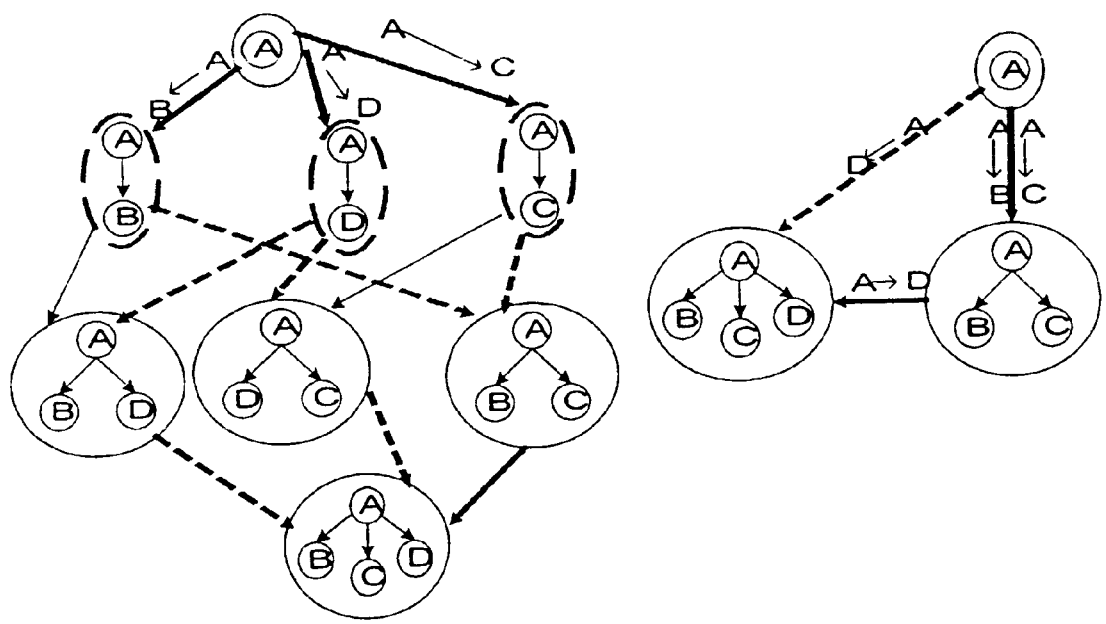

FIG. 61 illustrates the storage of expansion information at lattice edges.

Figure 62:
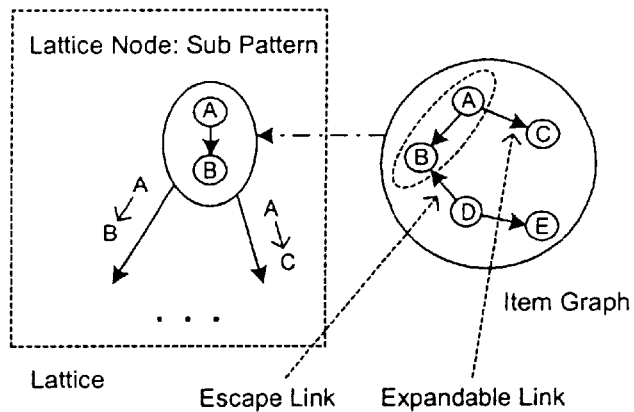

FIG. 62 illustrates an escape link and an expandable link.

FIGS. 63, 64, 65 and 66 illustrate the insertion of a pattern into a supercone pattern lattice.

§4. DETAILED DESCRIPTION

The present invention concerns a novel information or data representation space, novel techniques for managing structures built in the novel information or data representation space, novel utilities which use the novel information or data representation space, and a novel application and user interface which use the novel utilities. The following description is presented to enable one skilled in the art to make and use the invention, and is provided in the context of a particular application (managing usage data) and its requirements. Various modifications to the disclosed embodiments will be apparent to those skilled in the art, and the general principles set forth below may be applied to other embodiments and applications. Thus, the present invention is not intended to be limited to the embodiments shown.

Functions which may be performed by the present invention are introduced in §4.1 below. Then, data structures, methods, and apparatus for performing those functions are described in §4.2.

The following is an outline of the detailed description:

| | | |
|---|---|---|
| § 4.1 | FUNCTIONS WHICH MAY BE PERFORMED | |
| § 4.2 | METHODS, APPARATUS, AND DATA STRUCTURES | |
| | § 4.2.1 OPERATING ENVIRONMENT | |
| | § 4.2.2 PROCESSES | |
| | § 4.2.3 (USAGE) DATA REPRESENTATION | |
| | § 4.2.4 PATTERN LATTICE DATA SPACE: A DATA | |
| | § 4.2.5 MANAGING OR REDUCING THE COMPLEXITY | |
| | § 4.2.5.1 PREPROCESSING DATA | |
| | § 4.2.5.1.1 | INSTANCE VALUES |
| | § 4.2.5.1.2 | VIRTUALIZING LOG DATA |
| | § 4.2.5.1.3 | PATTERN RESTRICTIONS: LEGAL AND CONNECTED PATTERNS |
| | § 4.2.5.2 LATTICE TRIMMING | |
| | § 4.2.5.2.1 ANCESTOR ELIMINATION | |
| | § 4.2.5.2.2 SIBLING ELIMINATION | |
| | § 4.2.5.3 | BALANCING PRE-COMPUTATION AND RUN TIME COMPUTATION OF THE PATTERN LATTICE |
| | § 4.2.5.3.1 | LAZY EXPANSION (EXPANSION AS NEEDED) |
| | § 4.2.5.3.2 | INCREMENTAL AND BATCH UPDATES |
| | §4.2.5.4 | TECHNIQUES FOR MAINTAINING LATTICE STATISTICS: HISTOGRAMS OVER THE LATTICE |
| | § 4.2.6 | PATTERN LATTICE TOOLS: BUILDING USEFUL LATTICE STRUCTURES |
| | § 4.2.6.1 ADDING LATTICE NODES | |
| | § 4.2.6.2 MANAGING SUPERPATTERN CONES | |
| | § 4.2.6.2.1 | SUPERPATTERN CONE DEFINITION |
| | § 4.2.6.2.2 | FACTORS AFFECTING THE COMPLEXITY OF A SUPERPATTERN CONE AND OF BUILDING A SUPERPATTERN CONE |
| | § 4.2.6.2.3 | EXEMPLARY METHODS FOR GENERATING A SUPERPATTERN CONE |
| | § 4.2.6.2.3.1 | ALTERNATIVE METHOD FOR GENERATING A SUPERPATTERN CONE |
| | § 4.2.6.3 MANAGING SUBPATTERN CONES | |
| | § 4.2.6.3.1 | SUBPATTERN CONE DEFINITION |
| | § 4.2.6.3.2 | FACTORS AFFECTING COMPLEXITY OF SUBPATTERN CONES |
| | § 4.2.6.3.3 | EXEMPLARY METHODS FOR GENERATING A SUBPATTERN LATTICE |
| | § 4.2.7 UTILITIES USING PATTERN LATTICE | |
| | § 4.2.7.1 CLASSIFIER (AND CLUSTERER) | |
| | § 4.2.7.1.1 | FEATURES OF THE EXEMPLARY CLASSIFICATION METHODS |
| | § 4.2.7.1.2 | OVERVIEW OF CLASSIFICATION USING A SUPERPATTERN LATTICE STRUCTURE |

-continued

| | |
|---|---|
| § 4.2.7.2 | SEARCH (FIND SIMILAR DATA) |
| § 4.2.7.3 | QUERY COMPLETION (DATA LINKER) |
| § 4.2.7.4 | CONVERTING GRAPH LABELS TO ENGLISH EXPRESSIONS |

§4.1 Functions Which May be Performed

The present invention defines a pattern lattice data space as a framework for analyzing data in which both schema-based and statistical analysis are accommodated. In this way, the limitations of schema-based and statistical analysis, when used alone (Recall §1.2.3 above.), are overcome. The pattern lattice data space is defined in §4.2.4 below.

Since the computational complexity of representing all possible permutations of related entities on a pattern lattice data space becomes enormous, the present invention may function to manage the size of the lattice structures in the pattern lattice data space. That is, in most instances, only sections or fragments of the pattern lattice data space are generated. Exemplary methods for managing lattice structures to constrain their size are disclosed in §4.2.5 below.

The present invention may also function to classify or cluster, search (find similar data), or relate data using lattice fragments in the pattern lattice data space. Methods for performing these functions are disclosed in §4.2.7 below.

The present invention also defines a superpattern cone or lattice generation function which may be used by the classification and clustering functions. In addition, the present invention defines a subpattern cone or lattice generation process which may be used by the search (find similar data) and data relating functions. The superpattern and subpattern generation functions are described in §4.2.6 below.

Finally, the present invention may also function to label, in readily understandable "pidgin", categories which classify information. Methods for performing this function are disclosed in §4.2.7.4 below.

§4.2 Methods, Apparatus, and Data Structures

In the following, an exemplary environment on which at least some aspects of the present invention may be performed, is disclosed in §4.2.1. An overview of processes which may be performed to effect at least some aspects of the present invention is then disclosed in §4.2.2. Next, a graphical representation of usage data, which is used in various places to illustrate various aspects of the present invention, is disclosed in §4.2.3. Thereafter, a pattern lattice framework is defined in §4.2.4. Subsequently, various techniques for managing lattices built on the pattern lattice data space are disclosed in §4.2.5. Then, techniques for generating useful lattice structures in the pattern lattice data space are disclosed in §4.2.6. Finally, various utilities, such as a classifier and clusterer, a linker, and a searcher, for example, which use lattice structures in the pattern lattice data space, are disclosed in §4.2.7.

§4.2.1 Operating Environment

Figure 1A:
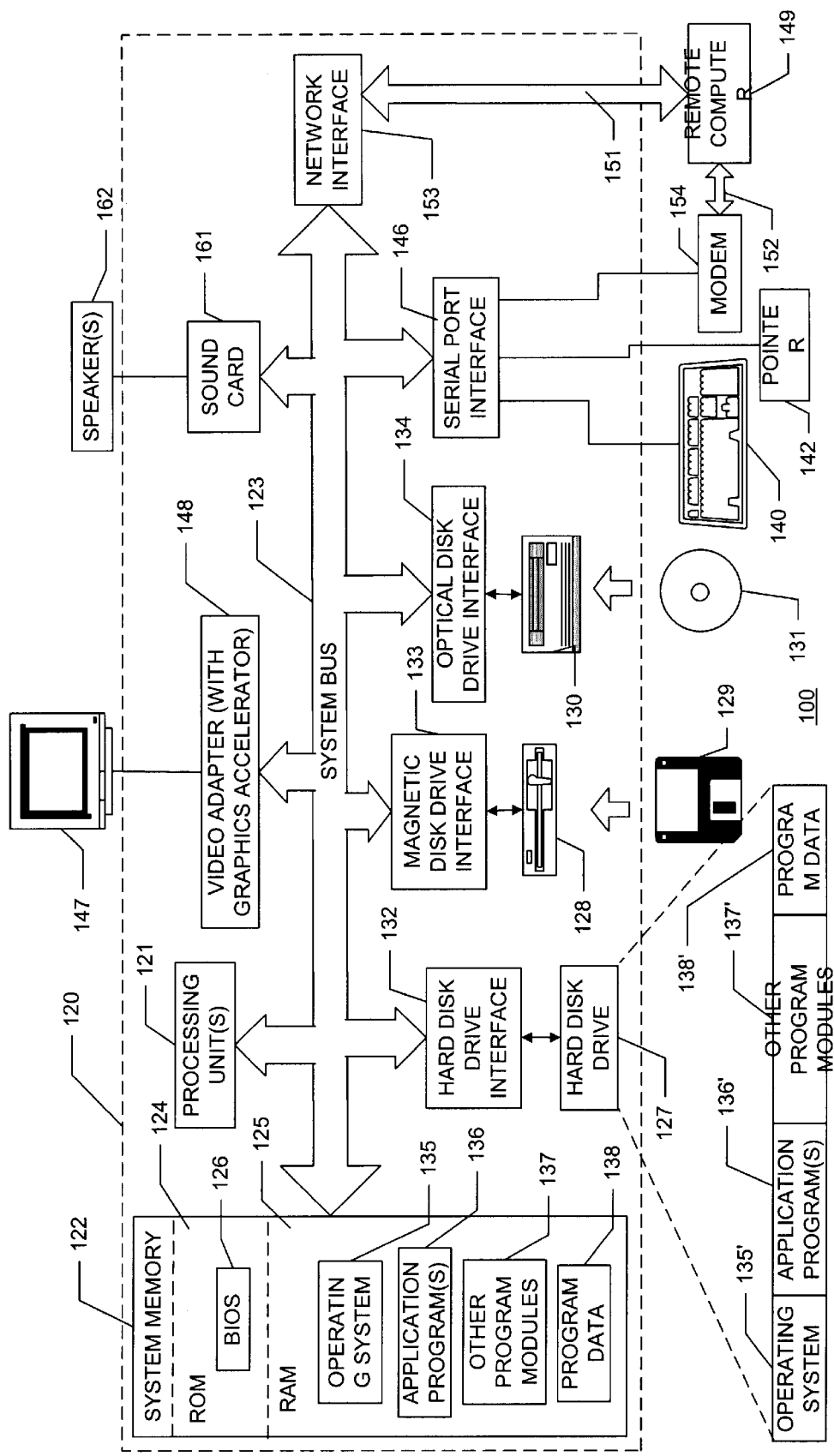
FIGS. 1A and 1B are block diagrams of a personal computing environment in which at least some aspects of the present invention may operate.

FIG. 1A and the following discussion provide a brief, general description of an exemplary apparatus in which at least some aspects of the present invention may be implemented. The present invention will be described in the general context of computer-executable instructions, such as program modules, being executed by a personal computer. However, the methods of the present invention may be effected by other apparatus. Program modules may include routines, programs, objects, components, data structures, etc. that perform a task(s) or implement particular abstract data types. Moreover, those skilled in the art will appreciate that at least some aspects of the present invention may be practiced with other configurations, including hand-held devices, multiprocessor systems, microprocessor-based or programmable consumer electronics, network computers, minicomputers, set top boxes, mainframe computers, and the like. At least some aspects of the present invention may also be practiced in distributed computing environments where tasks are performed by remote processing devices linked through a communications network. In a distributed computing environment, program modules may be located in local and/or remote memory storage devices.

With reference to FIG. 1A, an exemplary apparatus 100 for implementing at least some aspects of the present invention includes a general purpose computing device in the form of a conventional personal computer 120. The personal computer 120 may include a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory may include read only memory (ROM) 124 and/or random access memory (RAM) 125. A basic input/output system 126 (BIOS), containing basic routines that help to transfer information between elements within the personal computer 120, such as during start-up, may be stored in ROM 124. The personal computer 120 may also include a hard disk drive 127 for reading from and writing to a hard disk, (not shown), a magnetic disk drive 128 for reading from or writing to a (e.g., removable) magnetic disk 129, and an (magneto-) optical disk drive 130 for reading from or writing to a removable (magneto) optical disk 131 such as a compact disk or other (magneto) optical media. The hard disk drive 127, magnetic disk drive 128, and (magneto) optical disk drive 130 may be coupled with the system bus 123 by a hard disk drive interface 132, a magnetic disk drive interface 133, and a (magneto) optical drive interface 134, respectively. The drives and their associated storage media provide non-volatile storage of machine readable instructions, data structures, program modules and other data for the personal computer 120. Although the exemplary environment described herein employs a hard disk, a removable magnetic disk 129 and a removable (magneto) optical disk 131, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above.

A number of program modules may be stored on the hard disk 123, magnetic disk 129, (magneto) optical disk 131, ROM 124 or RAM 125, such as an operating system 135, one (1) or more application programs 136, other program modules 137, and/or program data 138 for example. A user may enter commands and information into the personal computer 120 through input devices, such as a keyboard 140 and pointing device 142 for example. Other input devices (not shown) such as a microphone, joystick, game pad, satellite dish, scanner, or the like may also be included. These and other input devices are often connected to the processing unit 121 through a serial port interface 146 coupled to the system bus. However, input devices may be connected by other interfaces, such as a parallel port, a game port or a universal serial bus (USB). A monitor 147 or other type of display device may also be connected to the system bus 123 via an interface, such as a video adapter 148 for example. In addition to the monitor, the personal computer 120 may include other peripheral output devices (not shown), such as speakers and printers for example.

The personal computer 120 may operate in a networked environment which defines logical connections to one (1) or more remote computers, such as a remote computer 149. The remote computer 149 may be another personal computer, a server, a router, a network PC, a peer device or other common network node, and may include many or all of the elements described above relative to the personal computer 120, although only a memory storage device 150 has been illustrated in FIG. 1A. The logical connections depicted in FIG. 1A include a local area network (LAN) 151 and a wide area network (WAN) 152, an intranet and the Internet.

When used in a LAN, the personal computer 120 may be connected to the LAN 151 through a network interface adapter (or "NIC") 153. When used in a WAN, such as the Internet, the personal computer 120 may include a modem 154 or other means for establishing communications over the wide area network 152. The modem 154, which may be internal or external, may be connected to the system bus 123 via the serial port interface 146. In a networked environment, at least some of the program modules depicted relative to the personal computer 120 may be stored in the remote memory storage device. The network connections shown are exemplary and other means of establishing a communications link between the computers may be used.

Figure 1B:
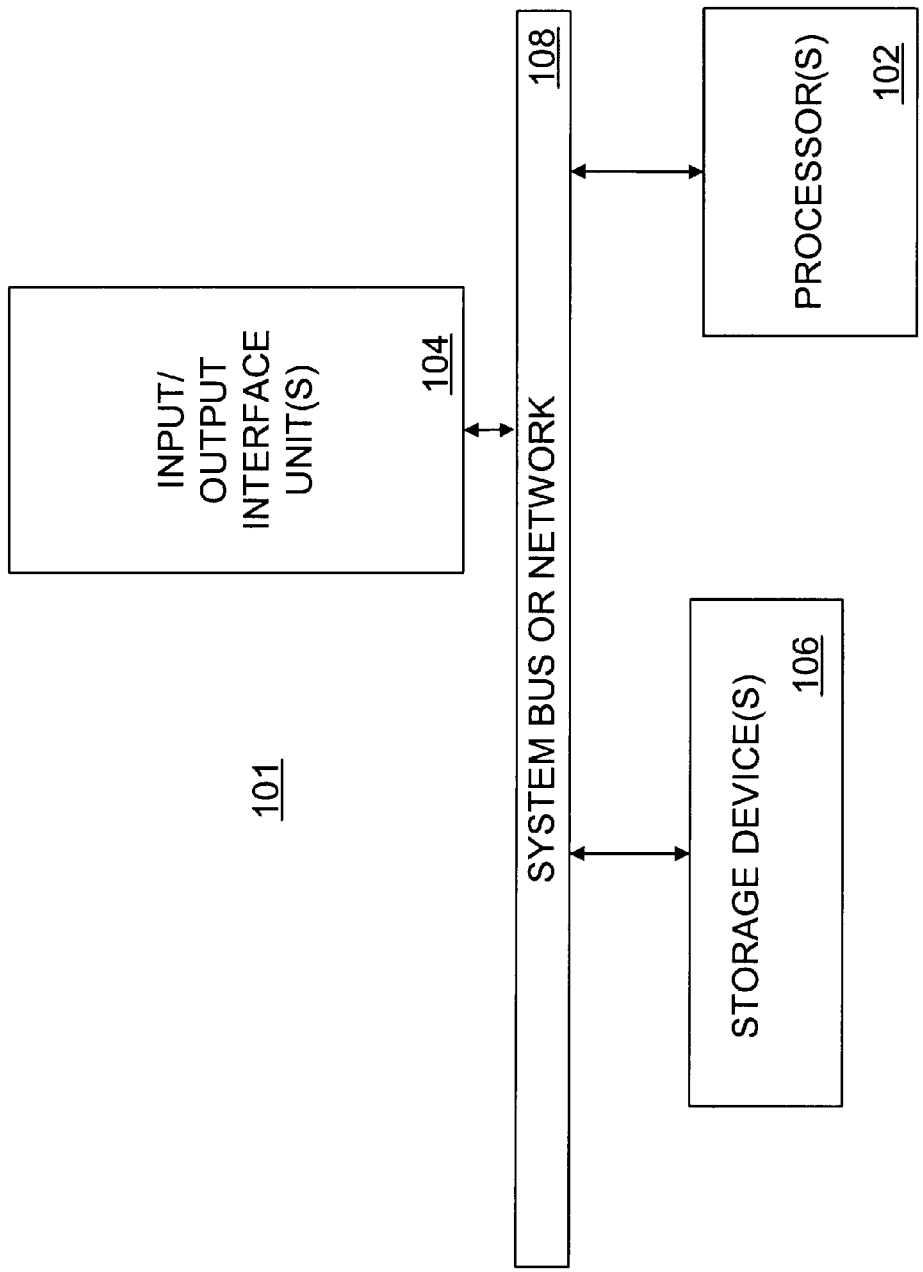

FIG. 1B is a more general machine 101 which may effect one (1) or more of the processes discussed above. The machine 100' basically includes a processor(s) 102, an input/output interface unit(s) 104, a storage device(s) 106, and a system bus or network 108 for facilitating data and control communications among the coupled elements. The processor(s) 102 may execute machine-executable instructions to effect one (1) or more aspects of the present invention. At least a portion of the machine executable instructions may be stored (temporarily or more permanently) on the storage device(s) 106 and/or may be received from an external source via an input interface unit 104.

Having described apparatus which may be used to effect at least some aspects of the present invention, processes which may be performed are now described in §4.2.2 below.

§4.2.2 Processes

Figure 2:
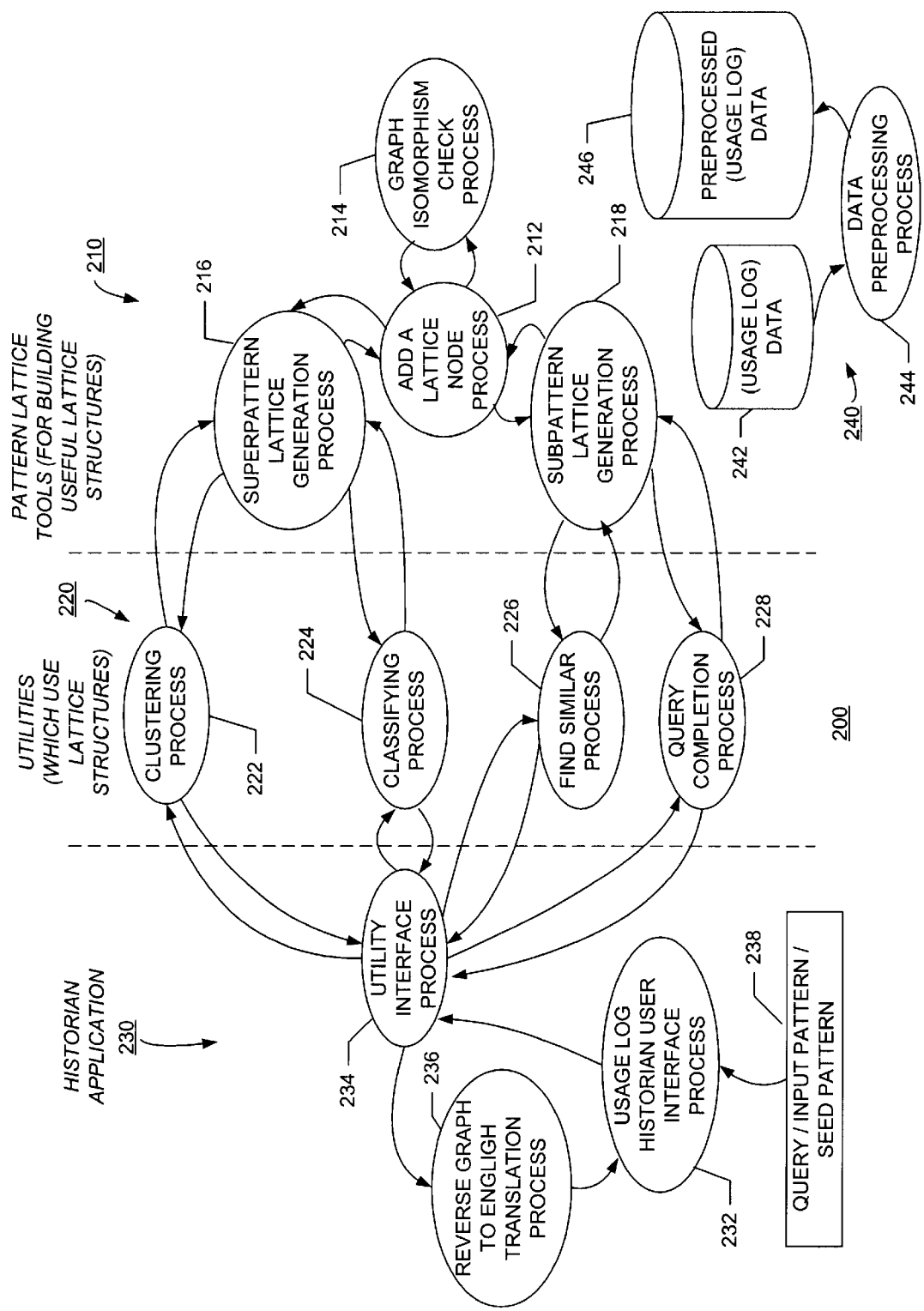
FIG. 2 is a diagram of processes that may be used to carry out at least some aspects of the present invention.

FIG. 2 is a high level diagram of processes which may be used to carry out various aspects of the present invention. As shown by the dashed lines in FIG. 2, these processes may be divided into three (3) categories. The first category includes pattern lattice tool processes 210 which are used for building useful lattice structures. The second category includes utility processes, such as data classification, labeling and access utility processes, 220 which use lattice structures. Finally, the third category includes application processes 230 for accessing data, such as usage data for example.

An add a lattice node process 212, which may use a graph isomorphism check process 214, may be used by a superpattern lattice generation process 216 and a subpattern lattice generation process 218 to build useful lattice structures. Exemplary methods for performing these processes are disclosed in §4.2.6 below. To reiterate, each of these processes 210 may be referred to as pattern lattice tools and are used for building useful lattice structures.

A data clustering process 222 and a data classifying process 224 may use the superpattern lattice generation process 216 to cluster and classify data, such as usage data for example. Exemplary methods for performing these processes are disclosed in §4.2.7.1 below. A search (or find similar data) process 226 and a query completion (or data linking) process 228 may use the subpattern lattice generation process 218. Exemplary methods for performing these processes are disclosed in §§4.2.7.2 and 4.2.7.3, respectively, below. To reiterate, each of these processes 220 may be referred to as utilities.

A usage log historian user interface (also referred to as an application front end) process 232 may use the utility processes 220 via a utility interface (also referred to as an application back end) process 234. Results returned from the utility processes 220 may be provided back to the usage log historian user interface process 232 via the utility interface process 234 directly, or via the utility interface process 234 and a reverse graph-to-English translation. process 236. The usage log historian user interface process 232 may accept a query 238, which may also be referred to as an "input pattern", a "seed pattern", or a "query graph". To reiterate,. these processes 230 may be referred to as application processes 230 for accessing usage data.

Finally, a data preprocessing process 244 may be used to convert data 242, such as usage log data, to preprocessed data 246, such as preprocessed usage log data for example. Exemplary methods for performing this process are disclosed in §4.2.5.1 below. The preprocessed data 246 may be used by the pattern lattice tool processes 210.

Having introduced processes which may be performed, ways in which data may be represented are now described in §4.2.3 below.

§4.2.3 (Usage) Data Representation

In the following, it is assumed that all data is represented by graphs in which data are modeled as graphs having "entity" nodes, which depict properties or attributes of the data, and "relationship" links, which denote relationships among the entities. Queries, data, assertions, user interface commands and even the results of analysis may be represented in the form of such graphs. Various types of data may be represented using annotated entity relationship diagrams (or "a-ERDs"), which are described in U.S. patent application Ser. No. 09/325,166, by Edward K. Jung, entitled "Methods, Apparatus, and Data Structures for Providing a Uniform Representation of Various Types of Information", filed on Jun. 3, 1999 and incorporated herein by reference.

Figure 3:
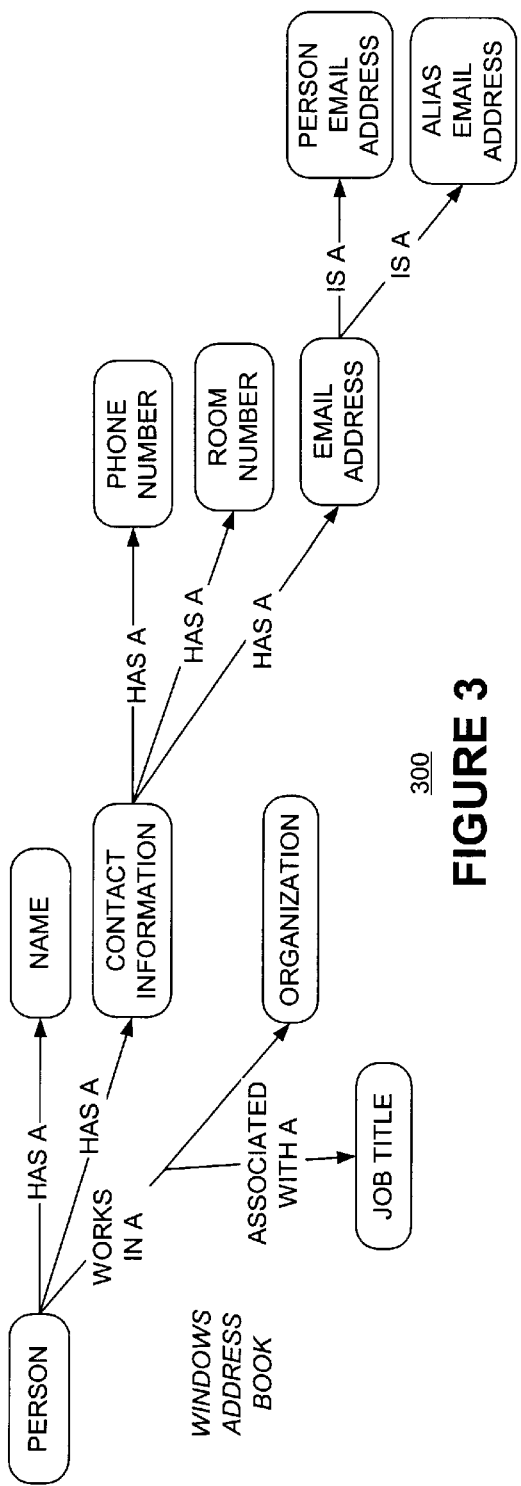
Figure 4:
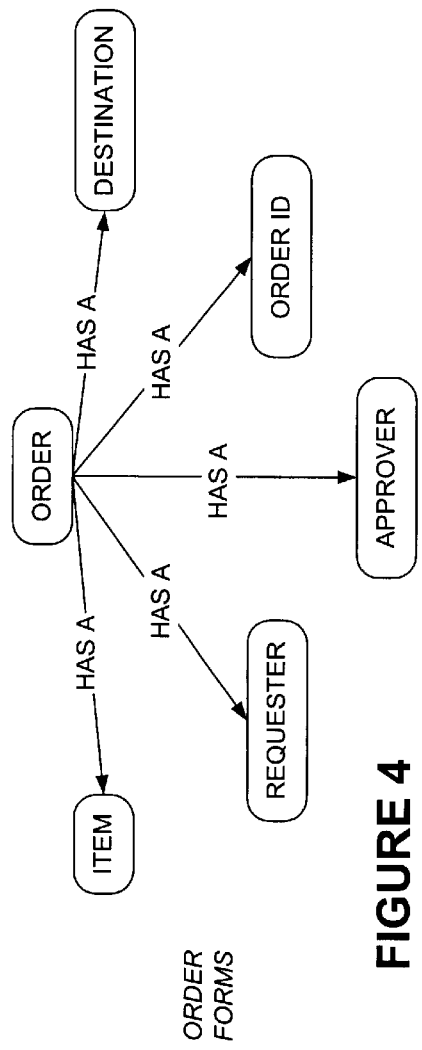
Figure 5:
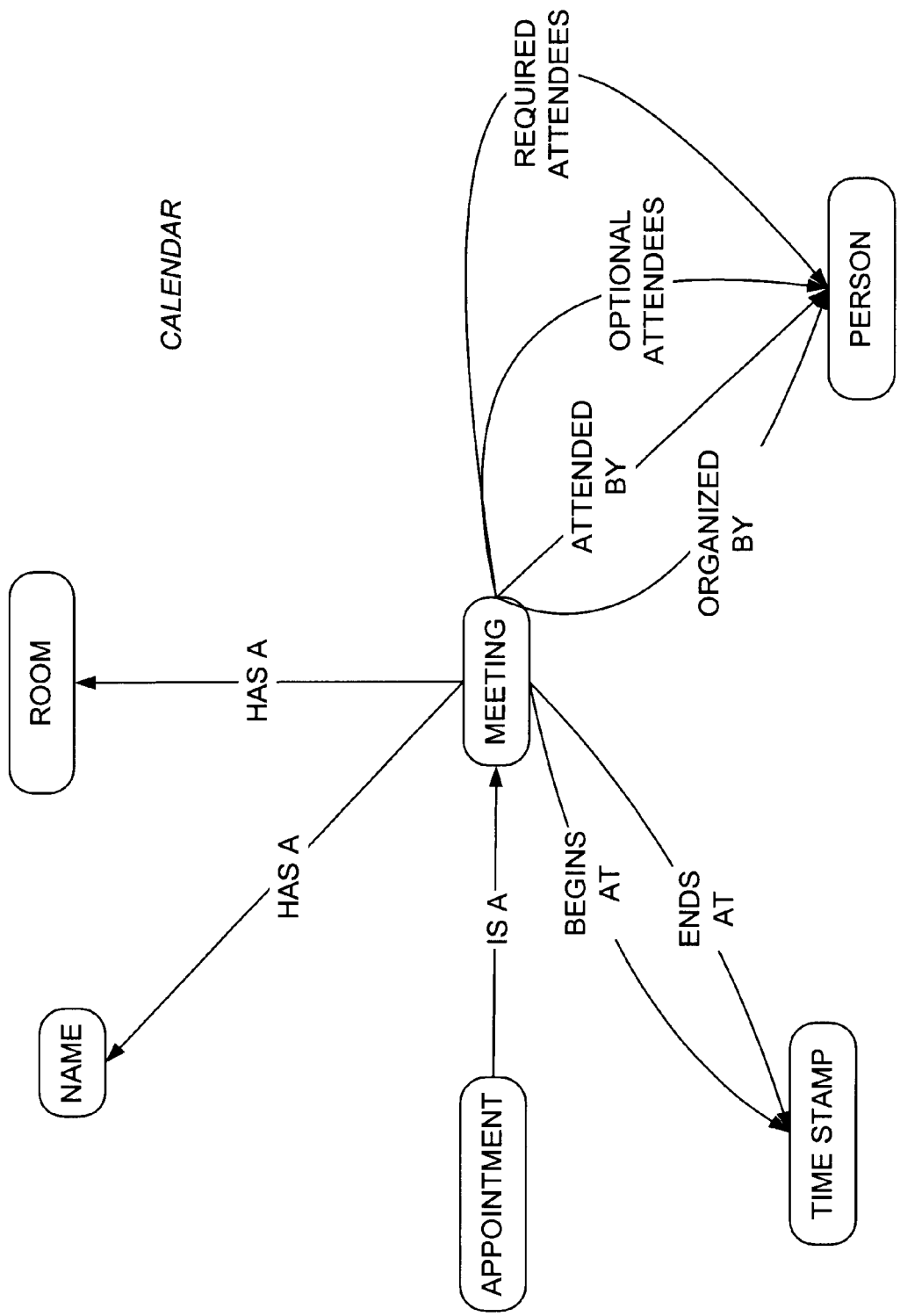
Figure 6:
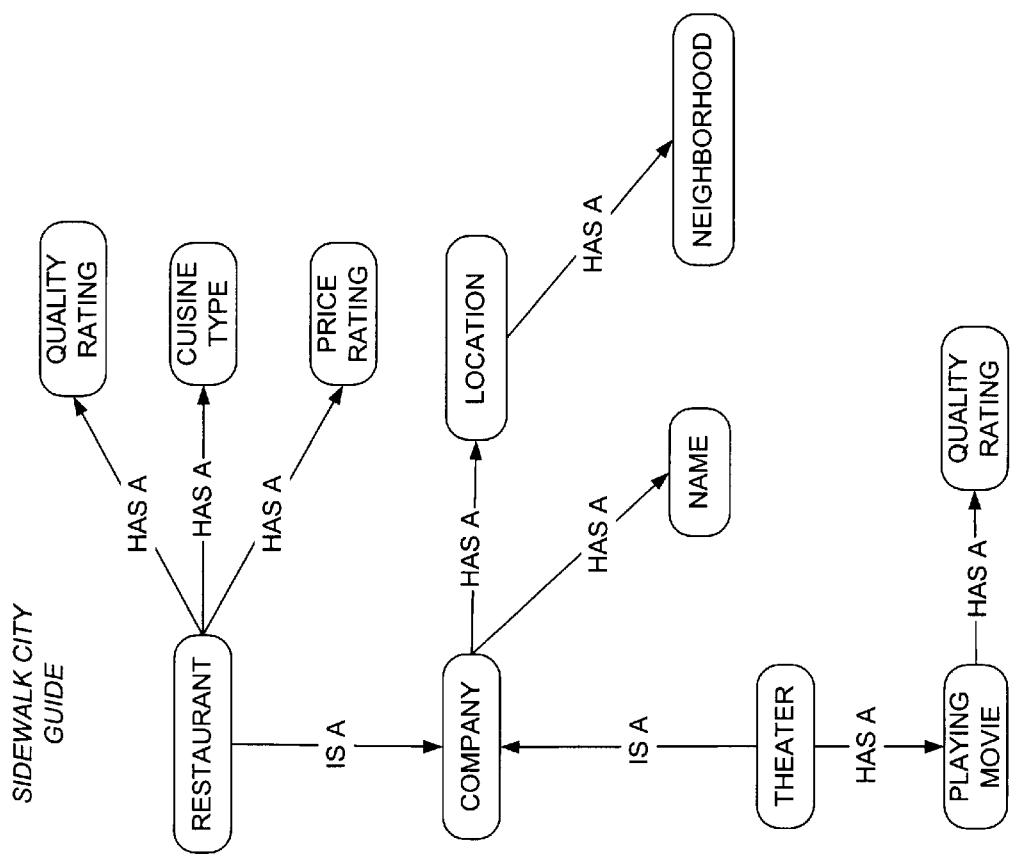
Figure 7:
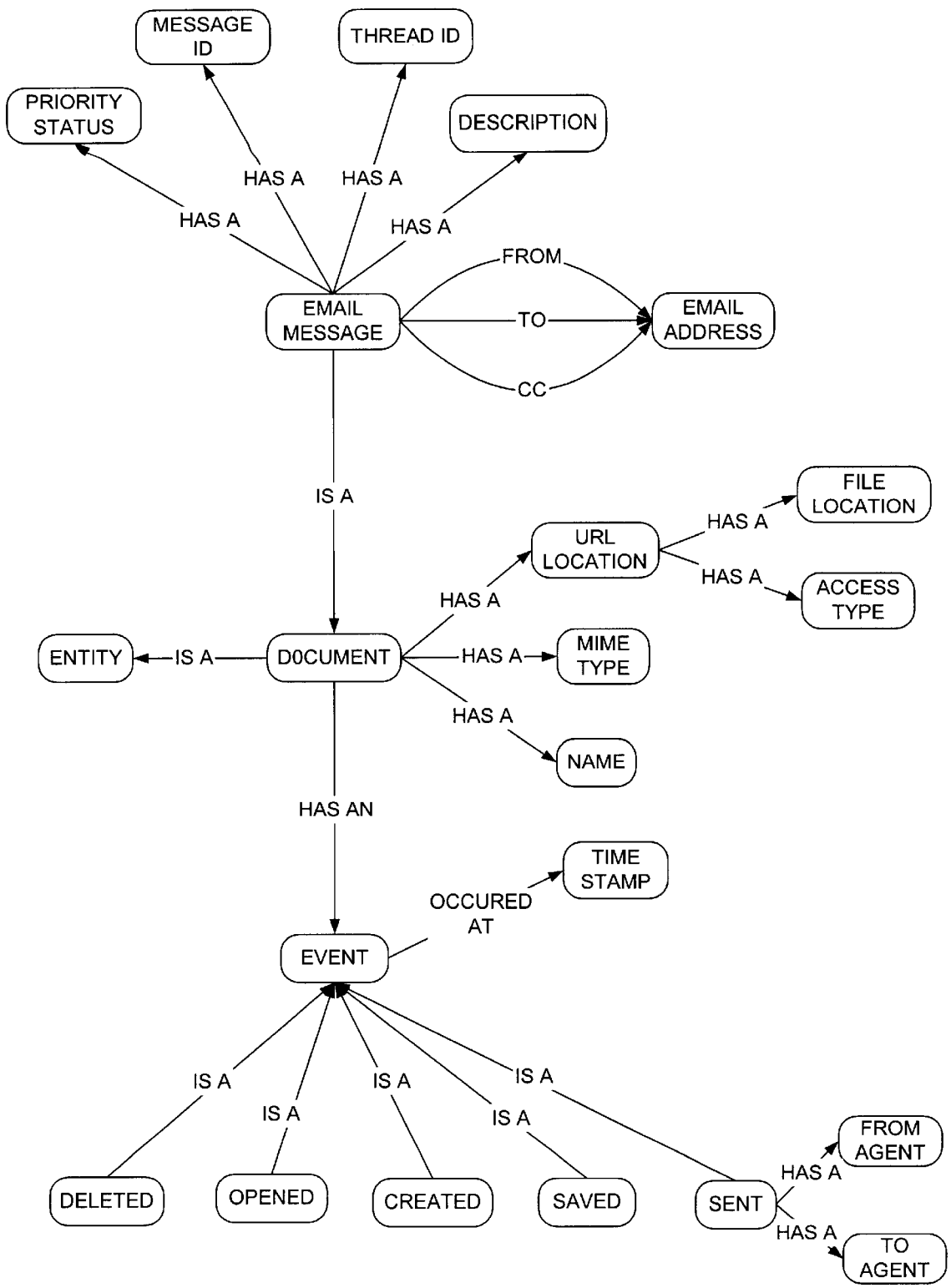

A relationship between schema, data, and usage logs is now introduced. FIG. 3 illustrates one (1) schematic representation 300 for the data in a Windows address book (or "WAB"). This schema 300 provides a conceptual model of high level concepts (or entities) such as people, names, and job titles. This model is independent of a logical or physical schema and is meant, as discussed in the introduction, to be closer to a mental representation of contact information that a person would have.

As users interact with the data from their Windows address book, order form macro (See FIG. 4.), calendar (See FIG. 5.), city guide Internet site (See FIG. 6.), e-mail (See FIG. 7.), and other applications and data sources, a subset of information with which they interact can be naturally logged and annotated in semantic graph form. For example, the Windows address book, guided by the schema 300, might enter a usage log graph 800 indicating, for example, that the user looked up and received certain contact information for a person having an email address "Stevealt" as shown in FIG. 8.

FIG. 47 is a table data structure 4700 which represents the usage log graph 800 of FIG. 8. The log entry is identified by an "EntryID" column 4710. Both the entity nodes and relationship links have graph part IDs which are listed in column 4720. The names of the entity nodes and relationship links are listed in column 4730. Each of the relationship links has a source and a destination. The graph part IDs of the sources and destinations of the relationship links are listed in columns 4742 and 4744, respectively. Finally, some of the entity nodes may have values which are listed in column 4750.

There are many ways to represent actual data values (also referred to as "instances"), such as "24/1314" as a room number. One possibility is to attach a "has value" relationship link to the entity node with type "Room" that ends in a entity node with instance value "24/1314." Another possibility, shown in node 812 of FIG. 8, is to combine the entity type and its value. The differences in denoting values of an entity are essentially issues of data structures, not representation. Accordingly, for the purposes of the present invention, either is acceptable. However, when attempting to visualize the construction of the pattern lattice (described below), it may be more straightforward for the reader to use the former approach involving "has value" relationship links.

The data to be used by the present invention are graphs in an extended sense, in that relationship links can attach to other relationship links. For example, as shown in FIG. 8, relationship link 802 is attached to another relationship link 804. Such a relationship link, attached to another relationship link, may be referred to as a "dirty link". There are two (2) types of dirty links—links that connect a node to a link (node-link dirty links; recall link 802 of FIG. 8.) and links that connect two (2) links (link-link dirty links). Dirty links raise special concerns because if one is removed, other links can be left without a source or destination. Thus, dirty links may require special handling when being removed or added. When constructing a directed acyclic graph (or "DAG") over the so-called pattern lattice (described below), a partial ordering mechanism offers a notion of parent-child superior to that of an entity node or relationship link cardinality and uses dirty links transparent to the algorithms. That is, a "subset/superset" relation is more useful than simply using the number of nodes and links to indicate the relation.

Not all graphs are semantically sensible. Some graphs are acceptable, or legal, for analysis and some are not. A "legal" graph is one that has no unbound relationship links—that is, each relationship link has a source and destination that is either an entity node or another relationship link. A "legalized" graph is the graph remaining after repeatedly removing all unbound relationship links until the resulting graph becomes legal. A legalized legal graph is the legal pattern itself. A connected pattern might not remain connected after legalization as can be seen in the examples of FIGS. 9A through 9C. The hatched nodes and solid-line links are what remain after legalization of each pattern. Notice that each of the nodes can survive as single node graphs.

Finally, a "soiled" link is a non-dirty link that is being used as a terminus for another link. For example, referring back to FIG. 8, the "works in" link 804 is a soiled link. Note that removing any soiled link leaves an illegal remaining pattern.

Having described ways in which data may be represented, a pattern lattice data space is now defined in §4.2.4 below.

§4.2.4 Pattern Lattice Data Space: A Data Analysis Framework

The following describes a framework, referred to as a "pattern lattice", for analyzing semantic graphs, such as those just described above in §4.2.3 for example. More specifically, the pattern lattice defines a framework for measuring the "sameness" or "difference" of graph patterns. These measures, in turn, may be used to classify and cluster data represented by graphs, find data similar to (or search for) input data, and relate (or link) different data. To use an analogy, the pattern lattice is to semantic graph analysis, what Euclidean (or n-dimensional) space is to feature vector analysis. As will become apparent from the following description, the pattern lattice relates quite well to the topology built into graphs.

Recall that traditional forms of clustering analysis often use data represented as vectors, typically lying in n-dimensional space (also referred to as "Euclidean" space), where n is the number of features. For example, feature vectors from speech and hand writing samples represent continuous data. An example of categorical data is word vectors taken from documents for text retrieval. When the underlying data are no longer represented as vectors, but instead convey complex relations such as via concept graphs, traditional analysis is believed to be less useful. From some semantic point of view, graphs could be "projected" to vectors. However, with semantic data, ignoring the graph topology and "vectorizing" the entities and links is contrary to the notion that semantic graphs exist to represent complex relationships. In contrast to the traditional approaches which analyzed feature vectors in n-dimensional space, the pattern lattice incorporates, rather than ignores, the topology built into graphs. Consequently, the pattern lattice provides a suitable framework for examining measures of distances between graph patterns as well as assessing the appropriateness of different techniques for statistical analysis over graph data.

Given any two (2) real numbers, it is possible to decide which is the larger. Given two (2) words, a lexicographical ordering determines which precedes the other in a dictionary. However, it is not always desirable or sensible to have a strict notion of ordering on a set. A weaker notion of ordering on a set is called a "partial ordering" on a set. For example, a partial ordering for vectors is given by computing magnitude. Thus, for example, two (2) radius vectors of the same circle have equal measurement under this ordering. Similarly, for the set of pairs of integers on the plane, a partial ordering is given by comparing the largest integers for each pair. Another natural place for a partial ordering is over the power set of a set. The power set P(S) of a set S is defined as the set of all subsets of S. In this case, the partial ordering is given by the set containment operator $\subseteq$. A subset A of set S is "smaller" than another subset B of set S if A $\subseteq$ B (that is, if the set A is contained by the set B).

Note that two (2) given elements of a partially ordered set might not be comparable. For example, if set S={1,2,3}, then subset A={1,2} and subset B={1,3} are not comparable since neither set contains all of the elements of the other. On the other hand, there is a notion of an "upper" bound and a "lower" bound of two (2) elements (in this case two (2) subsets). In the power set example, these correspond, respectively, to union and intersection. The upper and lower bounds of subsets A and B are therefore the elements of P(S) given by {1,2,3} (=set {1, 2} union set {1,3}) and {1} (=set {1, 2} intersection set {1,3,}), respectively. In FIG. 10, all elements of power set P(S) with set S={1,2,3} are shown as a directed acyclic graph (DAG). Horizontal levels show incomparable (that is, no set is "contained" by another set) elements of P(S) while arrows indicate containment. Given any two (2) nodes in this graph, it is easy to locate upper bounds as common ancestors and lower bounds as common descendants. For example, the upper bounds of the nodes corresponding to sets {1} and {3} is the common ancestor node corresponding to set {1,3}. Similarly, the lower bounds of the nodes corresponding to sets {1,2} and {2,3} is the common descendant node corresponding to set {2}.

Mathematically speaking, given a partially ordered set (the partial ordering is a reflexive, transitive, antisymmetric relation on A×A), (A, $\leq$), a "lower bound" for a set B $\subseteq$ A is an element d$\in$A such that d$\leq$b for every b$\in$B. A "greatest lower bound" (GLB) of B is a lower bound $d_0$ of B such that $d_0 \geq d$ for all other lower bounds of B. The "upper bound" and "least upper bound" (LUB) is defined similarly. That is, two (2) elements b, c of the lattice are equal, b=c, if b$\leq$c and c$\leq$b.

A lattice is a partially ordered set (A, $\leq$) such that for every a, b$\in$A the set {a, b} has both a greatest lower bound and least upper bound. Since uniqueness of GLBs and LUBs are not demanded by this definition, the order relationships of a lattice is often conceptualized as a DAG, such as the one shown in FIG. 10.

Returning to semantic data, analogous to the partial ordering $\subseteq$ placed above on power sets, a partial ordering can be defined on semantic graphs. The partial ordering $\leq$ is based on the notion of graph embedding. That is, graph embedding is analogous to set containment. Embedding refers to the usual notion of an embedding of one labeled graph into another, namely a one-to-one map that agrees on (entity) node and (relationship) edge labels and respects the graph topology.

Then, for graphs P and Q, P$\leq$Q (that is, graph P is embedded in graph Q) if there exists an embedding f: P$\rightarrow$Q. In such a case, graph P is a "subgraph" or "subpattern" (the term "graph" is often used in the context of data, while the term "pattern" is often used in the context of graphs generated while analyzing the data) of graph Q. Alternatively, graph Q is a "supergraph" or "superpattern" of graph P. An upper bound of graphs P and Q is a superpattern (or common ancestor) of both graph P and graph Q. A lower bound of graphs P and Q is a subpattern (or common descendant) of both graph P and graph Q.

The pattern lattice data space is a theoretical construct that is a useful framework for semantic modeling and is similar in spirit to the lattice shown in FIG. 10 for the power set construction. It is the lattice generated by letting A={all patterns expressible over the set of allowable nodes and links, the "null" pattern Ø, and the "everything" pattern ∞}. The "null" pattern can be embedded in every pattern by definition to assure the existence of lower bounds and the "everything" pattern contains every finite pattern as a subpattern to assure the existence of upper bounds.

The elements of pattern lattice A above are referred to as "lattice nodes". The parent-child relationship between two (2) lattice nodes are referred to as "lattice links". It is assumed that lattice links are directed from parents to children. Since both the data and the lattice are graphs, and both have nodes and links, to eliminate any confusion when there is ambiguity, the elements in the data are referred to as "entity nodes" and "relationship links." In the lattice, the terminology "lattice nodes" and "lattice links" is used.

A lattice node of the pattern lattice represents a pattern (or graph). As with FIG. 10, the directed links may be thought of as representing the partial ordering. The in-links to a node "N" come from "parents" and out-links lead to "children", referenced, respectively, as Parents(N) and Children(N).

FIG. 11 schematically depicts a pattern lattice. The top level (ignoring the null pattern) of the lattice represents single entities (single entity nodes of a graph). Referring to FIG. 12 for example, in a simple case where there are only two (2) entities A and B, the top level of the pattern lattice is populated by a lattice node with the entity node A and a lattice node with the entity node B. The second level of the pattern lattice represents all linked combinations of single entity nodes, and so on. Still referring to FIG. 12, the second level of the pattern lattice is populated by lattice nodes with entity node A related to entity node A, entity node A related to entity node B, entity node B related to entity node A, and entity node B related to entity B. Only a portion of the third level is shown. Referring to both FIGS. 11 and 12, horizontal levels of the pattern lattice have nodes which represent patterns with equal numbers of relationship links.

In the methods disclosed in §4.2.6 below, the sets Children(N) and Parents(N) (that is, sets corresponding to two (2) adjacent levels in the pattern lattice data structure) may be initially empty and then populated constructively. Thus, the pattern lattice may be constructed only to the extent needed. This additive approach is particularly valuable in certain circumstances, as will become apparent below. In the following, the statements "a lattice link has been added from "M" to "N"" and "Children(M) and Parent(N) have been updated with this relationship" are equivalent.

The general pattern lattice may be denoted by "L" and lattice nodes within it may be denoted by "N". When only the subset of "L" generated from a pattern "P" is considered, it may be denoted by L(P).

As mentioned, there is a bi-jection between entity-relation graph patterns and lattice nodes (in fact, lattice nodes are symbolic representations of patterns). That is, the value of a specific lattice node is itself a symbolic representation of an entity-relationship pattern. The lattice node N corresponding to pattern P (i.e., a graph or a subgraph) are denoted by N(P). Similarly, the pattern corresponding to the lattice node N is denoted by P(N). P and N may be used interchangeably when there is no ambiguity. The cardinality of relationship links within the pattern P is denoted by #P. The number of relationship links in the pattern corresponding the lattice node N, that is #P(N), will be denoted by #N.

Note that the intersection of two (2) graphs is not mathematically well defined. However, the question of whether one pattern is embedded (Recall definition above.) within another, that is whether the one pattern is a subpattern of the other, is well defined. In the example illustrated in FIG. 13, graph P is a subpattern of (that is, is embedded within) graph Q. A predicate that returns the set of all embeddings of subgraph P into graph Q is defined as:

Embeddings($P,Q$)={$f|f$ is an embedding of $P$ into $Q$}.

In the example set forth in FIG. 13, there are two (2) distinct embeddings of the pattern P into the pattern Q.

There are two (2) canonical sets which may emanate from a pattern node N. These sets are referred to as the subpattern cone:

$C_{sub}(N) = \{M | M \leq N\}$ and the superpattern cone:

$C_{Super}(N) = \{M | M \geq N\}$

All patterns in $C_{Sub}(N)$ are contained in the pattern of lattice node N. On the other hand, the pattern of lattice node N is a subpattern of all patterns in $C_{Super}(N)$. Note that $C_{Sub}(N)$ is also referred to as a subpattern cone of lattice node N and $C_{Super}(N)$ as the superpattern cone for lattice node N.

Since the process of removing links terminates after a finite number of stages, the subpattern cone is always of bounded height. Under the (reasonable) assumption that only patterns ever encountered in the data (certainly a finite list) can be added to the pattern lattice, the superpattern cone is also of bounded height.

When data D, such as content or log files, is available for analysis, the association of lattice node N to the subset of data containing P(N) as a subpattern is denoted by D(N).

Having defined a pattern lattice data space, ways to manage or reduce the complexity of a pattern lattice are now described in §4.2.5 below.

§4.2.5 Managing or Reducing the Complexity of the Pattern Lattice

Although the pattern lattice defines an appropriate data space or framework for semantic analysis, it is no more reasonable to construct the combinatorially vast pattern lattice to study patterns and graphs in data than it is to construct every point of n-dimensional (Euclidean) space to study feature vectors of data. Thus, given the combinatorial nature of the pattern lattice, the cost to pre-compute and store lattices or lattice fragments should be balanced against the cost to compute lattices or lattice fragments during run-time. Given the enormity of the pattern lattice, the exemplary methods disclosed below often work with local, and often only partial, views of the pattern lattice.

To appreciate the combinatorial complexity of a pattern lattice, the reader needs only to refer back to FIG. 12 which shows only a portion of three (3) levels of a pattern lattice generated from graphs having only two (2) entity nodes, A and B. To further illustrate the combinatorial complexity of the pattern lattice, a pattern lattice generated by a simple star-shaped graph is described with reference to FIG. 14. In the context of a user log, the pattern P of FIG. 14 is an example of an entry representing the assertion that "n" people with names ($n_i$) attended a meeting. The pattern Q is an example of an entry representing an entity having n properties ($M_i$) such as a meeting having a location, time of occurrence, etc. Finally, the pattern R is an example of an entry representing the relationships among n properties ($R_i$) of a restaurant whose head chef has m properties ($C_j$). For these patterns, it is straightforward to compute the number of nodes on each level of the pattern lattice. The number of nodes on level "k" of the pattern lattice will correspond to the number of distinct subpatterns of the given pattern using k relationship links.

Level cardinality for the pattern P is computed both for the cases where instance values (that is, the values of entities) are ignored and where instances differentiate identical type of entity nodes. As is evident in Table 1 below, combinatorial "explosions" occur in the case of distinct node values as seen in pattern P and for distinct node types as seen in pattern Q.

TABLE 1

| Level | # nodes ∈ L(P) (no instances) | # nodes ∈ L(P) | # nodes ∈ L(Q) | # nodes ∈ L(R) |
|---|---|---|---|---|
| 0 | 2 | n + 1 | n + 1 | n + m + 2 |
| ... | ... | ... | ... | ... |
| k | 1 | $\binom{n}{k}$ | $\binom{n}{k}$ | $\binom{n}{k} + \binom{m}{k} + \binom{n+m}{k-1}$ |
| Total | n + 2 | $2^n + n$ | $2^n + n$ | $2^{n+m} + 2^n + 2^m + n + m$ |

It is clear from this example that combinatorial "explosion" is the rule rather than the exception when dealing with the pattern lattice. In particular, the last column dramatically illustrates the issues of scale for combining patterns.

Below, ways of managing the complexity and scale of a lattice in the pattern lattice data space are described. More specifically, ways of managing the complexity and scale of the pattern lattice in the Lattice data space by preprocessing the data to be analyzed are disclosed in §4.2.5.1 below. Then, ways of managing the complexity and scale of the lattice in the pattern lattice data space by trimming nodes of the lattice are disclosed in §4.2.5.2 below. Finally, ways to determine when the parts of the lattice are to be computed are disclosed in §4.2.5.3 below.

§4.2.5.1 Preprocessing Data

Recall that the patterns correspond to graphs and subgraphs of the data, such as entity nodes and relationship links found in usage log entries. In some cases, it may be possible to reduce the number of entity nodes and relationship links without losing too much information (that is, without losing information about important data relationships or important entity values). Techniques for such reductions, and situations in which such reductions may be appropriate, are disclosed below.

§4.2.5.1.1 Instance Values

As illustrated above with reference to pattern P of FIG. 14, the representation of instance values (that is, actual values of entities) in the data graph can greatly increase the size of the resulting pattern lattice. (Compare n+2 versus $2^n$+n in Table 1 for nodes without instance values versus nodes with n different instance values.) A first approach for handling instance values is to remove all instance values during analysis. In this case, many of the important relationships that schema offer are maintained for analysis. Unfortunately, however, information about important values such as names and dates would be lost using such an approach. At the other end of the spectrum, another approach for handling instance values is to represent all types and values (that is, don't preprocess the data graphs at all). Unfortunately, however, using such an approach would not decrease the size of the lattice at all.

Using "semantic data types" to generalize instance values offers a middle ground between these two (2) "all-or-nothing" approaches for handling instance values. More specifically, semantic data types provide classifications or descriptions for more specific values. Relatively distinct values, which may be determined through either occurrence frequency or some other measure of importance, can be promoted to semantic data types themselves. For example, instance values such as "Mexican" and "Italian" as "Cuisine Type" entity instances could be promoted to proper semantic data types. Instances that take on continuous values, such as timestamps, need special consideration in order to fit within a discrete framework. Semantic data types can be used to quantize such continuous values, such as generalizing time values between 6am and 10am to the semantic data type "Morning". Thus, semantic data types can be thought of as extra schema over instance values.

§4.2.5.1.2 Virtualizing Log Data

Virtualizing means treating, for the purposes of analysis, a subpattern of a graph (or the graph itself) as one (1) node (or alternatively, as a smaller pattern). It may be desirable to rename the node with a new semantic label. For example, referring to FIGS. 15A and 15B, if there are a number of patterns in which a "Restaurant" entity has a "Cuisine Type" entity which has an instance value of "Italian" as shown in FIG. 15A, each of these patterns may be generalized (that is, "virtualized") to an "Italian Restaurant" entity as shown in FIG. 15B.

Many of the utilities disclosed in §4.2.7 below are used to discover common or important patterns. Pattern compression techniques may use these discovered patterns to manage lattice complexity by virtualizing pattern. However, this raises a catch-22—the pattern lattice should be developed to the point where these patterns, which are themselves used to reduce the complexity of the pattern lattice, may be discovered. Fortunately, there are a variety of bootstrap techniques for reducing pattern complexity. These techniques are simple analytical and non-analytical heuristic approaches for "virtualizing" (or generalizing) common data graphs and subgraphs (or patterns) as single entity nodes. Some of these techniques are now described below.

A simple way to compress patterns is to alter an application's rules for generating log data. In general, logs generated by automated logging mechanisms can be aggressively preprocessed to virtualize the data. Content or instance data, such as mail files or Sidewalk™ city guide data may offer far more regularities than exceptions in their data and offer similar opportunities to aggressively virtualize shared patterns. For example, referring back to FIG. 6, in the schema of a Sidewalk™ city guide, the "company" entity related to the "name" entity with a "has a" relationship may be generalized to simply a "company name" entity.

More complicated virtualization rules may be employed such as specifying "OR" and "AND" must-keep options. For example, heuristics like: node C can not be added alone, if node C is added then so is node D, but not the other way around, can be specified. These rules may be given heuristically or through compression-like analysis on the data using preprocessing steps such as correlation statistics or singular value decomposition type approaches. That is, other mathematical models may be employed to infer important rules.

An analytical heuristic for preprocessing log files can be demonstrated over "property star-patterns" such as in the example of pattern R given above with reference to FIG. 14. The size of a pattern lattice generated from pattern R is $O(2^{n+m})$ while the sizes of pattern lattices generated from individual stars are $O(2^n)$ and $O(2^m)$ (where O denotes "order of"). Therefore, the size of a pattern lattice can be dramatically reduced by separating connected stars and treating each star independently. For example, $O(2^n+2^m)$ is much smaller than $O(2^{n+m})$. One skilled in the art will appreciate that other "topology" or shape induced preprocessing stages can be applied in a similar spirit.

Another example of an analytical heuristic is "schema projection." This technique is used to reduce redundant entity types when values (or instances) have been ignored. In the example of pattern P given above with reference to FIG. 14, when the names of meeting attendees ($n_1, \ldots, n_n$) are ignored, the remaining pattern is the "meeting" entity connected to n copies of a "name" entity (with no value). A heuristic may be used to remove redundancy and re-represent the graph as the "meeting" entity connected to a single copy, rather than n copies, of a "name" entity. This heuristic may be referred to as "schema projection" since, in spirit, a schema representing typical usage with which the application logging mechanism interacts would likely show that meetings can be attended by one (1) or more people.

§4.2.5.1.3 Pattern Restrictions: Legal and Connected Patterns

Under a broad definition, the pattern lattice could contain all "parses" of graphs, including such absurdities as free-floating unattached relationship links, relationship links attached at only one (1) end, etc. However, even under restrictive conditions, such a lattice is prohibitively large. One of the most direct ways to drastically reduce the number of lattice nodes in the pattern lattice data space is to only allow nodes corresponding to patterns with all relationship links connected to both sources and destinations. Recall from §4.2.4 above that such patterns are referred to as "legal" patterns or graphs. Depending on the way the schema is being authored (Recall FIGS. 3 through 8 above.), legal patterns may often describe all conceptually complete concepts.

Further restricting a lattice in the pattern lattice data space to include only nodes corresponding to connected patterns provides another enormous reduction in lattice size. Since semantic modeling leverages information inherent in relationships which connect entities, this restriction makes sense, not only to reduce the size of the pattern lattice, but also to preserve information inherent in the relationships among entities. Of course, there is a computational cost for checking the connectivity for every candidate lattice node. However, as described below, the present invention introduces techniques that will speed up this process. Notwithstanding this general preference to represent only connected patterns, as discussed above, there may be cases in which heuristics can greatly reduce the order of a lattice in the pattern lattice data space, by parsing (Recall separating connected star patterns, such as the pattern illustrated in FIG. 14 for example.) graph patterns. Such graph parsing may be referred to as "factoring".

Summarizing the foregoing sections,. FIG. 16 is a flow diagram of an exemplary method 244' for effecting the process 244 for preprocessing data. The steps need not be performed in the order shown. Further, not all of the steps shown need be performed. With the foregoing statements in mind, as shown in step 1610, instance values may be replaced with more general "semantic data types", where appropriate. Alternatively, as shown in step 1610', instance values can be ignored and redundant entities related, in the same way, to an entity node (or to a relationship link) may be combined (Recall "schema projection".). As shown in step 1620, the data may be "virtualized" as described above. As shown in step 1630, heuristics which served to reduce the order of complexity of a pattern lattice may be applied to patterns. Finally, as shown in step 1640, nodes of the lattice may be restricted to correspond to only connected patterns and "legal" patterns. The exemplary data preprocessing method 244' may then be left via return node 1650.

Having described ways in which the complexity of a pattern lattice may be managed and/or reduced by preprocessing the data, managing and/or reducing the complexity of the pattern lattice by "trimming" lattice nodes is now described in §4.2.5.2 below.

§4.2.5.2 Lattice Trimming

Sections 4.2.5.1.1 through 4.2.5.1.4 above disclosed techniques for preprocessing data, such as usage log data for example, to limit the combinatorial explosion of representing patterns associated with the data on a lattice in the pattern lattice data space. This section discloses techniques to limit the lattice size that are applied when constructing a lattice in the pattern lattice data space. Specifically, two (2) heuristics that eliminate the representation of selected subpatterns from the lattice are introduced in §§4.2.5.2.1 and 4.2.5.2.2 below. Although these trimming processes "break" the strict notion that the pattern lattice represents every subpattern of the data, they are extremely practical.

§4.2.5.2.1 Ancestor Elimination

The first pattern lattice trimming technique is referred to as "ancestor elimination" or "vertical trimming". This process is identical to one discussed in §4.2.5.1.2 above with reference to data preprocessing. Assume that all (or most) data contain pattern P and pattern Q and that pattern P is a subpattern of pattern Q ($P \leq Q$). Then the parents of pattern P may be linked directly to pattern Q. That is, pattern P can be eliminated from the pattern lattice since its presence in data is completely (or highly) correlated with the presence of the more complex pattern Q. For example, referring to FIG. 17, if the graph P having entity "cuisine type" never appears apart from the graph Q having entity "restaurant" related with the entity "cuisine type" via relationship "has a", then any parents of the pattern P may be linked directly to the pattern Q.

Similarly, if a parent lattice node has only one (1) child lattice node, the parent lattice node can be removed and the child lattice node can be linked with the parent lattice node(s) of the removed parent lattice node. This is because if two (2) lattice nodes contain information that will ultimately be presented to a user, the user might as well have the more detailed information than the more general information that can only lead the user to the specific piece of more detailed information. In general, however, if a parent lattice node is a predetermined "decision node" used for classification (See §4.2.7.1 below), it should not be removed. Further, if the parent lattice node corresponds to a data graph (preprocessed or not), it should not be removed.

§4.2.5.2.2 Sibling Elimination

The second pattern lattice trimming technique is referred to as "sibling elimination" or "horizontal trimming". Sibling elimination is a way to reduce redundant expression per level (level being defined by link cardinality per pattern). This technique is particularly useful when superpattern lattices are used to enumerate intermediary patterns between a seed pattern and a data set as described in §4.2.6.2 below. Let two sibling patterns be denoted by patterns P and Q and a data set D be made up of graphs G (say a log file). If for all graph data G, $P \leq G$ implies $Q \leq G$ (that is, if whenever the pattern P is a subpattern of the graph data, then pattern G is also a subpattern of the graph data), then the pattern P can be eliminated. This elimination is permitted because the pattern P will eventually be contained in the descendants of the pattern Q. If the converse is also true, then it doesn't matter whether pattern P or the pattern Q is eliminated.

Basically, given a level of parent lattice nodes and a level of child lattice nodes, each child lattice node "accepts" only those parent lattice nodes that are contained as subgraphs in the greatest number of data graphs possible and that preserve a connection between the parent lattice node and all data graphs that the parent lattice node is a subgraph of. Then, all parent lattice nodes not accepted by any of their child lattice node(s) are trimmed.

§4.2.5.3 Balancing Pre-Computation and Run Time Computation of the Pattern Lattice It may be impractical to precompute and store the entire lattice of the pattern lattice data space. On the other hand, it may be too time consuming to continuously rebuild the lattice from scratch. Lattice usage may also be driven by specialized needs and therefore any particular sublattice, in whole, has limited reuse. It is therefore important to recognize the importance of intermediate solutions, referred to as "partial lattices", or "lattice fragments". Thus, techniques for constructing and incrementally rebuilding and updating the lattice would be quite useful. Partial lattices or lattice fragments may be expanded as need, as discussed in §4.2.5.3.1 below, or expanded when new data becomes available or periodically as discussed in §4.2.5.3.2 below.

§4.2.5.3.1 Lazy Expansion (Expansion as Needed)

Many of the issues related to lazy expansion are essentially a standard computer science tradeoff between memory and processor resources. That is, if memory resources and needs are relatively inexpensive when compared with processing resources and needs, then the lattice of the pattern lattice data space will be precomputed and stored to a greater extent. On the other hand, if memory resources and needs are relatively expensive when compared with processing resources and needs, then the lattice of the pattern lattice data space will be computed "on the fly", as needed, to a greater extent. Access statistics and heuristics may be used to help find optimal tradeoffs.

§4.2.5.3.2 Incremental and Batch Updates

When new data arrives, a difficult problem is how to update the stored partial lattices or lattice fragments created above. One update mechanism is to comb through the lattice fragments and add or delete lattice nodes as indicated by new data. Another update mechanism is to build completely new lattice fragments from the new data and, in the spirit of similar to sorting and merging new fragments in with the old. Analysis components needing access co recent data can use lattice fragments built off hew data before they have been integrated into previously built fragments. Merging fragments can be aided by aggressively trimming patterns, as disclosed in §4.2.5.2 above. Given the computational nature of determining graph isomorphisms, reducing the number of compared lattice nodes can have a dramatic affect when comparing the graphs associated with the lattice nodes in each fragment.

§4.2.5.4 Techniques for Maintaining Lattice Statistics: Histograms Over the Lattice Given a data set and an existing portion of the pattern lattice, there are two (2) distinct ways to build histograms over the lattice. The first way is to increment histogram counters over a lattice node only when there is an exact match between the pattern represented by the lattice node and a graph of the new data. The second way is to increment a counter for each lattice node that is a subpattern of a data graph ($N \leq D$). In this latter case, every time a lattice node's counter is incremented, there is a cascading effect on all of its parent lattice nodes since the parent lattice nodes are all subpatterns of the lattice node. The way in which a histogram is maintained over the lattice in the pattern lattice data space may depend on the needs of the particular application.

Having described ways to manage and/or reduce the complexity of a pattern lattice, tools for building useful lattice structures, which may be used by other utilities, are now described in §4.2.6 below.

§4.2.6 Pattern Lattice Tools: Building Useful Lattice Structures

The utilities described in §4.2.7 below use two (2) basic lattice structures in the pattern lattice data space—superpattern cones and subpattern cones. Although some lattice nodes may be trimmed, these lattice structures may be referred to as subpattern and superpattern cones even though, strictly speaking, they may not necessarily include all of the nodes (and associated links) of such cones. The generation of these lattice structures is described in §§4.2.6.2 and 4.2.6.3, respectively. Before that, however, a basic process for adding lattice nodes to a lattice is described in §4.2.6.1.

§4.2.6.1 Adding Lattice Nodes

When building. lattice structures, candidate nodes to be added to the lattice are created. FIG. 18 is a flow diagram of an exemplary method 212' for effecting a process 212 for adding a lattice node to a lattice. This method 212' takes a current lattice node, adds a new lattice node if it doesn't already exist, and then updates parent-child link data of both of the lattice nodes. This method 212' does not update the entire lattice and its relationship to a candidate new lattice node. The following is pseudo code of the method.

```
AddNodeToLattice (CurrentNode, Relationship /* Parent or
Child */, NewNode)
{
    //Check if a node of the same pattern existed
    NewNodeExists = FALSE
    Loop through all lattice nodes N
        If Isomorphic(N, NewNode)
            NewNode ← N, NewNodeExists = TRUE, &
        break loop
    End node loop
    If NewNodeExists = FALSE, add NewNode to the lattice
Add Relationship link, if it doesn't already exist, from
CurrentNode to NewNode
```

Now referring to both FIG. 18 and the foregoing pseudo code, a NEW_NODE_EXISTS flag is initially set to "false" as shown in step 1810. A new node is accepted as shown in step 1820. As shown in steps 1830, 1840, 1850, and 1860, for each of the lattice nodes of the existing lattice structure, it is determined whether the new node is the same as the existing lattice node (that is, whether the new node and the existing lattice node represent isomorphic patterns). If not, the loop continues. If the new node and an existing lattice node are isomorphic, this means that the new node already exists on the lattice and need not be added. Thus, the NEW_NODE_EXISTS flag is set to "true" as shown in step 1850, and processing continues, outside the loop, to RETURN node 1890. At decision step 1870, it is determined whether or not the NEW_NODE_EXISTS flag is still "false" or not. If this flag is still false, this means that the new node did not already exist on the lattice. Accordingly, the new node is added to the lattice as shown in step 1880 and the method 212' is left via return node 1890. If, on the other had, this flag is not false, which means that the new node already existed on the lattice, the method 212' is left via return node 1890.

Note that decision step 1840, which checks graph isomorphism, is performed for all nodes of the lattice (unless of course the loop is exited via step 1850). Unfortunately, known methods for checking graph isomorphism are relatively computationally expensive. Recall that lattice nodes of a lattice in the pattern lattice data space correspond to graphs or patterns. Graph comparisons, such as determining the predicate Embeddings (P,Q) and determining isomorphism (that is, whether graph P is the same as graph Q), are computationally expensive, but important operations.

Semantic data may contain a high multiplicity of a given entity type, thereby partially reducing a labeled graph to an unlabeled one—an even harder determination problem. Recall that the children of a pattern are superpatterns, that is, supersets of the pattern. An example of a common operation in building the pattern lattice is determining the grandchildren of a node. The main point is that all the Embeddings of the children into the data set are determined to produce candidate grandchildren. Furthermore, these candidates are compared to eliminate isomorphic copies. All known algorithms for determining whether an unlabeled graph is either a subgraph of, or isomorphic to, another unlabeled graph have worst-case complexities that grow faster than any polynomial in the sizes of the graphs. In fact, the subgraph problem is known to be NP-Complete (The NP-completeness of the isomorphism problem is still an open problem.). (A problem that is "NP-Complete" means that there is no known way to solve it in polynomial time.) In contrast, for the case of graphs with uniquely labeled nodes and edges, simple and fast subgraph and isomorphism algorithms exist.

In the present case, graphs may have semantic data types (Recall §4.2.5.1.1 above) and instance values that are mostly distinct. However, there are situations when a non-trivial multiplicity for a given semantic data type or instance occurs, hence threatening to reduce a subgraph or isomorphism computation to the unlabeled case. In practice, it is not sensible for all nodes to have the same label; hence hybrid labeled-unlabeled graph comparison techniques may be employed.

The "Embeddings" and "Isomorphic" application program interfaces (or "APIs") are streamlined. (Finding embeddings and graph isomorphism are known computer science problems and may be solved using a number of known methods. Moreover, the utilities, disclosed below, are designed to minimize the number of calls to these API's. As always, special knowledge of the data and application offer opportunities to speedup the utilities. Information about Embeddings at a node can be modified and propagated to parents and children in the lattice. Finally, as disclosed below, hashing patterns may be used for fast comparisons— or more specifically; to minimize the number of slow comparisons needed. Further, the total number of comparisons may be reduced using lattice trimming techniques, disclosed in §4.2.5.2 above.

The graphs may be "labeled" such that each entity node is identified by a predetermined type ("unsigned long" or "ULONG") and its value (wstring), while each graph link only has a link-type ID. For example, referring to FIG. 8, a node may have a predetermined identification label (e.g., an unsigned number assigned to identify "phone number" node (s)) and a value string (e.g., "9369154"). These graphs, which correspond to lattice nodes, may be "hashed" to reduce the number of possible isomorphism determinations preformed. More specifically, referring to FIG. 19, when a new node 1910 (having a corresponding graph) is available, it is not compared with every existing lattice node 1922 (each of which has a corresponding graph) to determine whether the graphs are isomorphic. Instead, each of the graphs corresponding to the existing lattice nodes 1922 are "hashed" by the hash function 1930 to get an associated hash value. The graphs are then assigned to a hash bucket 1942 based on their hash value. When a new node is available, it is hashed by the hash function to get an associated hash value. The graph associated with the new node is then only compared for isomorphism with graphs having hash values in the same hash bucket 1940. This is because if two (2) graphs have the same hash value, they might be the same. An isomorphism comparison is then performed to determine whether the two (2) graphs are indeed the same. If, on the other hand, two (2) graphs have different hash values, they are not the same and no isomorphism comparison need be performed.

An exemplary hash function described. Each graph will have a number of entity nodes. As just described above, these entity nodes are identified by a numerical type identification label (ULONG) and have an associated value (string). Each node of a graph will have a hash value defined as:

```
ULONG    GetHashValue (ULONG type, wstring value)
{
    ULONG    res = type
    For (ULONG i = 0 ; i < value.length(); ++i)
    {
        res = Rotate5Bits (ret) XOR
              UCHAR(value[i]);
    }
    return res;
}
```
where Rotate5Bits (ret) rotates ret's binary representation by five (5) bits.

That is, for each node of the graph, a value "res" is initialized to the numerical type identification lable of the node. Then, for each character of the string of the value associated with the node, the "res" value is rotated by five (5) bits and exclusively ORed with the character to determine a new "res" value. The hash value of the graph is then defined as the XOR (exclusive OR) of all of the hash values of its nodes. The relationship links may also be hashed, thereby affecting the final hash value. A default link value may be set to the empty set.

In view of the foregoing, hashing graphs corresponding to existing lattice nodes and a new node reduces the number of isomorphism comparisons needed when determining whether or not to add a new node to a lattice. Naturally, other ways of reducing the number of isomorphism comparisons may be helpful. For example, isomorphism comparisons could be limited to only graphs with the same number of entity nodes and/or relationship links. Having described an exemplary method for adding a node to a lattice, exemplary methods of building superpattern cones (or lattices) and subpattern cones (or lattices) are now described below in §§4.3.6.2 and 4.3.6.3, respectively.

§4.2.6.2 Managing Superpattern Cones

This section will describe basic methods which may be used to create a superpattern cone, as defined in §4.2.4 above. Recall from §4.2.4 above, that a superpattern cone conceptually consists of all the lattice nodes that contain the specified seed pattern and all the corresponding lattice links in the pattern lattice. Like the pattern lattice, a superpattern cone is a conceptual framework. As with the pattern lattice, the function here is not to build the "complete" superpattern cone, but rather, to determine the minimal cone that is needed. Naturally, this minimal cone can be expanded. Thus, as referenced below, a "superpattern cone" is not necessarily a "strict" or "complete" superpattern cone containing all lattice nodes corresponding to graphs that contain the specified seed pattern, as well as all corresponding lattice links. As will be apparent in §4.2.7.1 below, the superpattern cone may be used to classify instance data. In the following, §4.2.6.2.1 defines the superpattern cone, §4.2.6.2.2 introduces issues which affect the complexity of the superpattern cone, and §4.2.6.2.3 discloses exemplary methods for generating a superpattern cone.

§4.2.6.2.1 Superpattern Cone Definition

The superpattern cone can be defined as:

$$C_{super}(N) = \{N' | \text{SubPattern } (N,N') = \text{True}\}.$$

Thus, all patterns in $C_{super}(N)$ are superpatterns of lattice node N.

Superpattern cones are driven by a seed pattern (P) and a collection of (graph) data. The data are used to add relationship links and entity nodes (also referred to as "extending" the graph) to the seed pattern P until all possible data combinations of patterns containing the seed pattern P have been made. The semantic label N can be used for all patterns contained in its cone since it is a subpattern of every pattern in its reach. Conversely, a collection of patterns can be described by the vertex of any cone covering the collection.

Covering cones need not be unique. Some of the important applications of superpattern cones and superpattern lattices will be clustering and classification of data via common patterns.

In FIG. 20, the seed pattern (P) 2010 is shown at the vertex of the cone 2020 which is depicted with heavier lines. The data (graphs) 2030 having the seed pattern (P) 2010 as a subpattern are shown in the cone 2020.

§4.2.6.2.2 Factors Affecting the Complexity of a Superpattern Cone and of Building a Superpattern Cone A number of complexity issues relating to the general pattern lattice were introduced in §4.2.5 above. When generating superpattern cones, there are two (2) main concerns—namely expansion and multiple embeddings. Each of these issues is discussed below.

First, size and complexity of superpattern cones are not determinable solely from examining root nodes. Rather, as introduced above and illustrated in FIG. 20, the generation of a superpattern cone is dictated by data (e.g., log entries). Hence, a lazy or incremental approach to building the superpattern cone, where the superpattern cone grows as new data becomes available, is useful. Estimates of memory and processor resources are useful guidelines for determining the number of levels to be added on to a new or existing superpattern lattice before reevaluating the utility of further expansion. Aggressive data preprocessing and lattice trimming are also useful (Recall §§4.2.5.1 and 4.2.5.2 above) for conserving resources.

Second, the existence of multiple embeddings of the root node pattern P(N) or superpatterns of it into data can cause additional complexity by: (i) increasing the number of children generated at subsequent levels of the lattice; (ii) needing an exhaustive list of embeddings of each node in the superpattern lattice into all data; and (iii) increasing the number of isomorphism checks over all generated children. Horizontal trimming (Recall §4.2.5.2.) may be used to reduce the number of siblings (that is, lattice nodes at the same level) generated. Maintaining embedding data at each node may be used to decrease the overhead of full embedding tests of children. Finally, maintaining entity node (and/or relationship link) id's may be used to reduce the task of performing isomorphism checks over all children to a sorting problem. For example, referring to FIG. 21, there are two (2) distinct embeddings of the pattern P into the data graph Q. FIG. 22 includes the first level of the superpattern cone generated from the pattern P assuming that the only existing data is the graph Q. Explicit mappings of entity nodes from the pattern P to the graph Q are denoted with colons (:). As an example, 1:3 indicates entity node 1 of the pattern P was mapped to entity node 3 of the graph Q. Note that the two (2) middle children are isomorphic. If this sibling isomorphism is not recognized, a redundant proliferation of subsequent generations will occur. Recall that the exemplary method 212' for adding a node to a lattice will not add the new node if its corresponding graph is isomorphic to a graph corresponding to an existing lattice node.

§4.2.6.2.3 Exemplary Methods for Generating a Superpattern Cone

The superpattern cone may be generated using either a depth first or a breadth first approach. In both approaches, the level to which the lattice is built may be specified. A depth first approach to generating a superpattern cone better reduces graph comparisons and is more compatible with incremental updates. On the other hand, a breadth first approach to generating a superpattern cone allows better horizontal trimming.

In either case, referring back to FIG. 20, the seed pattern P is a subpattern of the data GD (or P has at least one (1) embedding into GD). Entity nodes are then added to the graph associated with the seed pattern P such that (i) the resulting pattern is a subpattern of at least one of the data GD (or the resulting pattern has at least one (1) embedding into at least one (1) GD) and (ii) the resulting pattern is legal. FIGS. 23 and 24 are flow diagrams of an exemplary method for extending the seed pattern P such that the above two (2) conditions are met. Before describing this method, some useful notations are defined. Let I denote an embedding of the seed pattern P into a data graph G. Let r denote a relationship link in the data graph G having one (1) endpoint in the embedding I.

FIG. 23 is a flow diagram of an exemplary method 2300 for extending a graph to the point where the resulting graph has no dirty links. This exemplary method 2300 generates both a minimal "legal" extension of a subpattern Q in the graph G obtained by extending the pattern P with r and the extended embedding J of the subpattern Q in the graph G. Recall that "legal" refers to the notion that the source and destination of links in a subpattern Q are also contained in the subpattern Q. Note that if the endpoint of a link is another link, the embedding will be further extended as shown in the flow diagram of FIG. 24. It can be assumed, without loss of generality, that the source of r, source(r), is in the pattern P. Therefore the destination of r, dest(r), needs to be extended. Since the destination of r may be another link, the method may need to be called recursively to make the resulting graph legal. The following is pseudo code of the method 2300 of FIG. 23.

```
(Q, J) = Extend(P, I, r, G)
{
    Q = P ∪ r ∪ dest(r), q = dest(r)
    {Q, J} ← AddMore(q, Q, I)
    Return (Q, J)
}
```

Referring to FIG. 23, in step 2310, the data graphs G and the seed pattern P are accepted. Next, in step 2320, the embedding I of the seed pattern P into graph G, and a relationship link r in the graph G having one (1) endpoint in the embedding, are determined. Thereafter, in step 2330, a subpattern Q (that is, an extended pattern of seed pattern P which is a subpattern of a graph G) is initialized to be the union of the seed pattern P, the link r, and a destination q of the link r. In step 2340, an embedding extension J is initialized to the empty set. Finally, in step 2350, the embedding I is further extended if needed (that is, if the resulting subpattern Q is not legal). The process 2300 is then left via return node 2360.

FIG. 24 is a flow diagram of an exemplary method 2350' for extending an embedding more, if needed. The following is pseudo code of the process 2350' of FIG. 24.

```
(Q, J) = AddMore(q, Q, I)
{
    J ← I
    If q is a link, then
        Q ← Q ∪ dest(q) ∪ source(q)
        Extend J from I to include link q
        If dest(q) ∉ Q then {Q, J} ← AddMore(dest(q),
            Q, J)
```

```
            If source(q) ∉ Q then {Q, J} ←
            AddMore(source(q), Q, J)
            Return (Q, J)
        }
```

Referring to FIG. 24, the extended embedding J of the subpattern Q into the graph G is initialized to the embedding I as shown in step 2410. At decision step 2420, it is determined whether or not the destination of the link r is another link. If not, the subpattern Q is legal and process 2350' is left via return node 2480. If, on the other hand, the destination of the link r is another link, the subpattern Q must be further extended since, as it exists, it is not legal. As shown in step 2430, the embedding J is extended to include the destination of the link q. Next, as shown in step 2440, a new subpattern Q' is defined as the union of the old subpattern Q, the destination of the link q and the source of the link q. As shown in decision steps 2450 and 2460, if the destination of the link q or if the source of the link q was not already an element of the subpattern Q, as shown in step 2470 a new relationship link (r) in the graph (G) having one (1) endpoint in the embedding (J) is determined and processing continues to decision step 2420 (that is, the method is recursively called until the resulting subpattern Q is legal). Otherwise, if both the destination and source of the link q were already elements of the subpattern Q, the process 2350' is exited via return node 2480.

Having described a way in which a seed pattern P may be extended towards the graphs G of data D in which the pattern P is embedding, breadth first and depth first superpattern cone (1) generation processes which may use this technique are now described.

FIG. 25, which includes FIGS. 25A and 25B, is a flow diagram of a first exemplary method 216' for performing the superpattern cone (1) or superpattern lattice generation process 216. In the following, the full original data set is denoted by D. Particular graphs in D are denoted by G. The accepted initial (or seed) pattern is denoted by $P_0$. The subset of the data containing the pattern $P_0$ is denoted as $D(P_0)$. Thus, $D_0$ may be thought of as being a subset of the log data, for example. CurrentGeneration and NextGeneration are sets of lattice nodes for the current and next generation levels of the superpattern lattice under construction. A constructive approach is used to create the set of embeddings of each lattice node into the data. This set of embeddings will be denoted by E(N) for lattice node N.

The following is pseudo code of the method 216' of FIG. 25.

```
{
Begin the lattice with node N₀ = N₀(P₀)
Compute the data set D = D(P₀) and the set of E(P₀) =
Embeddings(P₀, D).
CurrentGeneration ={N₀}, NextGeneration = {∅}
While CurrentGeneration ≠ {∅} // the stopping condition
can also be a given depth
    Loop though every lattice node N ∈ CurrentGeneration
        Loop through every embedding I ∈ E(N)
            Loop through every link r connected to I(P(N)),
but not in I(P(N))
                {Q, J} = Extend(P, I, r, G) where G is the
            graph in the image of I
                AddNodeToLattice (N, child, M(Q))
                UpdateNextGeneration(M(Q), J ,NextGeneration)
```
```
        End link, embedding, & node loops
        Trim nodes in NextGeneration if desired // if E(M)
    ⊆ E(N) then delete M
        CurrentGeneration ← NextGeneration, NextGeneration =
{∅}
End while
}
```

Note that trimming routines, as introduced in §4.2.5.2 above, can be called before updating the next generation level of the superpattern lattice.

Referring now to FIG. 25, in step 2505 data (D) as graphs G in the data D, as well as an initial seed pattern $P_0$ are accepted. Note that the data may have been preprocessed as described in §4.2.5.1 above with reference to FIG. 16. Next, as shown in step 2510, a start node $N_0$ is set to the initial seed pattern $P_0$. Next, as shown in step 2515, a subset of the data containing the seed pattern $P_0$ (that is, graphs G of which the seed pattern $P_0$ is a subgraph) is determined. Then, as shown in step 2520, embeddings of the seed pattern $P_0$ on the subset of the data D are determined. In step 2525, sets of lattice nodes for layers of the superpattern lattice under construction are initialized. More specifically, a current generation set of lattice nodes is initialized to the lattice node $N_0$ (which corresponds to the seed pattern $P_0$), and the next generation set of lattice nodes is initialized to the empty set. Processing continues, via node A 2530, to a set of nested loops.

Loop 2535–2594 contains a loop of steps carried out while the current generation set of lattice nodes is not empty. This loop 2535–2594 includes a loop 2540–2580 which contains a loop of steps carried out for each lattice node which is an element of the current generation (Recall that the method 216' is breadth first.). This loop 2540–2580 includes a loop 2545–2575 which contains a loop of steps carried out for each embedding which is an element of the embedding of a current node. This loop 2545–2575 includes a loop 2550–2570 which contains a loop of steps carried out for each link having only one (1) end connected to the embedding. Finally, this loop 2550–2570 defines a loop of steps starting with step 2555 in which the embedding (specified by loop 2545) is extended (Recall the methods described above with reference to FIGS. 23 and 24.) using the link r (specified by loop 2550). Next, step 2560 determines whether or not to add the new node (as defined by the extended embedding) to the superpattern lattice, and more specifically, to the current generation set of nodes. (Recall the method described above with reference to FIG. 18.) In step 2565, the next generation sec of lattice nodes is updated to include any new lattice nodes added.

Outside of the loops 2540–2580, 2545–2575, and 2550–2570, yet within the loop 2535–2594, optional steps 2585 and 2590 may be performed. More specifically, in decision step 2585, it is determined whether the extended embedding defining lattice node M is a subpattern of an embedding defining lattice node N. If so, the lattice node M defined by the extended embedding may be deleted, as shown in step 2590. These steps "find" a new lattice node M to be added. Step 2585 determines whether the node M has already "existed" in the lattice. If so, the node M is not added to the lattice, as shown in step 2590.

Next, as shown in step 2592, the levels of the superpattern lattice being generated are incremented. More specifically, the current generation set of lattice nodes is set to the next generation set of lattice nodes and the next generation set of lattice nodes is set to the empty set. As shown in step 2594, if the current generation is not empty, processing continues to step 2535. Otherwise, the method 216' is left via RETURN node 2596. Note that if the superpattern lattice is only to be generated to a predetermined depth, the loop 2535–2594 will loop through the number of predetermined layers.

Referring back to step 2565, the next generation set of lattice nodes is updated. FIG. 26 is a flow diagram of an exemplary method 2565' for performing this step. The following is pseudo code of the exemplary method 2565' of FIG. 26.

```
UpdateNextGeneration (M(Q), J, NextGeneration)
{
If M(Q) ∉ NextGeneration then // needs Isomorphism, can
use hash function
    NextGeneration ← NextGeneration ∪ M(Q); E(M) = J
Else // Q = P(N) for some existing node N ∈
NextGeneration
    If J(Q) ≠ I(Q) for all I∈ E(N) then E(N) ← E(N) ∪ J
End If
}
```

UpdateNextGeneration means adding the lattice node and its associated embedding map into the next generation set of lattice nodes.

Referring now to FIG. 26, at decision step 2610, it is determined whether or not the new lattice node (M) added to the subpattern (Q) is an element of the next generation set of lattice nodes. If not, as shown in step 2620, the next generation set of lattice nodes is updated as the union of the next generation set of lattice nodes and the new node (M) and, as shown in step 2630, the embedding of the new lattice node (M) is set to the extended embedding J. If, on the other hand, the new lattice node (M) is already an element of the next generation set of lattice nodes, processing continues to decision step 2640. Decision step 2640 determines whether or not the embedding J(Q) of the new lattice node (M) to the subpattern (Q) is not equal to the embedding I(Q) of the existing lattice node (N) to the subpattern (Q) for all embeddings (I) of the lattice node. If so, the embedding of the lattice node is updated to include the embedding (J) of the new lattice node M to the subgraph Q and the process 2565' is left via return node 2660. Otherwise, the process 2565' is directly left via return node 2660.

Having disclosed an exemplary method for generating a superpattern cone in a breadth first manner, an exemplary method 216" of generating a superpattern cone in a depth first manner is now disclosed with reference to FIGS. 27 and 28. Recall that that horizontal trimming cannot be called in a straightforward manner in this approach. On the other hand, the depth-first approach is a natural way to incrementally update the lattice. The following is pseudo code of the method 216" of FIG. 27.

```
{
Begin the lattice with node N₀ = N₀(P₀) and data set
D=D(P₀)
Loop through every data graph G in D
    Loop through every embedding I∈ Embeddings(P₀, G)
        GrowChildren(N₀, I, G)
        Trim nodes if desired        // if E(M) ⊆E(N)
        then delete M
End embedding, graph loop
}
```

Referring now to the flow diagram of FIG. 27, as shown in step 2710, the method accepts a seed pattern $P_0$ and a data set D (or graphs G of the data D). Note that the data may have been preprocessed as disclosed in §4.2.5.1 above with reference to FIG. 16. Next, as shown in step 2720, the lattice node No is initialized to the seed pattern $P_0$ and the data set is initialized to the subset of data containing the seed pattern $P_0$.

Steps within the loop defined by steps 2730 and 2780 are performed for all graphs G in the subset of data. The loop 2730–2780 nests another loop, which is defined by steps 2740 and 2770. The steps within the 2740–2770 loop are performed for each embedding I which is an element of embeddings of the seed pattern $P_0$ in the graph G. Within the loops 2730–2780 and 2740–2770, the following steps are performed. In step 2750, children lattice nodes from the lattice node No are grown based on the embedding I (as specified by loop 2740–2770) and graph G (as specified by loop 2730–2780). Next, optional steps 2760 and 2765 may be performed to effect a vertical trimming as introduced in §4.2.5.2.1 above. More specifically, in decision step 2760, it is determined wherein the embedding of the new lattice node M is a subset of the embedding of the lattice node N. If so, the lattice node M can be deleted as shown in step 2765. When the loop 2730–2780 is completed, the process 216" is left via RETURN node 2790.

Referring back to step 2750, the children lattice nodes are grown from the lattice node $N_0$ based on the embedding I and the graph G. FIG. 28 is a flow diagram of an exemplary method 2750' for performing this step. The following is pseudo code of the method 2750' of FIG. 28.

```
GrowChildren(N, I, G)
{
loop through every relationship link r connected to
I(P(N)) but not in I(P(N))
    {Q, J} = Extend(P, I, r, G)
    AddNodeToLattice(N, child, M(Q))
    GrowChildren(M, J, G)
End link loop
}
```

As can be appreciated from the foregoing pseudo code, the GrowChildren function takes the current lattice node and recursively grows children lattice nodes from it.

Referring now to the flow diagram of FIG. 28, in step 2810, the lattice node $N_0$, the embedding I, and the graph G are accepted. A loop defined by steps 2820 and 2860 performs steps for every relationship link r having only one (1) end connected to the embedding I. Within the loop 2820–2860, three (3) steps are performed. First, the embedding is extended as shown in step 2830 (Recall FIGS. 23 and 24 described above.). Next, the new node is added to the lattice, if it does not already exist (Recall FIG. 18 described above.) as shown in step 2840. Finally, children are grown from the new node as shown in step 2850. That is, the process 2750' grows children by calling itself recursively. When the loop 2820–2860 is complete, the method 2750' is left via RETURN node 2870.

Both basic methods may be used in concert—the breadth first method may be used to build a superpattern cone to a specific level and the depth first method may be used to continue to build it to some extra levels.

§4.2.6.2.3.1 Alternative Method for Generating a Superpattern Cone

Recall that the superpattern cone of a given seed pattern S is the set of all lattice nodes N(P), P⊇S and all the associated lattice edges. In this alternative method, the embedding and expansion information is attached to the lattice edges so that the lattice can be maintained dynamically as an efficient hierarchical indexing mechanism of the graphical data. Recall that, the size of a complete super pattern cone generated from a seed pattern and a collection of log or content graph data can be huge (exponential with respect to the size of the input graphs). To build a complete lattice will lead to intensive memory and CPU usage. Besides, to make the pattern lattice applicable for real-world applications with dynamic data, incremental updates may be necessary (given the fact that the input graphical data are not static in most cases and that rebuilding the whole lattice each time a new item graph arrives would be undesirable).

The following are goals for the superpattern cone and the solutions provided by this alternative method of generating a superpattern cone. First, in a "correctly expanded" lattice, a unique lattice node will be built if and only if expanding the pattern it contains "distinguishes two different embedding images of either the same or different item graphs. Hence, the pattern contained in a lattice node should be a "maximal" common pattern of two or more item graphs. Constructing less lattice nodes will lose information of common patterns. Second, when building and maintaining the lattice, to avoid any intensive re-computations, lattice edges are used to store the embedding and relevant expansion information between lattice nodes. This information can be easily cleaned up to efficiently derive a "clean" lattice if required by a utility like classification or categorization. Third, given a new item graph, theoretically, all of the sub-graphs of the new item graph would need to be checked to determine whether a new lattice node is needed (the size of the search space for all sub-graphs of an item graph is essentially exponential with respect to the size of the item graph). With the extra information stored on lattice edges and by keeping track of the visited lattice nodes, it is ensured that all search steps proceeded are necessary. Consequently, inserting an item graph becomes a "cheap" operation. More specifically, the history is tracked and only the lattice nodes that have not been visited within this insertion are visited. Also, only the "maximal" common pattern between the new input graph and the patterns stored in the lattice nodes built are found. In general, the maximal common pattern of two given graphs may not be unique, which causes some extra complexity. This complexity is reduced by considering the "maximal common pattern" in a more restricted sense, as described below in more detail. If an input item graph identical to a pattern stored in some lattice node is found, this item graph is considered to have been "inserted" before and the insertion operation may be left immediately without checking other possible embeddings or search paths. This is especially useful when repeated graphical data exists and frequency information is to be gathered for analysis. Fourth, the lattice is expanded only as needed. A new item graph G will be connected to the seed pattern with some "lazy" links from the seed pattern for later expansion. The lattice is expanded when necessary during navigation or to a certain level as the applications request. The implementation of lazy links further reduces memory usage for the insertion operation and provides flexibility of the lattice expansion.

FIG. 54 illustrates an example of this alternative superpattern cone generation process. The input graphs are $G_1$ and $G_2$ and the seed pattern is A. The complete superpattern cone generated there from is depicted in FIG. 55, while the "correctly expanded" superpattern cone generated with this alternative method is depicted in FIG. 56. Note that in FIG. 55, there are two lattice edges connecting lattice nodes N and M. These two lattice edges indicate the two different embeddings of N into M. By explicitly keeping the embedding information, any re-calculations are avoided. In this way, the lattice may be updated and expanded efficiently. When the superpattern cone is used for classification or other utilities, a "cleaned" minimal superpattern cone may be used, as shown in FIG. 57.

Again, one of the main differences from the previous method of generating a superpattern cone and this alternative method is that, instead of letting the lattice edge be an empty structure, the lattice edges now are associated with all of the embedding and expanding (i.e., the allowable frontier edges) information. Recall that a lattice edge may be directed from a sub-pattern (source) to a super-pattern (destination). This implies that there is one embedding of the sub-pattern into the super-pattern. In some cases, there are multiple embeddings because of the self-similarity of the super-pattern. One lattice edge is created for each of such embeddings since they indicate different search paths. For example, as shown in FIG. 58, there are two different embeddings of the sub-pattern into the super-pattern. Another more complicated example is illustrated in FIG. 59, in which, all the $B_i$'s are identical and equivalent when sub-patterns are embedded into super-patterns. These multiple embeddings may be distinguished when the embedding information is recorded on the lattice edge so that the further expansion path can be easily and uniquely determined (e.g., that $B_3$ has neighbor C makes it different from $B_4$ when the graph is expanded). Hence, two different embeddings of the sub-pattern in the super-pattern exist, although the embedding images are the same. In other words, the graph nodes of patterns are uniquely labeled when the embedding/expansion information is recorded.

Apart from the embedding information, the "essential" ways that one may expand the sub-pattern to the super-pattern is tracked. These ways are referred to as the allowable frontier links. To define the frontier links, the expandable links are first defined as follows:

Definition: Expandable links. Let $G_1$ be a subgraph of $G_2$ with respect to the embedding $\epsilon$: $G_1 \rightarrow G_2$. Then $\eta$ is an expandable link from ($\epsilon$, $G_1$, $G_2$) if $\eta$ is a link in $G_2-\epsilon(G_1)$ and one of the connecting nodes of $\eta$ is in $\epsilon(G_1)$.

Definition: Frontier Links. Let E be a lattice edge from lattice nodes $N_1$ to $N_2$ associated with the embedding $\epsilon$: $N_1 \rightarrow N_2$. If $\eta$ is a frontier link on E, if $\eta$ is an expandable link for ($\epsilon$, $P(N_1)$, $P(N_2)$).

That is, the Frontier (Expandable) links are defined by shrinking the embedding (in the super-pattern) of the sub-pattern to a single "virtual" node—all links incident to it are Frontier(Expandable) links with respect to this embedding. An example of Frontier links is shown in FIG. 60.

However, all the frontier links of the sub-pattern in the super-pattern may not be associated with to the lattice edge connecting them since paths from the sub-pattern to the super-pattern, other than taking the lattice edge directly, may exist. Thus, the expansion information actually stored in lattice edges is usually a subset of all the frontier edges as shown in the right lattice of FIG. 61; while a complete lattice is represented in the left lattice of FIG. 61. In the right lattice of FIG. 61, notice that although all A→B, A→C, A→D are frontier links of A in the left-most pattern. Only A→D is associated to the direct lattice edge and the other two, A→B and A→C, lead to another smaller pattern. Hence, a frontier link is associated with a lattice edge if the lattice edge points to the smallest super-pattern that contains both the sub-pattern and the frontier link. Such frontier links are called the allowable frontier links. The following is a formal definition of allowable frontier links:

Definition: Allowable frontier links. Let E be a lattice edge from lattice nodes $N_1$ to $N_2$ associated with the embedding $\epsilon$: $N_1 \rightarrow N_2$. Then $\eta$ is an allowable frontier link on E if 1. $\eta$ is a frontier link on E
2. with the current lattice expansion, $N_1$ can not reach $N_2$ through any other lattice paths with the same embedding $\epsilon$.

From the second property of the allowable frontier links defined above, each lattice edge can be updated dynamically, locally and independent of the processing orders. That is, $\eta$ is an allowable frontier link if $\eta$ is not contained in one of the embeddings of the in-links of $N_2$.

Recall that, in addition to the pattern stored, the lattice node may also store some statistical information (e.g., the frequency information and some indirect way of storing a "list of item graphs"). The statistical information may be made to accommodate the expiration of data.

The following method uses the concepts of the lattice edges, lazy links and escape links. These edges and links are derived from the same structure; L-edge. An L-edge ($\epsilon$, N, G, L) or ($\epsilon$, N, M, L) is a directed link from a lattice node N to either a graph item G or a lattice node M. $\epsilon$ is an embedding of P(N) to G or P(M) and L is a subset of the expandable links of ($\epsilon$, P(N),G) or ($\epsilon$, P (N) P (M)). A lattice edge is an L-edge ($\epsilon$, N, M, E), where L is the set of allowable frontier links of $\epsilon$. Lazy and escape links are different L-edges of type ($\epsilon$, N, G, L).

The method involves calling the following two functions interchangeably. They are AddGraph(G) and ExpandLattice (k), where G is a given input graph and k is the number of depths of the lattice to be expanded. Here the number of depths is defined by the number of lattice edges in the shortest directed path from any existing lattice node to the root lattice node.

In the AddGraph(G) function, it is first determined whether or not the seed pattern S is a subgraph of G. If not, nothing is done and the routine is left. Otherwise, for each of embedding $\epsilon$ of the seed pattern S to G, L is defined as the set of all expandable links of $\epsilon$ and a lazy link ($\epsilon$, N(S), G, L) is added. Note that at this time, the item graph G is not considered as an expanded lattice node.

In the ExpandLattice(k) function, all lazy links out of the expanded lattice nodes of depth less than k will be propagated down to depths greater than k or deleted. This algorithm proceeds by looping through all lazy links ($\epsilon$, N, G, L) to the lattice nodes N in the shallowest depth $\leq k$ and looping through all edges in L. Within the loops, the ExpandLattice (($\epsilon$, N, G, L), $\eta$) function is called, the Insert(G) function is called, and the N visited by G is marked. The Insert(G) function will do nothing unless there are no more lazy links to G. Then the Insert(G) function will insert G into the "expanded" lattice as a lattice node N(G) and update all the escapes links to G to lattice edges to N(G). The ExpandLattice(($\epsilon$, N, G, L), $\eta$) function will first check if $\eta$ is equivalent to any of the allowable frontier links on the out-links of N. If not, an escape link ($\epsilon$, N, G, {$\eta$}) and L=L-$\eta$ are added and the routine is left. Otherwise, $\eta$ is propagated downwards. The result of propagating $\eta$ downwards involves stepping a super-pattern lattice node M of N and updating the lazy links ($\epsilon$, M, G, {expandable links}). The lattice node M will represent the "maximal" common pattern P guided by N and $\eta$.

The "maximal" common pattern P is defined by the notion of the biggest common pattern of any "expanded" lattice superpattern of N containing $\eta$ and the item graph G associated with $\epsilon$. As will be seen from the following lemma, the "maximal" common pattern P can be found by only working with the "smallest" super pattern lattice node of N and $\eta$.

Lemma: Let $\epsilon$ be an embedding from current lattice node N to an item graph G and $\eta$ be an expandable link of ($\epsilon$, P(N), G). Let $\{\rho_i\}$ be the lattice edges out of N with an allowable frontier edge equivalent to $\eta$ and denote $\{N_i\}$ as the destinations of $\{\rho_i\}$. Then there is a complete ordering in $\{N_i\}$, i.e. modulo an index permutation, and $N_1 \leq N_2 \leq \ldots \leq N_k$.

Note that even though there is only one superpattern lattice node $N_1$ to deal with, there still might be multiple lattice edges $\{\rho_i\}$ from N to $N_1$. They represent different embeddings of N to $N_1$. The maximal in the "maximal" common pattern reflects the goal of finding the maximal common pattern $P_i$ within an embedding of $\rho_i$. The quotation is used to reflect that the "maximal" common pattern P is the biggest common pattern. of all $\{P_i\}$. This ensures that the expanded lattice is independent of insertion order.

If P' is the smallest legal graph containing $P(N) \cup \eta$ and $\epsilon$ is the corresponding embedding of P' in G extended from $\epsilon$, the search for the "maximal" common pattern P is guided by E={all expandable links of $\epsilon$}, $\{\alpha_{i=\rho i}\}$ and F={$\eta$}. Note that if E=$\emptyset$, then P=P', and is identical to G. The search of P below will continue until E=$\emptyset$. If E$\neq\emptyset$, take $e_1 \in E$, let E=E-$e_1$ and define $\tilde{P}$ as the smallest legal graph containing P'$\cup e_1$. If, for all $\alpha_i=(\epsilon_i, P', G)$, there exists at least one expandable edge $\eta_i$ of $\alpha_i$ equivalent to $e_1$ and if the smallest legal graph of $\epsilon_i$ (P') and $\eta_i$ is isomorphic to $\tilde{P}$, then let P'=$\tilde{P}$, F=F$\cup\{\eta_i\}$, $\{\alpha_i=(\epsilon_i, P',G)\}$, where $\{\epsilon_i\}$ is the set of all possible embeddings extensions generated from $\{\epsilon_i\}$ to P'=in $N_1$. Note that, each $\epsilon_i$, could generate more than one $\epsilon_i$. The process is recursively repeated until E=$\emptyset$.

Figure 63:
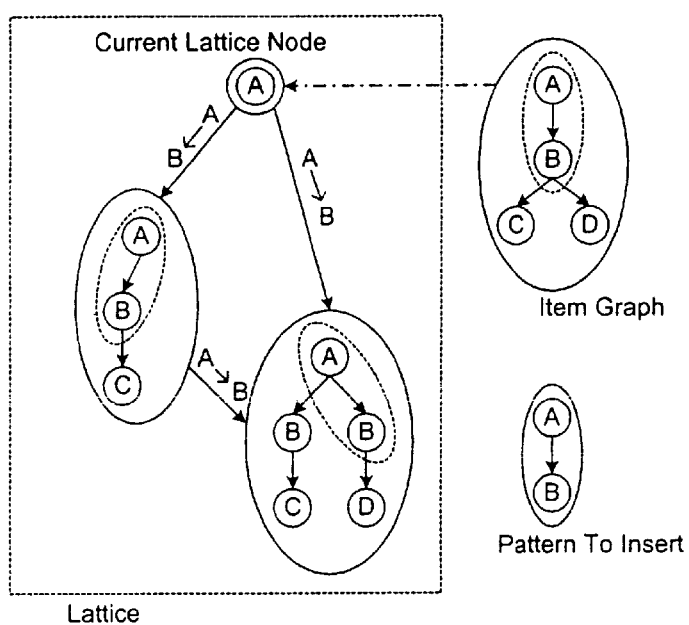
Figure 64:
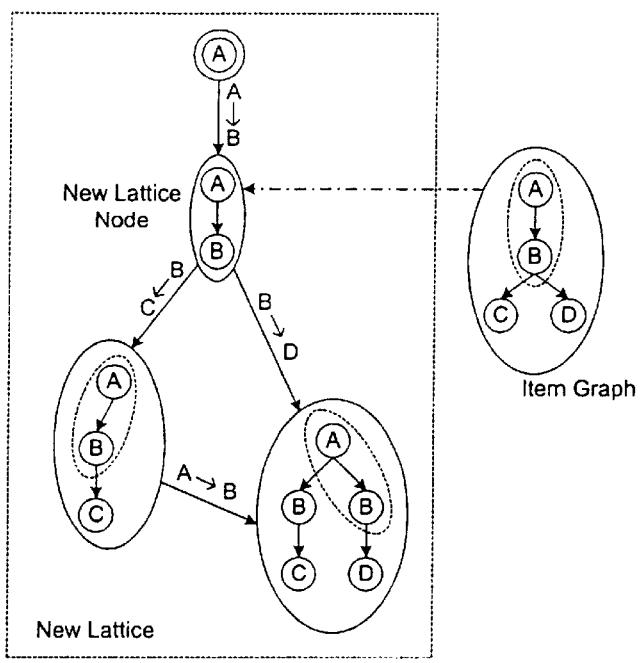

FIG. 62 illustrates an escape link and an expandable link and FIGS. 63 & 64 illustrate an example of a "maximal" common pattern.

If the "maximal" common pattern $P'=N_1$, that means $M=N_1$ and no updating the lattice is necessary. Furthermore, if P'=G, then delete all lazy and escape links to G. If $N_1$ is not visited by G, then use $\{\alpha_i=(\epsilon_i, P', G)\}$ to add lazy links from M to G.

If P'$\neq N_1$, then add a new lattice node M(P') between N and $N_1$, and update the lattice. Then also use $\{\alpha_i=(\epsilon_i, P', G)\}$ to add lazy links from M to G.

Now the only missing piece left is how to update the lattice efficiently. In general, more lattice edges may need to be added, updated or deleted to guarantee a "correctly expanded" lattice. Here it is first shown that updating the lattice is a local operation of N and $N_1$.

Lemma: After inserting a new lattice node M between a current node N and its super pattern node $N_1$, the corrected expanded lattice can be obtained by examining only the lattice edges directly to and from either $N_1$ or N.

Figure 65:
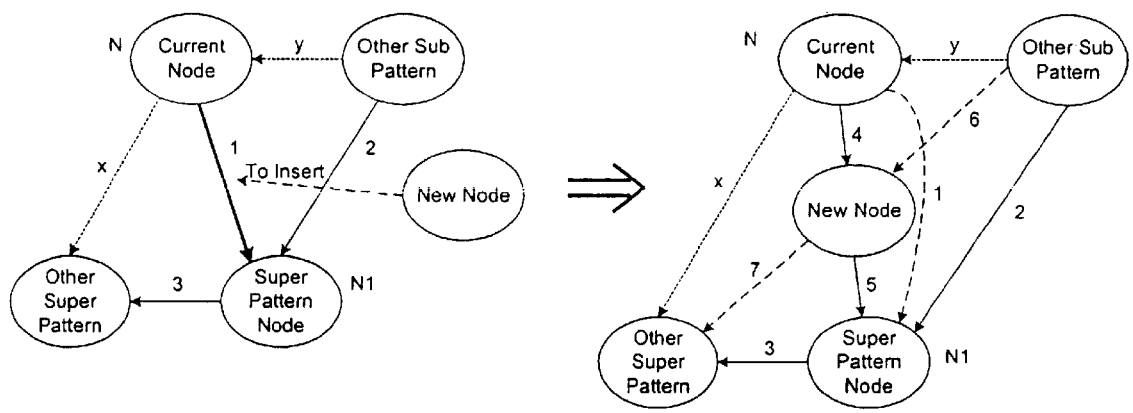
Figure 66:
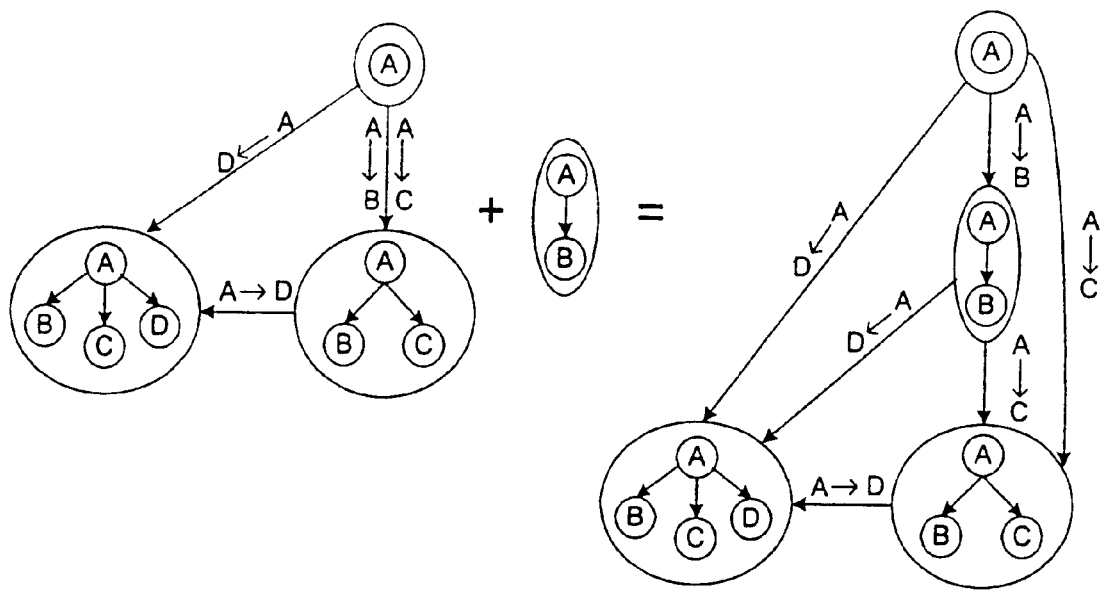

Next, the set of lattice edges that needs to be examined is shown. FIG. 65 illustrates a case study of the lattice edge types that need to be examined during the updating of the lattice, while the general case allows multiple copies of the lattice edges in each edge types. In FIG. 65, the edges 1, 4 and 5 can be derived and updated by the information provided in the edge 1, $\{\alpha_i\}$, $\{\rho_i\}$, and F. One can easily see that the edges x and y neither provide any information to update the lattice, nor needs to be updated when the new lattice node is inserted. Therefore the only lattice edges that need to be examined are the edges 2 and 3; i.e. the direct edges of $N_1$.

The updating of each of the edge types is now described. First, each embedding of P(N) to P' gives an edge of type 4 and each $\alpha_i$ give an edge of type 5, in both cases, with the allowable frontier edges be all of the frontier edges. The allowable frontier edges $\delta$ on edge 1=($\epsilon_1$,N,$N_1$) can be updated by the following allowable frontier edge deletion criteria with respect to N, M, and $N_1$. If for any frontier edge λ of edge 4=($\epsilon_4$,N,M), and for any ($\epsilon_5$,M,$N_1$) if $\epsilon_5$(λ)=δ and $\epsilon_5$ °$\epsilon_4$=$\epsilon_1$, then delete δ out of the set of the allowable frontier edges for edge 1.

For edge 2, first check if the other subpattern Q is a subpattern of M, if not, do nothing. Otherwise, each edge of type 6 will be generated by each embedding of Q to M with the allowable frontier edges being all of the frontier edges. The allowable frontier edges of edge 2 are updated with the above allowable frontier edge deletion criteria with respect to Q, M, and $N_1$.

For edge 7, all the frontier edges of M to the other superpattern R are found, and the allowable frontier edges of edge 7 are computed with the above allowable frontier edge deletion criteria with respect to M, $N_1$, and Q. (See FIG. 66 for illustrations.)

With the superpattern lattice built in accordance with this alternative method, a direct application is to classify the item graphs using the common patterns found when building the lattice. With current minimally built lattice, this is simpler and more straightforward since only necessary lattice nodes are built and can be used directly for classification, instead of looking for "meaningful" patterns in the completely built lattice.

The scenario for this approach is that a collection of graphical data matching certain searching criteria is had. Instead of listing all of them unorganized, they may be classified automatically. For instance, if the user searches for a specific keyword and there are hundreds of records containing it (assuming that all the records are graphical data), a lattice with the specified keyword as the seed may be built. Then the lattice nodes of one level down from the seed give a natural and complete classification of all the item graphs, and each category can be further classified by the lattice nodes in the lower level. This gives a much better organized way for the user to navigate the search results. For more complicated cases (e.g., if the user specifies more than one keyword or pattern), the separated index can help to locate patterns matching all search criteria. Navigation may then take place from there.

The second approach works in the opposite direction and is more like a summarization method. Starting from all item graphs, common patterns in upper levels are tried to represent the lower level graphical data. With this alternative method of generating a superpattern lattice, it's easy to find the lowest level common patterns for each pair of item graphs. By defining certain heuristic distance function for each pair of item graphs based on their common pattern so found (e.g., the longer path of these two to their ancestor), the closest pair can be repeatedly merged and their common pattern can be used to represent them, until certain criterion are met.

Having defined superpattern cones and having disclosed methods for generating a superpattern cone or lattice, subpattern cones are now discussed in §4.2.6.3 below.

§4.2.6.3 Managing Subpattern Cones

This section discloses exemplary methods for generating a subpattern cone as defined in §4.2.4 above. Recall from §4.2.4 above that a subpattern cone conceptually consists of all lattice nodes that correspond to subpatterns of the seed pattern. Like the pattern lattice, a subpattern cone is a conceptual framework. As with the pattern lattice, the function here is not to build the "complete" subpattern cone, but rather, to determine the minimal cone that is needed. Naturally, this minimal cone can be expanded. Thus, as referenced below, a "subpattern cone" is not necessarily a "strict" or "complete" subpattern cone containing all lattice nodes corresponding to graphs that correspond to subpatterns of the specified seed pattern, as well as corresponding links. Subpattern cones are useful for finding and defining "similar" patterns as will be described in §4.2.7.2 below and for linking patterns as will be described in §4.2.7.3 below. Similarity can be defined to be a measurement of the size of common subpatterns. In the following, a subpattern cone is defined in §4.2.6.3.1, factors affecting the complexity of subpattern cones are discussed in §4.2.6.3.2, and exemplary methods which may be used to generate subpattern cones are disclosed in §4.2.6.3.3.

§4.2.6.3.1 Subpattern Cone Definition

The subpattern cone can be defined as:

$$C_{sub}(N)=\{N'|\text{SubPattern}(N',N)=\text{True}\}$$

All patterns in $C_{sub}(N)$ are contained in the pattern of lattice node N.

Subpattern lattices are driven only by a seed pattern P. No additional data are needed to determine the cone since all interior nodes are subpatterns of the seed pattern. As shown in FIG. 29, the seed pattern P 2910 is shown at the vertex of the subpattern cone 2920 which is depicted by heavier lines. The log data 2930, either defined by a portion of the seed pattern or having a portion of the seed pattern as a subpattern, are shown in the subpattern cone 2920 originating from the pattern 2910.

§4.2.6.3.2 Factors Affecting Complexity of Subpattern Cones

As stated in §4.2.5, requiring all lattice nodes to represent connected patterns greatly reduces the size of the pattern lattice. However, this reduction does not come without computational costs. Section 4.2.6.3.3 addresses efficient methods for selecting links and ensuring that their removal preserves the connectivity of parent nodes.

§4.2.6.3.3 Exemplary Methods for Generating a Subpattern Lattice

A complete subpattern cone, by definition, would represent all combinatorial subpattern possibilities of a given pattern. Representing (or determining and/or storing) all of these possibilities is not practical at this time. For example, the simple linear arrangement of n entity nodes generates O(n!) (i.e., on the order of n factorial or n×n−1×n−2×...×1) candidate subpatterns, $O(2^n)$ of those subpatterns being distinct. However, the total number of all connected subpatterns is much smaller and is, in fact, equal to ½ (n+1)(n+2).

Basically, the construction of the subpattern cone or subpattern lattice is the process of removing links from the seed pattern and legalizing, if necessary, the remaining connected patterns.

FIG. 30 is a flow diagram of an exemplary method 3000 for generating a subpattern cone in a simple way. The following is pseudo code of the method 3000 of FIG. 30.

GrowParent (P)
{
Loop through all links r ∈ P
   Legalize all connected components of P\r,
   Loop through all legal connected components Q
      If the lattice node N(Q) is new,
         Add Q to the lattice.
         Call GrowParent (Q).
}

Referring now to FIG. 30, as shown in step 3010, the seed pattern P is accepted. Steps 3020 and 3070 define a loop through all links r which are elements of the seed pattern P.

Within the loop 3020–3070, the following steps are performed. First, as shown in step 3030, all connected components of the pattern P having the relationship link r are legalized. That is, any dirty links are removed. Steps 3040 and 3060 define a loop through all legal connected entities (Q). Within the loop 3040–3060, decision step 3050 determines whether or not the node N(Q) is new. If so, as shown in step 3052, the node N(Q) is added to the lattice and, as shown in 3054, the node N(Q) is treated as the seed pattern (P) in a recursive loop based on the node N(Q) to step 3020. Referring back to decision step 3050, if the node is not new, processing continues to the loop 3060. When the loop 3040–3060 is complete, processing continues to loop 3070. When the loop 3020–3070 is complete (and if the method 3000 I not being called recursively), the method 3000 is left via RETURN node 3080.

The exemplary method 3000 described above is an inefficient way to construct the subpattern cone. An optimization of this process will now be described. Before doing so however, more definitions are provided. Consider patterns P without any dirty links. Removing any relationship link could segment the pattern P into at most two (2) connected components $P_1$ and $P_2$. Without loss of generality, assume that $\#P_1 \leq \#P_2$ (that is, the number of relationship links in $P_1$ is less than or equal to the number of relationship links in $P_2$). The component $P_2$ is the largest component obtained by cutting a relationship link r in the pattern P. A "separation link" is a special type of relationship link that separates a pattern P into two (2) legal connected components $P_1$ and $P_2$ such that $\#P_1=0$. In this case, the pattern component $P_1$ is either empty or a single entity node.

A first optimization to the exemplary method 3000 of FIG. 30 is to only add the pattern component $P_2$ to the lattice. This optimization is valid because given a pattern P without any dirty links, any connected subpattern $Q \subseteq P$ can be obtained by removing a sequence of separation links in a maximal component way. What this implies is that for non-dirty graph patterns, the method 3000 of FIG. 30 can be optimized as shown in the flow diagram of FIG. 31 which illustrates an exemplary optimized method 3100 for generating subpattern cones for non-dirty graph patterns. The following is pseudo code of the method 3100 of FIG. 31.

```
GrowParentSeparation(P)
{
Loop through all separation links r ∈ P. Denote the
largest component of P\r as P₂
    If the lattice node N(P₂) is new
        Add P₂ to the Lattice.
        Call GrowParentSeparation (P₂).
}
```

Referring to FIG. 31, as shown in step 3110, the seed pattern P is accepted. Steps 3120 and 3170 define a loop through all separation links r which are elements of the seed pattern P. Ways to determine whether a link is a "separation link" are described later. Within the loop 3120–3170, step 3130 determines the largest component of the pattern P having the relationship link r. This component is denoted by $P_2$. Next, as shown in decision step 3140, it is determined whether or not the lattice node defined by component pattern $P_2$ is new. If not, the loop 3120–3170 continues. When the loop through all separation links (r) of the pattern P is complete, the process 3100 is left via RETURN node 3180. Referring back to decision step 3140, if, on the other hand, the lattice node defined by component pattern $P_2$ is new, as shown in step 3150, the lattice node N($P_2$) is added to the lattice and, as shown in step 3160, is treated as a seed pattern for a recursive call of the method 3100.

Unfortunately, the process 3100 affords an optimization only for non-dirty (that is, legal) graph patterns. Dealing with general patterns containing dirty links is now described. Recall that the construction of the subpattern cone can be thought of as a process of removing links from the seed pattern and legalizing, if necessary, the remaining connected components as candidate subpatterns. Legalization is performed if the resulting subpattern includes dirty links. Any legal connected subpattern Q which is a subpattern of pattern P (that is, $Q \subseteq P$) can be obtained by first removing all dirty links in the pattern P or the subpattern Q, keeping the component containing the subpattern Q, and then by removing a sequence of separation links. After removing any dirty links in the pattern P or the subpattern Q, the subpattern Q is contained in one of the remaining legalized connected components. This is true since the subpattern Q is a connected legal subpattern and the legalization of a legal pattern is the legal pattern itself. This implies that by cutting all dirty links in P{Q (that is, all elements of P that are not elements of Q={x|x ∈P, x ∈Q}), the subpattern Q may be found in one of connected legal components.

FIG. 32A is a flow diagram of an exemplary method 3200 which basically uses the method 3000 of FIG. 30 for dirty links and the method 3100 of FIG. 31 for non-dirty links. The following is pseudo code of the method 3200 of FIG. 32A.

```
Construct Subpattern Lattice from P:
{
GrowParentDirty(P) // call GrowParent but only loop on
dirty links
Loop through all lattice nodes N generated from
GrowParentDirty(P)
    // call GrowParentSeparation but only loop on non-
soiled separation links
    GrowParentNonSoiled (N(P))
End loop
}
```

In the flow diagram of FIG. 32A, the seed pattern P is accepted as shown in step 3210. Steps 3220/3020 and 3070/3170/3270 define a loop through all relationship links r which are elements of the set pattern P. Within the loop, as shown in decision step 3230, it is determined whether or not the relationship link r is dirty. If so, basically the steps of the naive subpattern generation method 3000 are carried out. Otherwise, at decision step 3240, it is determined whether or not the relationship link r is a "separation link". If not, the loop continues. If so, basically the subpattern generation method for non-dirty graph patterns 3100 is carried out.

The method 3100 of FIG. 31 included a step of looping through all "separation links" which are elements of a seed pattern P. The method 3200 of FIG. 32A included a step of determining whether a non-dirty link is a separation link. The following describes how to determine whether or not a relationship link is a "separation link". Basically, separation links have two (2) signatures—(i) either they appear as relationship links in cycles or (ii) as relationship links between an isolated entity node and the rest of the pattern (also referred to as degree-one links).

Degree-one links are trivial to detect by simply computing or maintaining entity node degrees. For purposes of finding separation cycles, orientation on edges can be ignored and patterns can be viewed as undirected graphs. Since techniques for detecting and enumerating cycles in undirected graphs are well known in the computer science literature, their details are not described here.

An example of finding separation links is described below with reference to FIG. 33. Note that a cycle of a subpattern $P_2$ of pattern P (i.e., $P_2 \subseteq P$) is also a cycle of the pattern P. Therefore, a list of all cycles of the pattern P is maintained. After removing each cycle separation link, this list may be quickly updated to give a list of remaining cycles. As an example, in FIG. 33, the following information may be computed:

Set of degree-one edges={7};

Set of "fundamental" cycles S={a={1,2,3,4}, b={3,5,8}, c={4,8,6}};

Set of all cycles={a={1,2,3,4},b={3,5,8}, c={4,8,6}, a+b={1, 2, 4, 5, 8};

a+c={1,3,8,6,2}, b+c={3,4,5,6}, a+b+c={1,2,5,6}}; and cycles=$2^{\#s}-1=2^3-1=7$.

The "+" of cycles notation means the mod 2 operation of keeping only relationship links that occur only an odd number of times in the new list of edges. As is shown, the set of all cycles can be generated through the fundamental cycles S and the operator "+."

In the example of FIG. 33, after removing link 3, all pre-computed cycles containing link 3 may be eliminated. Link 3 is contained in the fundamental cycles a and b. The subpattern obtained by removing link 3 now has the set of cycles {c, a+b, a+b+c} and fundamental cycles={a+b, c}. The new generator set can be computed directly from the set of fundamental cycles S using linear algebra. This is illustrated clearly with the following example. If the set of original fundamental cycles S={w, x, y, z}, and cycle separation link r is contained in (x, y, z), then the fundamental cycles of the subpattern is given by {w, x+y, x+z}. Note that y+z=(x+y)+(x+z) mod 2.

FIG. 32B is an exemplary alternative method 3200' for generating a subpattern lattice from a seed pattern. Basically, subgraphs (lattice nodes) of a given query graph (seed pattern) are generated by removing relationship links and/or entity nodes. These subgraphs (lattice nodes) are then added as nodes to the subpattern lattice. In the method 3200', to minimize the complexity of the subpattern lattice, a user specified or tunable set can be used to specify one (1) or more "atomic" subgraphs—that is, subgraphs not to be broken into smaller subgraphs. Further, a user specified or tunable set can be used to specify "must-be-kept" subgraphs—that is, subgraphs which must be kept by all subgraphs generated. (Note that the notion of atomic subgraphs and must-be-kept subgraphs can be used with the method 3200 of FIG. 32A as well.)

Referring now to FIG. 32B, as shown in step 3210, the seed pattern is accepted. As shown in step 3212, the number in levels in the subpattern lattice to be generated may also be accepted (or may be a tunable, predetermined, parameter). A set of "atomic" subgraphs, described above, may be accepted in step 3214, and a set of "must-be-kept" subgraphs, as described above, may be accepted in step 3216. As shown in step 3218, the seed pattern defines the first level, or root, of the subpattern lattice.

Steps 3250 and 3274 define a loop through each level of the subpattern lattice to be built. Within the loop 3250–3274, steps 3252 and 3272 define a loop through each subgraph (lattice node) in a current level. Note that the level of the subpattern lattice defines the number of entity nodes in the pattern defining the lattice node. Within the loop 3252–3272, at decision step 3254, it is determined whether or not the subgraph (lattice node) is a tree. This determination may be made using any of a number of known algorithms for checking for cycles. For example, this determination may be made by ignoring the directions in the graph, letting N be the number of nodes, at each node, advancing no more than n links out, in all directions, and determining if any nodes are revisited. If so, an entity node is removed as shown in step 3266 and, as shown in decision step 3268, it is determined whether or not the resulting subgraph (a candidate lattice node for the next level) is valid (that is, legal). If not, (which indicates that the candidate lattice node for the next level will not be added to the subpattern cone) the loop 3252–3272 continues to the next subgraph (lattice node of the current level) as shown in step 3272. If, on the other hand, the resulting subgraph (candidate lattice node for the next level) is valid, processing continues to decision node 3258. Returning to decision node 3254, if the subgraph (lattice node) is not a tree, then a relationship link is removed as shown in step 3256 and processing continues to decision step 3258.

At decision step 3258, it is determined whether the resulting subgraph (after removing the relationship link or entity node, leaving a candidate lattice node for the next level) is connected or not. If not (which indicates that the candidate lattice node for the next level will not be added to the subpattern cone), processing continues to step 3272. If, on the other hand, the resulting subgraph is connected, the subgraph, which is a candidate lattice node for the next level, will be added to the subpattern lattice. More specifically, the subgraph (lattice node) is connected to the present parent lattice node (that is, the subgraph before the entity node or relationship link was removed) as shown in step 3260 and the subgraph lattice node is added to the next level of the subpattern lattice. Processing then continues to step 3272.

At step 3272, once all subgraphs (lattice nodes) of a current level are processed, the next level of the lattice is processed as shown in step 3274. Levels are processed until either (a) the number of levels accepted in step 3212 have been generated, or (b) there are no lattice nodes in the next level. The process 3200' is then left via return node 3276.

Having described exemplary methods for building useful lattice structures, data storage and retrieval utilities which may use such lattice structures are now described in §4.2.7 below.

§4.2.7 Utilities Using Pattern Lattice

The utilities disclosed below use either the superpattern or subpattern lattices as building blocks. These lattices are, in a sense, natural neighborhoods of patterns and are therefore ways of looking for nearby or similar patterns. With a notion of neighborhood and pattern distance, a variety of methods may be employed to aggregate data. Since patterns are (tautologically) self-descriptive, patterns representing clusters of data provide a classification. An exemplary diagram illustrating the way in which each of the utilities use subpattern or superpattern lattices will be introduced in each section. Referring to FIG. 48, in these examples, it will be assumed that the four (4) graphs (GP1–GP4) shown in FIG. 48 correspond to four (4) pieces of data, such as usage logs .

§4.2.7.1 Classifier (and Clusterer)

§4.2.7.1.1 Features of the Exemplary Classification Methods

Features of the exemplary classification methods, disclosed below, are discussed in this section.

First, by using the pattern lattice as a foundation for analysis, semantic labels for classification categories are automatically produced from semantic data. These labels are semantic graphs, so for human comprehensibility, they need to be converted from graph form to natural language. An exemplary method for performing this conversion is disclosed in §4.2.7.4 below.

Second, since superpattern lattice is used by the classification method, a natural hierarchical structure is imposed on the classification scheme.

Third, the classification process can be lazy; that is, classification can be expanded as needed.

Finally, the classification methods disclosed below do not require exclusivity of membership in categories (though can be forced to if desired). That is, an element may be classified multiple ways. This is particularly interesting when used in settings in which people also do not prefer strict classification memberships.

§4.2.7.1.2 Overview of Classification Using a Superpattern Lattice Structure

The basic way in which superpattern lattice structures may be used for classification is schematically shown in FIG. 34. The classification process accepts a seed pattern (or patterns) P 3410 (for example, the simple graph P="Italian") and a request for a fixed number k of categories (for example, k=five). Note that there are many ways known in to those skilled in the art to automatically select an "optimal" number of categories. However, for simplicity, it is assumed here that this number is given.

The superpattern cone $C_{Super}(N)$ (or more generally, a superpattern lattice) out of the node N=N(P) is then computed to a given depth. Statistics from the data are then placed over this lattice. Such statistics could include the frequency of each pattern as a subpattern somewhere in the data set. Alternatively, the statistics could simply be a histogram of actual (complete) data patterns. In FIG. 34, the seed pattern N 3410 is at the vertex of the lattice. Lattice points GD 3420 represent graph data lattice nodes. For example, these graph data lattice nodes may represent entries in a log file. The classification problem then becomes one of finding k superpattern lattices Mi which are subsets of the superpattern cone N (that is, $C_{Super}(M_i) \subseteq C_{Super}(N)$) and that cover all (or, depending on the application, most) of the superpattern lattice nodes within $C_{Super}(N)$ that occur in the data. As mentioned earlier, these cones need not be disjoint, though that certainly can be placed as a search constraint. In FIG. 34, three (3) superpattern lattices are depicted with thick lines and define cones covering the data points 3420. The superpattern lattices $M_i$ are defined by lattice nodes 3430 at the vertex of each of the three (3) cones.

By construction, the lattice nodes $M_i$ 3430 which define the superpattern lattice($M_i$) are lower bounds for the data patterns contained by the superpattern lattices that they define. In fact, the lattice nodes $M_i$ 3430 are more specific lower bounds than the lattice node N 3410. (Recall that lower bounds are more general than the set in which they are contained. The lower bounds are represented in FIG. 34 as upper vertices.) Each vertex node $M_i$ 3430 can be used as a semantic label, or representative, for all patterns contained in its superpattern lattice (Mi). Thus, for example, with the number of categories k=3, a classification under the seed pattern "Italian" may have come back as {"Italian movies", "Italian food", "Italian travel location"} if these patterns covered all a user's log data involving the semantic label "Italian."

If there is interest in sub-classifying data under a particular cone, this process may be iterated with the new seed pattern being the vertex of its "cone". One could, for example, "drill down" (or sub-classify) under "Italian food" to discover sub-classifications of {"Italian food on the East Side", "Italian food with cost=$$$$", and "Italian food that is family friendly"}.

FIG. 49 illustrates a classification of the graph patterns of FIG. 48, assuming a given seed pattern as simply an entity node A, and a number of classes given as two (2). As shown, as superpattern lattice 4900 is built by extending the pattern with embeddings of the data patterns. Note that the bracketed numbers in FIG. 49 correspond to the graph patterns that are superpatterns of the pattern corresponding to the lattice node. Thus, for example, the graph patterns GP1, GP2, gP3, and GP4 are superpatterns of the pattern corresponding to the lattice node 4910. In the next layer 4920 of the superpattern lattice 4900, the pattern of lattice node 4910 is extended (Recall FIGS. 23 and 24.). As shown by the bracket numbers, the graph patterns GP1, GP2, and GP3 are superpatterns of (or the same as) the pattern corresponding to lattice node 4922, the graph patterns GP3 and GP4 are superpatterns of the pattern corresponding to lattice node 4924, and the graph pattern GP4 is a superpattern of the pattern corresponding to lattice node 4926. The lattice node 4926 is subject to horizontal trimming since its sibling lattice node 4924 has links to all parents, which are embeddings of a data graph pattern of lattice node 4926. In the next layer 4930 of the superpattern lattice 4900, the patterns of the lattice nodes in layer 4920 are extended. Now, all of the graph data may be covered. Two (2) cones, defined by lattice node 4922 and 4932 cover all four (4) data graph patterns.

To summarize, autoclassification over a seed pattern may be performed as shown in the flow diagram of FIG. 35. First, as shown in steps 3510 and 3520, a seed pattern P and a number of categories k are accepted. (Recall that alternatively, a number of categories or an optimal number of categories may be determined using techniques known to those skilled in the art.) Next, as shown in 3530, the data is preprocessed (or, alternatively, preprocessed data is accepted). Then, as shown in. step 3540, a superpattern cone is built over the seed pattern P to a specified depth. Lattice-trimming techniques may be used as discussed in §4.2.6.2 above. If so, a more general superpattern lattice would be built. Finally, as shown in step 3550, nodes of the superpattern lattice are merged using an aggregation criterion, such as agglomerative clustering for example. This information is used to select which nodes are merged during clustering. As described in more detail below, the aggregation step 3550 may use an evaluation function to determine when to stop the merging process or to select an "optimal" classification across a choice of given classification. The art of this procedure is a careful balancing of precise versus broad coverage for the lattice. Certainly, the original pattern N is a label for all data in the original lattice. However, no new information is gained by using it. On the other hand, overly specific classifications can be a problem when too many narrowly targeted cluster centers are chosen. Therefore, it is important to provide some heuristic success measures for goodness of fit and coverage.

FIG. 36 is a flow diagram of an exemplary heuristic evaluation method 3550' that requires a user (or user interface) to provide a guideline for a minimal and a maximal number of clusters acceptable. The method then determines an "optimal" number of classifications within these bounds. The method 3550' of FIG. 36 is an example of an agglomerative clustering technique that greedily covers as many lattice nodes corresponding to data graph patterns as possible. The aggregation "distance" for two (2) lattice nodes is basically determined by taking the greatest lower bound of the two (2) nodes and counting how many lattice nodes that correspond to data graph patterns it covers. Clearly, this method could be applied to other statistics, such as pattern density, within the data sets.

The following is pseudo code of the method 3550' shown in FIG. 36. In the following, it is assumed that a region of the pattern lattice, say a superpattern cone $C_{Super}(N)$, has already been constructed. The term [min, max] denotes the desired range of numbers of categories to be chosen. As shown in FIG. 37, the data structure "Classification List" 3700 will be an array of records 3710, each of the records having an index [0, max−min] 3712 and a list (or set) 3714 of category patterns 3430. The number of category patterns 3430 in each list 3714 will range from min to max. The pseudo code is:

```
{
Initialize CandidateClassificationList with all lattice
nodes without children in the cone.
n ← # CandidateClassificationList.
While (n ≥ min),
    If n ≤ max, let ClassificationList [n -min] =
CandidateClassificationList.
    If n = min, then exit while loop.
    Loop through all pairs of nodes in
CandidateClassificationList
        Compute pair-wise greatest lower bounds {M_i}
        Among the {M_i} chose the node M whose children cover
        the most number of data nodes in C_Super(N).
        // Greedy step
    Delete children nodes of N in
CandidateClassificationList.
    Add node M to CandidateClassificationList    //
Agglomeration step
        n ← # CandidateClassificationList
}
```

Referring now to FIG. 36, the min and max number of classes is accepted as shown in step 3605. Next, as shown in step 3610, a set named "candidate classification list" (or "CCL") is populated with all lattice nodes without children in the superpattern cone $C_{super}(P)$ (or superpattern lattice). That is, the node which define the base (as opposed to the vertex 3410) of the superpattern cone $C_{super}(P)$ (or superpattern lattice) are placed in the set CCL. Then, as shown in step 3615, a variable n is set to the number of lattice nodes in the CCL set (that is, n=#CCL).

Steps 3620 and 3675 define a loop of steps to be executed while n is greater than or equal to min. Within the loop 3620–3675, decision step 3625 determines whether or not n is less than or equal to max. If so, the category pattern list set 3714 corresponding to classification list index (n−min) is populated with the patterns (or nodes of the candidate classification list (or "CCL") set) and processing continues to decision step 3635. Returning to decision step 3625, if n is greater than max, processing continues directly to decision step 3635.

Decision step 3635 determines whether or not n equals min. If so, the while loop 3620–3675 is exited and the process 3550' is left via return node 3680. If, on the other hand, n does not equal min, processing continues to step 3640, which, along with step 3650, defines a loop through all pairs of lattice nodes in the candidate class list (CCL) set. Within the loop 3640–3650, for each of the pairs of lattice nodes in the candidate class list (CCL) set, a greatest lower bounds is determined. Referring to FIG. 34, the greatest lower bounds of two (2) lattice nodes is the is the most specific pattern $M_i$ (that is, the highest node in FIG. 34) that defines a superpattern cone $C_{super}(M_i)$ that contains both lattice nodes of the pair. Thus, the loop 3640–3650 generates a set of greatest lower bounds, each of which corresponds to a pair of nodes in the candidate class list (CCL) set.

Next, as shown in step 3655, among the set of all lower bounds $M_i$ generated in the loop 3640–3650, the (lower bound) lattice node N whose children (at any (predeterminable) number of levels down) cover the greatest number of nodes in the superpattern cone $C_{super}(P)$ (or superpattern lattice) 3490 is chosen. Next, as shown in step 3660, any children lattice nodes of lattice node N, that are in the candidate classification list (CCL) set are deleted. In step 3665, the lattice node N is added to the candidate classification list (CCL) set. Thus, steps 3660 and 3665 basically serve to replace children of the lattice node N with the lattice node N in the candidate classification list (CCL) set. Accordingly, the number of lattice nodes in the candidate classification list CCL are reduced. In step 3670, the variable n is set to the new number of lattice nodes in the candidate classification list (CCL) set. At step 3675 of the while loop 3620–3675, if n is greater than or equal to min, the loop continues. Otherwise, the loop is exited and the process 3550' is left via return node 3680.

Referring to FIG. 37, basically, the process 3550' of FIG. 36 populates sets of category patterns with a number between min and max of lattice nodes which serve as classifiers M 3430. Thus, if min is 3 and max is 7, 5 (=max−min+1), sets of lattice nodes, indexed 0, 1, 2, 3, 4, would be generated. It would be useful to determine which of these category pattern sets contains the most useful lattice nodes which serve as classifiers 3430. There are a variety of techniques available to evaluate the different clustering arrangements in the Classification List array 3700. FIG. 38 is a flow diagram of an exemplary method 3800 for evaluating classification patterns. There are many other possible ways to value and evaluate classification patterns.

Referring to FIG. 38, as shown in step 3805, the classification list sets 3714 are accepted. Steps 3810 and 3845 define a loop through all n greater than or equal to 0 and less than or equal to (max−min). (Recall classification indexes 3712. The loop could actually go from n=min to max). Within the loop 3810–3845, a nested loop defined by steps 3815 and 3835 loops through all i nodes $M_i$ in the $n^{th}$ category pattern list. Within the loop 3815–3835, as shown in step 3820, $S_i(n)$ is defined as the number of lattice nodes in an intersection of the superpattern cone 3490 $C_{Super}(P)$ (or superpattern lattice) defined by the lattice node P 3410 and the subpattern cone (or lattice) defined by the $i^{th}$ lattice node of the $n^{th}$ category pattern list 3714 $C_{Sub}(M_i(n))$. Still within the loop 3815–3835, $D_i(n)$ is defined as the number of data nodes in the intersection of superpattern cone 3490 $C_{Super}(P)$ (or lattice) defined by the node P 3410 and the superpattern cone $C_{Super}(M_i(n))$ (or lattice) defined by the $i^{th}$ node of the $n^{th}$ category pattern list. Still within the loop 3815–3835, $H_i(n)$ is defined as the average path length from the $i^{th}$ lattice node of the $n^{th}$ category pattern list $M_i(n)$ to data nodes in the intersection of superpattern cone 3490 $C_{Super}(P)$ (or lattice) defined by the lattice node P 3410 and the superpattern cone $C_{Super}(M_i(n))$ (or lattice) defined by the $i^{th}$ lattice node of the $n^{th}$ category pattern list. Path length means the minimum number of lattice links traversed to get from one (1) lattice node to another. Outside of the loop 3815–3835 (or alternatively, summed within the loop), as shown in step 3840 a Weight(n) is defined as the sum, over all i, of $(\log(S_i(n))+\log(D_i(n)))$ divided by $H_i(n)$. Once all of the n category pattern lists 3714 are processed and loop 3810–3845 is exited, as shown in step 3850, the category pattern list 3714 associated with the classification list index n 3712 having the largest weight is chosen.

Basically, the exemplary method 3800 for evaluating clusters attempts to find a balance between broad coverage (S gets small and D and H get big) and precise coverage (S gets big and D and H get small). A penalty is levied for finding classification nodes that are too far in path length from classified data nodes. Note that this evaluation method 3800 does not consider the size of overlaps.

In the foregoing, classification using a seed pattern P 3410 was described. However, it might not be desirable to start the classification process from a seed pattern In some situations. In such situations, the data may be preprocessed to determine a set of seed patterns from which to grow superpattern cones (or lattices). To accomplish such "seedless" classification, the autoclassification method 3500 may be modified. Assume D denotes the relevant data set. This data set D may be preprocessed as described in §4.2.5.1 above. (Recall step 3530 of FIG. 35.) Next, entities (and instances if desired) of the data set D may be histogrammed. For example, if the data is a usage log, entities of the data set D may be provided with a number of times that they were used, or a frequency of use. Thereafter, top ranking entities $\{E_i\}$ are selected. However, the data sets containing these entities should show variation. For example, if all data graphs are exactly A→B, then choosing A or B does not make any difference. As another example, if the data is {A→B, A→B→C, A→B, A→B, D→E, D→E}, with the entity histogram therefore being A=4, B=4, C=1, D=2, E=2, choosing {A,B} will only provide the "A→B" cluster, while choosing {A,D} will provide the "A→B" and "D→E" clusters. Thus, merely choosing nodes most frequently used does not always provide the best solution. A better approach might be to (i) chose the most frequently used entity, (ii) eliminate all data containing the chosen entity, (iii) redetermine frequency of use histograms based on the reduced data set, and (iv) repeat steps (i) through (iii). By using this latter approach, data sets containing the chosen entities will show more variation. Redundancy of the superpattern cones emanating from each of these entities is minimized. For example, in the foregoing example, a superpattern cone with seed A has "A→B" as the next pattern. Therefore, B is not chosen. Then a union of superpattern cones (or lattices) over each of the entities of the set of entities $\{E_i\}$ is determined, level by level, across all cones (or lattices) to a specified depth. The union of the superpattern cones (or lattices) may be trimmed as discussed in §4.2.5.2 above. These lattice nodes may then merged using an aggregation criterion, such as the agglomerative clustering process 3550' described above with reference to FIG. 36. This information is used to select which nodes are merged during clustering. Finally, an evaluation function is used to determine when to stop the merging process or to select an "optimal" classification across a choice of given classification, such as the cluster evaluation process 3800 described above with reference to FIG. 38.

There are some instances in which it may be desirable to autoclassify data already arranged within a hierarchy. For example, in the Outlook™ e-mail management software (from Microsoft Corporation of Redmond, Wash.) "data" includes a user defined folder hierarchy and contents in each folder. For each email message in the "inbox" of the Outlook™ software, it would be useful to accurately predict a set of folders that are the most likely target(s) when a message is being "moved to" a folder. Less subtle than recommending the exact folder to which a message may be ultimately filed is the challenge of recommending a position of the folder hierarchy. In this case, recommendation predictions may be amortized across a number of child folders.

Note that there are instances when the same e-mail message should be filed in multiple folders. As mentioned earlier, the classification techniques do not enforce exclusive categorization. Furthermore, a good "garbage" or rejection model would be useful for determining when new folders should be created.

The problem of recommending a folder (or creating a folder) in which to file data can therefore be stated as: given data and a folder hierarchy over the data, predict the folders that a new item of data should belong to, or predict whether a new folder should be created. If a new folder is to be created, suggest the appropriate folder label and the placement of the folder in the hierarchy. FIG. 39 is a flow diagram of an exemplary method 3900 for solving this problem.

Referring to FIG. 39, first, as shown in step 3910, a data and folder hierarchy over the data is accepted. Next, as shown in step 3920, a set of labels, determined through autoclassification (without a seed pattern), is associated with each folder. These labels are based on the contents of the folder. (An exemplary method 3920' for performing this step will be disclosed later with reference to FIG. 40.) This process may need to be refined if there is too high a degree of label overlap across folders. Next, as shown in step 3930, a new data item (e.g., a new message) is accepted and the "closet" existing folders are determined (for example, by finding the biggest common subpattern between the data item and the folder labels). Then, as shown in decision step 3940, it is determined whether or not the message is close enough to any of the existing folders. That is, it is determined whether or not the common subpattern is big enough. If so, the process 3900 is left via return node 3970. If, on the other hand, the message is not close enough to any of the existing folders, a new folder to be created in the folder hierarchy is predicted as shown in step 3950 and a semantic label revealing the distinguishing characteristic is attached to the new folder in step 3960. This distinguishing characteristic is determined by the difference of the common subpattern and the current, near-by labels. The process 3900 is then left via RETURN node 3970.

Recall that in step 3920, a set of labels was associated with each folder based on the folder's contents. FIG. 40 is a flow diagram of an exemplary method 3920 for performing this step. First, as shown in step 4005, the data is preprocessed (Recall §4.2.5.1 above) or, alternatively, preprocessed data is accepted. Next, as shown in step 4010, a set of bottom folders is defined to be folders without children folders. Then, as shown in step 4015, the folder hierarchy is modified to add new child folders under non-bottom folders to contain all non-filed messages (messages not filed in existing child folders). This modification forces folders to contain only folders or only messages.

Next, "distinct" folders are found. More specifically, steps 4020 and 4030 define a loop through every bottom folder. Within this loop 4020–4030, step 4025 finds a small number (e.g., less than 3) of distinct classification categories in each folder via the auto classification method described above with reference to FIG. 35. Steps 4035 and 4050 define a loop through all pairs of classification categories. Within this loop 4035–4050, it is determined whether or not any two (2) of the classification categories are the same. If so, the classifications are refined, if possible as shown in step 4045. If refinement is not possible then the associated sets of folders are merged. In either case, the loop 4035–4050 continues at step 4050. Returning to decision step 4040, if no two (2) of the classification categories are the same, the loop 4035–4050 continues at step 4050. At step 4050, after all pairs of classification categories are processed, processing continues to step 4055.

Basically, step 4055 creates a decision tree over the clusters for easy evaluation. More specifically, over the modified folder hierarchy, labels for parent folders are defined to be a greatest lower bound of its children's label patterns. A decision tree is then used to file the new message.

§4.2.7.2 Search (Find Similar Data)

In the discussion of classification utilities in §4.2.7.1 above, superpattern cones (or lattices) were useful for aggregating data. However, there may be instances in which no data graph lattice nodes containing a seed pattern exist. In such instances it may be useful to modify the pattern so that it is more, but not too, general. Subpattern cones (or lattices), introduced in §4.2.6.3 above, may be used to generalize a pattern. Subpattern cones (or lattices) may be expanded until nodes that are contained as subpatterns in the data are reached.

For example, referring to FIG. 50, a query graph pattern QGP is not a subpattern of any of the graph patterns GP1–GP4 of FIG. 48. To generalize the query graph pattern QGP, it is used as a seed pattern 5010 in a subpattern lattice. (Recall, e.g., FIG. 29.) Referring to both the method of FIG. 32B and FIG. 49, since the query graph pattern QGP is a tree, an entity node (e.g., B, D, or Z) is removed. However, since the resulting graph is not legal, (that is, a relationship link has no destination), the illegal relationship link is removed. The lattice nodes 5022, 5024, and 5026 result. However, none of the graphs associated with these lattice nodes are subpatterns of the graph patterns QP1–QP4. Thus, the subpattern lattice 5000 is built further. In the next level 5030, the lattice node 5032 is associated with a pattern that is a subpattern (or the same as) data graph patterns GP1, GP2, and GP3, and the lattice node 5034 is associated with a pattern that is a subpattern of data graph pattern GP4. Thus, the patterns related to lattice nodes 5032 and 5034 show a similarity between the query graph pattern QGP 4910 and the data.

There are many possible notions of similarity, or good generalization, to a pattern. A few are introduced here. A notion of similarity between two (2) patterns, suitable for the pattern lattice and subpattern cones (or lattices) in particular, is the lattice distance between two (2) lattice nodes corresponding to the two (2) patterns. A subpattern that is closer to a pattern than another subpattern is considered to be more similar. This distance notion of similarity reflects a notion of topological similarity. For example, referring to FIG. 41, considering topological similarity, graphs P1 and P2 are closer than graphs P1 and P3. In contrast, a "topologically uninformed" histogram comparison of entity and link types would indicate that graphs P1 and P3 are identical.

Statistics from the data can be used to adjust the distance metric or weigh the importance of certain lattice nodes differentially than others. Lattice nodes that represent common subpatterns could be considered more relevant for representation back to an application. Conversely, obscure patterns can be thought of as more "interesting" and be selected in a first wave of nearest subpatterns. User feedback, when possible, may be the best metric as to what constitutes semantic similarity.

FIG. 42 is a schematic of the subpattern cone (or lattice) 4200 constructed from a root lattice node 4210. The subpattern cone 4200 is continued until it reaches lattice nodes that represent patterns that either are subpatterns of data or the data patterns themselves. The lattice nodes may be ranked by a similarity metric such as the ones alluded to above and a set of "similar" nodes are selected.

As mentioned in §4.2.6.3 above, there are many issues of scale associated with building subpattern cones (or lattices).

The optimizations, particularly those involving separation links, are aggressive means for reducing the number of comparisons required to compare whether candidate children are isomorphic as graphs. However, even such optimizations might not be sufficient when the data is represented as star graphs or connected star graphs. (Recall Table I of §4.2.5 above.) In such cases, aggressive preprocessing and virtualization is useful. For example, the seed pattern 4210 itself is a good candidate for virtualization and trimming. Any reduction of its complexity has combinatorial ramifications relevant to constructing subpattern cones. An interesting data reduction step is to first classify all data with a set of semantic labels. Subpattern cones (or lattices) can then be built against this representative set. For example, referring to FIG. 52, given the seed pattern GD, if semantic labels SL1 and SL2 are used, then the seed pattern can be represented by the graph GD'.

FIGS. 43A and 43B are alternative exemplary methods for finding similar data to a query (represented as a seed pattern). In short, find similar is performed as follows. Referring first to the method 4300 of FIG. 43A, as shown in step 4310, the data is preprocessed (or, alternatively, preprocessed data is accepted). The seed pattern is accepted as shown in step 4320 and may be preprocessed to reduce complexity as shown in step 4330. As shown in step 4340, a depth of a subpattern cone (or lattice) and/or number of data nodes to be reached in the subpattern cone (or lattice) are accepted. Then, as shown in step 4350, the subpattern cone (or lattice) is generated to the given depth or until the number of data nodes have been reached. (Recall the exemplary methods for building a subpattern cone (or lattice) described in §4.2.6.3 above with reference to FIGS. 32A and 32B.) Finally, as shown in step 4360, an evaluation function may be used to provide data nodes in the subpattern cone (or lattice) with a similarity ranking. An exemplary method for performing this step is described below. The method 4300 is left via return node 4370.

FIG. 43B is an alternative exemplary method 4300' for finding data similar to that of a seed pattern (also referred to as a query graph). In this exemplary method 4300', the seed pattern query graph is factored. More specifically, the method 4300' recognizes that in many instances, the size of the query graph seed pattern is relatively large, even after preprocessing (such as virtualization, removing instance values, etc.). Recall that the size of the seed pattern query graph has combinatorial ramifications on a subpattern cone (or lattice) built from it. Factoring splits a graph into disconnected components. For example, suppose that deleting a link from a graph G splits it into two (2) disconnected components, G1 and G2. Then every connected sub-graph of G is a union of a connected sub-graph of G1 and a connected sub-graph of G2. (Note that one the sub-graphs can be empty. That is, the connected sub-graph of G might be found as a sub-graph of either G1 or G2 only in some instances.) Recognizing the foregoing, note that rather than building a subpattern lattice for a graph G, a number of smaller subpattern lattices can be built for lattices G1 and G2. The elements of the subpattern lattice for the graph G will be represented by pairs of elements from subpatterns G1 and G2. This saves both processing time and memory. (Recall Table 1 above.) A graph may be factored by cutting links to break the graph G into pieces of smaller sizes Gi. The elements of the subpattern lattice for the graph G will be represented by n-tuples (for example, $A_1 \rightarrow A_2$ is a 2-tuple, $A_1 \rightarrow A_2 \rightarrow A_3$ is a 3-tuple, $A_1 \rightarrow A_2 \rightarrow \ldots \rightarrow A_n$ is an n-tuple, etc.) of elements from the subpattern lattices for the graphs Gi.

Referring now to FIG. 43B, as shown in step 4310, data is preprocessed (or, alternatively, preprocessed data is accepted). As shown in step 4340, the depth or number of data nodes to be reached when generating a subpattern lattice is accepted. As shown in step 4320, the seed pattern (or query graph) is accepted. Then, at decision step 4372, it is determined whether the seed pattern (query graph) is relatively small. For example, the number of entity nodes, or relationship links, or some function of both entity nodes and relationship links can be compared to a predetermined "smallness" threshold. If the seed pattern (query graph) is relatively small, processing continues as was the case in the method 4300 of FIG. 43A. That is, a subpattern lattice is generated to the depth of until the number of data nodes is reached as shown in step 4350, an evaluation function is applied to rank data graph lattice nodes as shown in 4360, and the process 4300' is left via return node 4392. Returning to decision step 4372, if the seed pattern (query graph) is not relatively small, then processing continues to step 4374 where the seed pattern (query graph) G is factored into a number of subgraphs Gi, where i=1 to the number of subgraphs. (Factoring can be applied iteratively until all subgraphs are relatively small.) For example, a graph may be factored such that the nodes of the graph are ranked according to their degrees. Assuming that $d_1$, $d_2$ are the top two degrees, if $d_1$ and $d_2$ are big enough (that is, greater than a predetermined threshold), the graph is factored. These steps may be done recursively until the graph(s) can no longer be factored. These steps are illustrated in FIG. 53 in which the graph GD is factored into graphs FGD1 and FGD2. Steps 4376 and 4388 define a loop through each of the subgraphs Gi of the factored seed pattern (query graph) G. Within the loop 4376–4388, for a given subgraph Gi, a subpattern lattice is generated to the depth or until the number of data graph lattice nodes is reached as shown in step 4378. (Note that the number of data graph lattice nodes may be adjusted, for example by dividing the accepted number of data nodes to be reached by the number of subgraphs Gi.) The subpattern lattice is then searched for lattice nodes corresponding to data graphs as shown in step 4380. Then, as shown in step 4384, the found data graphs are sorted by peaks (that is, the maximal common patterns between the seed pattern and the data graph). Note that the maximal common patterns are not unique, in general . . . [Next, as shown in step 4386, an evaluation function is used to rank data graph lattice nodes (by category). An exemplary evaluation function is described latter. The loop 4376–4388 continues until all of the subgraphs Gi of the seed pattern query graph G have been processed. Then, as shown in step 4390, the data graph lattice nodes are globally ranked, and the method 4300' is left via return node 4392.

In step 4360 of FIG. 43A and in steps 4360 and 4386 of FIG. 43b, the data graph lattice nodes where evaluated to rank their similarity to the seed pattern query graph (or a subgraph thereof). FIG. 44 is a flow diagram of an exemplary method 4400 for performing such an evaluation and ranking. Basically, ranking involves two (2) steps performed for each graph. Initially, the seed pattern is accepted, as shown in step 4410. Then, the following two (2) steps are performed for each data graph, as defined by loop 4420–4450. First, the maximal common pattern(s) of the seed pattern and the data graph are found as shown in step 4430. Then, a heuristic is used to rank all data graphs by the associated maximal common patterns as shown in step 4440. If all of the data graphs have been ranked, the method 4400 is left via RETURN node 4460. Basically, a data graph DG1 is more similar to a given graph pattern G than a data graph DG2 is, if the .subgraphs of graph G that data graph DG1 contains include the subgraphs of datagraph DG2. This definition partially orders data graphs in their similarity to the graph pattern G. The closest neighborhood of G includes maximal elements of this order. If there are too many maximal elements, the order can be refined, for example, by considering the size of the subgraph and the frequency with which it appears in the data. If the graph G is factored as described above with reference to FIG. 43B, for each log entry, the maximum rank it gets among all peaks in Gi is used as its total rank from Gi. The sum of all the ranks from different Gi's is defined as its global rank. (Recall step 4390 of FIG. 43B. All data graphs may be sorted according to the increasing order of their ranks.

Classification and similarity work well together. After finding a similar pattern, especially one that represents a common subpattern, it is reasonable to turn around and autoclassify the data containing embeddings of this subpattern. This combination of finding similar patterns and classifying may be referred to as "rolling up" the data and "drilling down" into the data. Alternatively, a classification lattice node may be almost, but not exactly, "right" in which case a find similar application may be useful.

Further, the find similar methods may be used with classifications. For example, a simple global similarity ranking may be too coarse to adequately aid navigation through a large data space. Thus, it may be helpful to give a classification of similarity directions along which a user can navigate starting from a given pattern. For a find similar method for the query "find restaurants in Manhattan with a view" may provide similarity directions for "restaurants in Manhattan" and "restaurants with a view". Data along a given direction constitute a class. Class-Direction representative R is a data that contains at least one (1) local maximum. The following heuristic attempts to make the similarity directions "orthogonal" or at least "non-parallel". The score of a data entry E in the class with representative R may be expressed as:

$$\text{SCORE} = \sum_{i, \text{local max } ima\ M\ \text{in } Gi} |\text{rank of } R \text{ in } M - \text{rank of } E \text{ in } M| \cdot (\text{frequency of } M \text{ in data})^{ap}$$

where "ap" is an adjustable parameter. It can be made positive to favor frequent data graphs or negative to favor rare data graphs. Note that for more diverse classifications, the close neighborhood of G may be removed form the data before classification.

§4.2.7.3 Query Completion (Data Linker)

Given an unstructured sequence of keywords, it may be desireable to interpret them. A query completion utility interprets such an unstructured sequence of keywords as a semantic spanning tree on the keywords. To find possible interpretations, only the schema is needed. The interpretation is to be prioritized to data most commonly used in the past.

The query completion utility acts as a classifier for collections of data. More specifically, given input patterns, the query completion utility finds all connected subpatterns in the data graph patterns that contain all of the input patterns. For example, referring to FIG. 51, suppose two (2) input patterns—entity node A by itself and entity node C by itself—were accepted. The data graph patterns GP2, GP3, and GP4 include these patterns (that is, they include entity node A by itself and entity node B by itself). The data graph patterns GP3 and GP4 can be generalized to the subpattern 5110 which still contains both input patterns. The data graph pattern GP2 cannot be generalized to a subpattern that still contains both input patterns. Hence, the patterns 5110 and 5112 are returned. A reverse graph-to-English translation utility may be used to render the patterns 5110 and 5112 as pidgin text or speech.

FIG. 45 is a flow diagram of an exemplary method 228' for effecting the query completion process 228. As shown in steps 4505 and 4510, the data graphs and the seed patterns (also referred to as "query graphs") are accepted. Steps 4515 and 4555 define a loop through each data graph containing at least one (1) of the seed patterns. Within the loop 4515–4555, the following steps are performed. Step 4520 finds an unprocessed relationship link (also referred to as a "parsing link") in the data graph (or remaining data graph). The parsing link defines separate graph components in the (remaining) data graph. The link is marked as processed in step 4525. In decision step 4530, it is determined whether or not the (remaining) data graph (without the parsing link) has only one component (i.e., whether or not all nodes in the remaining data graph are connected). If so, processing continues to decision step 4535. Decision step 4535 determines whether there are any unprocessed relationship links left. If so, processing branches back to step 4520. Otherwise, processing continues to step 4555.

Returning to decision step 4530, if the resulting graph has only one component, processing continues to decision step 4540. At decision step 4540, it is determined whether either of the graph components contain all seed patterns (query graphs). If not, processing continues to step 4555. Otherwise, processing continues to step 4545 where the parsing link and the graph component(s) not containing the seed patterns (query graphs) are removed. Processing then continues to decision step 4550 which determines whether or not any part of the graph remains. If so, processing branches back to step 4520. Otherwise, processing branches to step 4555.

Outside of the loop 4515–4555, step 4560 builds one (1) or more subpattern lattices from the remaining graph(s). finally, the method 228' is left via RETURN node 4565. Thus, only a data graph that contains all of the seed patterns need be considered.

§4.2.7.4 Converting Graph Labels to English Expressions

Recall from FIG. 34 described in §4.2.7.1 above, that a number of lattice nodes 3430 may be used as classification labels for lattice nodes and data nodes 3420 found above them. Recall further that these lattice nodes 3430 may be represented as graphs with entity nodes and relationship links. Without some type of translation, such graphs would not convey much intuitive meaning to casual computer users, and indeed, to most computer users. Thus, it would be useful to translate such graphs into sentences to be rendered as text or speech for example. A general graph-to-English translation method is disclosed which produces an informal, yet intuitively comprehensible, "pidgin English". In general, a translation of a smaller graph will be more intuitively comprehensible than a translation of a larger graph.

FIG. 46 is a flow diagram of an exemplary method 4600 for translating a graph to pidgin English. First, as shown in step 4610, a graph is accepted. Next, as shown in step 4620, the entity nodes of the graph, which have no entering relationship links (that is, are not a destination of a relationship link), are ordered based on the number of exiting relationship links in each. This is one of several ways in which the starting point of the process can be determined. Steps 4630 and 4670 define a loop through the ranked entity nodes, starting with the entity node with the most exiting relationship links but no entering entity links. Within the loop 4630–4670, decision step 4640 determines whether or not all relationship links exiting from the entity node have already been used. If so, the loop 4630–4670 continues. On the other had, if the entity node has at least one (1) exiting relationship link that has not yet been used, a sentence is constructed by going down each relationship link to construct a sentence part. Each of the sentence parts may be separated by a comma for example. If an entity is reached that itself has more than one (1) exiting relationship links, it may be used in a separate sentence. That is, further relationship links of that entity node might not be traversed in that sentence, but rather, might be traversed in a separate sentence later. As the sentence parts are being constructed, any relationship links used are marked accordingly. Next, in optional step 4660, further translation rules may be applied. These may be general rules, or may be application specific. If they are application specific, the rules may be supplied by the application itself. The loop 4630–4670 continues until all entity nodes with at least one (1) exiting relationship link are processed. Then the method 4600 is left via return node 4680.

Recall that optional step 4660 applied further translation rules. Some exemplary translation rules (which relate to the schema of FIGS. 3, 5, and 7), expressed as pseudo code, are listed below:

```
   new rule
//-----------------------------------------------
--
   // (Person) -- WorksIn --> (Organization="MS")
   //           -- HasA    --> (JobTitle="GM")
   // will be replaced by
   // (Person) -- Is A --> (PM at MS)
//-----------------------------------------------
--
   new rule
//-----------------------------------------------
--
   // replace (Doc) -- HasA --> (Name='myDoc')
   //               -- HasA --> (Mimetype='???.xls')
   // with    ('myDoc.xls')
//-----------------------------------------------
--
   new rule
//-----------------------------------------------
--
   // replace (*)--HasA-->(Name='a') by ('a')
   // (*) means any entity
//-----------------------------------------------
--
   new rule
//-----------------------------------------------
--
   // remove "MessageID" and "ThreadId"
//-----------------------------------------------
--
   new rule
//-----------------------------------------------
--
   // (*) -- LocatedAt --> (URL) -- hasA -->
(fileLocation='a')
   //                            -- hasA -->
(AccessType='b')
   // will be replaced by
   // (*) -- at --> ('b:\\a')
//-----------------------------------------------
--
   new rule
//-----------------------------------------------
--
   // (ContactInfo) -- HasA --> (x = "y")
   //               -- HasA --> (z = "w")
```

```
        // is replaced by
        // (x: "y", z: "w")
//------------------------------------------------
--
        new rule
//------------------------------------------------
--
        // (*) -- HasA --> (Sent) -- OccuredAt -->
(TimeStamp)
                //              Deleted
                //              Opened
        // is replaced by
        // (*) --> Was --> (Sent) -- At --> (TimpStamp)
                //              Deleted
                //              Opened
//------------------------------------------------
--
        new rule
//------------------------------------------------
--
        // -- subject --> (Desc = "x") is replaced by --
about --> ("x")
        // -- locatedAt --> (Room = "y") is replaced by --
at --> ("y")
//------------------------------------------------
--
        new rule:
//------------------------------------------------
--
        // (Meeting) -- RequiredAttendee--> ("x1") (with
WHITE degree=1)
                //              -- RequiredAttendee--> ("x2")
(with WHITE
degree=1)
                //              -- ;;;;;;;;;;;;;;;;;
                //              -- RequiredAttendee--> ("xn")
(with WHITE
degree=1)
        // is replaced by
        // (Meeting) -- RequiredAttendee--> ("x1, x2,....,
xn")
//------------------------------------------------
--
        new rule:
//------------------------------------------------
--
        // (Meeting) -- WasAttendedBy--> ("x1") (with WHITE
degree=1)
                //              -- WasAttendedBy--> ("x2") (with
WHITE degree=1)
                //              -- ;;;;;;;;;;;;;;;;;
                //              -- WasAttendedBy--> ("xn") (with
WHITE degree=1)
        // is replaced by
        // (Meeting) -- WasAttendedBy--> ("x1, x2, ...., xn"
)
//------------------------------------------------
--
        new rule:
//------------------------------------------------
--
        // (EmailMessage) -- To--> ("x1") (with WHITE
degree=1)
                //              -- To--> ("x2") (with
WHITE degree=1)
                //              -- ;;;;;;;;;;;;;;;;;
                //              -- To--> ("xn") (with
WHITE degree=1)
        // is replaced by
        // (Meeting) -- To--> ("x1, x2,...., xn")
//------------------------------------------------
--
        new rule:
//------------------------------------------------
--
        //(EmailAddress) -- is a --> (Personal Email
Address='a')
```
```
        //is replaced by
        //(personal email address: 'a')
//------------------------------------------------
--
```

An example of the operation of the exemplary method 4600 is now described with reference to FIG. 8. Entity node 820 has one (1) exiting relationship link (but one entering relationship link), entity node 821 has four (4) exiting relationship links, and entity node 822 has three (3) exiting relationship links (but one entering relationship link). Thus, without applying any of the foregoing rules, the produced sentence(s) would be:

Person has a name=Steve Altschuler, reports to a person has a name=Edward Jung, works in an organization= Microsoft and is associated with a job title=group manager, and has contact information. The contact information has a phone number=936-9154, has a room number=24/1314, and has an email address, which is a personal email address=Stevealt.

Applying the foregoing exemplary rules converts the foregoing expression to:

Steve Altschuler reports to Edward Jung, is a group manager at Microsoft, and has phone number: 936-9154, room number: 24/1314, and personal email address: stevealt.

Note that the foregoing exemplary rules and/or other rules may also, or alternatively, be applied before the method 4600 even orders the entity nodes with no entering relationship links based on the number of exiting relationship links in step 4620.

Naturally, a number of alternative methods and rules could be used. For example, a relatively large graph could be factored so that more shorter sentences, rather than fewer but longer "run on" sentences, are produced. The important aspect is that the semantic labels of the graph can be used to convey meaningful information to the user and that this information may be conveyed textually, or graphically.

What is claimed is:

1. For use in a computing system in which information is represented as graphs, each graph having entity nodes which depict properties or attributes of the information and relationship links which denote relationships among the entity nodes, a method for finding information based on a query, the method comprising:

a) receiving the query;

b) generating a subcone lattice from the query to a selected one of a set depth and a set number of lattice nodes, the subcone lattice having lattice nodes corresponding to graphs and lattice links between lattice nodes corresponding to a graph and a sub-graph of the graph;

c) ranking the lattice nodes generated in the subcone lattice that correspond to graphs matching the graphs representing the information and the lattice nodes generated in the subcone lattice that correspond to graphs which are subgraphs of the graphs representing the information; and d) causing the computing system to output at least one query result based on the ranking.

2. The method of claim 1 wherein the step of generating a subcone lattice from the query includes i) representing the query as a graph having entity nodes and relationship links; and ii) for each link which is an element of the graph representing the query,
   A) legalizing all connected components of the graph representing the query, having the link, and
   B) for each legal connected entity, determining whether or not a pattern lattice node, corresponding to the legal connected entity, is new and if so, adding the pattern lattice node to the subcone and generating a subcone from the added pattern lattice node.

3. The method of claim 2 wherein the step of determining whether or not a pattern lattice node, corresponding to the legal connected entity, is new includes:
   1) hashing the legal connected entity;
   2) hashing the graphs corresponding to existing lattice nodes of the subcone lattice; and
   3) comparing the legal connected entity to the graphs corresponding to existing lattice nodes of the subcone lattice that have the same hash values.

4. The method of claim 1 wherein the step of generating a subcone lattice from the query includes
   i) representing the query as a graph having entity nodes and relationship links; and
   ii) for each separation link which is an element of the graph representing the query,
      A) determining the largest component of the graph, representing the query, having the separation link, and
      B) determining whether or not a pattern lattice node, corresponding to the determined largest component, is new and if so, adding the pattern lattice node to the subcone and generating a subcone from the added pattern lattice node.

5. The method of claim 4 wherein the step of determining whether or not a pattern lattice node, corresponding to the legal connected entity, is new includes:
   1) hashing the legal connected entity;
   2) hashing the graphs corresponding to existing lattice nodes of the subcone lattice; and
   3) comparing the legal connected entity to the graphs corresponding to existing lattice nodes of the subcone lattice that have the same hash values.

6. The method of claim 1 wherein the step of generating a subcone lattice from the query includes
   i) representing the query as a graph having entity nodes and relationship links; and
   ii) for each of the levels of the subgraph
      A) for each subgraph of the graph representing the query, determining whether or not the subgraph is a tree and
         1) if so, removing an entity node from the subgraph and determining whether or not the resulting subgraph is legal, and
         2) if not, removing a relationship link from the subgraph, and
      B) determining whether or not the resulting subgraph is connected and if so,
         1) establishing a lattice link from a lattice node corresponding to the subgraph to a lattice node corresponding to the parent of the subgraph, and
         2) inserting the lattice node corresponding to the subgraph into a next level of the lattice.

7. The method of claim 1 wherein at least one atomic subgraph, which may not be broken into smaller subgraphs, is defined.

8. The method of claim 1 wherein at least one subgraph, which must be kept by any and all subgraphs generated, is defined.

9. The method of claim 1 wherein the step of ranking the information lattice nodes reached, includes
   i) for each graph corresponding to information,
      A) finding a maximal common pattern in the data graph and the graph corresponding to the query, and
      B) ranking the data graph based on the maximal common pattern.

10. The method of claim 1 wherein the step of ranking the information lattice nodes reached, includes determining a lattice distance between the lattice node corresponding to the graph representing the query and each of the information lattice nodes reached.

11. The method of claim 10 wherein the distances are adjusted based on statistics associated with the information.

12. The method of claim 1 wherein the information represented as graphs is user actions.

13. The method of claim 1 wherein the information represented as graphs is user actions related to maintaining an address book.

14. The method of claim 13 wherein the information represented as graphs includes a least one entity node selected from a group of entity nodes consisting of person, name, contact information, organization, job title, telephone number, room number, e-mail address, personal e-mail address, and alias e-mail address.

15. The method of claim 1 wherein the information represented as graphs is user actions related to processing order forms.

16. The method of claim 15 wherein the information represented as graphs includes a least one entity node selected from a group of entity nodes consisting of order, item, requester, approver, order ID and destination.

17. The method of claim 1 wherein the information represented as graphs is user actions related to maintaining a calendar.

18. The method of claim 17 wherein the information represented as graphs includes a least one entity node selected from a group of entity nodes consisting of name, room, meeting, appointment, time stamp, job title, organization, telephone number, and person.

19. The method of claim 1 wherein the information represented as graphs is user actions related to entertainment.

20. The method of claim 19 wherein the information represented as graphs includes a least one entity node selected from a group of entity nodes consisting of restaurant, restaurant rating, cuisine type, restaurant price rating, company, location, neighborhood, name, theater, movie, and movie rating.

21. The method of claim 1 wherein the information represented as graphs is user actions related to computer events.

22. The method of claim 21 wherein the information represented as graphs includes a least one entity node selected from a group of entity nodes consisting of event, deleted, opened, created, saved, sent, from agent, to agent, time stamp, document, entity, name, mime type, URL location, file location, access type, e-mail message, e-mail address, priority status, message ID, thread ID and description.

23. A machine-readable medium storing machine-executable instructions which, when executed by a machine, effect the method of claim 1.

24. In a computing system in which information is represented as graphs, each graph having entity nodes which depict properties or attributes of the information and relationship links which denote relationships among the entity nodes, a method for finding information based on a received query, the method comprising:
a) determining whether or not a graph corresponding to the query is relatively large;
b) if it is determined that the graph corresponding to the query is relatively large, then
  i) factoring the graph corresponding to the query, and
  ii) for each piece of the factored graph,
    A) generating a subcone lattice from the query to a selected one of a set depth and a set number of information lattice nodes, the subcone lattice having lattice nodes corresponding to graphs and lattice links between lattice nodes corresponding to a graph and a sub-graph of the graph,
    B) searching the generated subcone lattice for lattice nodes corresponding to information graphs to generate a list of information lattice nodes related to the graph corresponding to the query,
    C) sorting the list of information lattice nodes into categories, and
    D) ranking the information lattice nodes in each category;
c) ranking the information lattice nodes across all categories; and
d) causing the computing system to output at least one query result based on the ranking.

25. The method of claim 24 wherein the step of generating a subcone lattice from the query includes
i) representing the query as a graph having entity nodes and relationship links; and
ii) for each link which is an element of the graph representing the query,
  A) legalizing all connected components of the graph, representing the query, having the link, and
  B) for each legal connected entity, determining whether or not a pattern lattice node, corresponding to the legal connected entity, is new and if so, adding the pattern lattice node to the subcone and generating a subcone from the added pattern lattice node.

26. The method of claim 25 wherein the step of determining whether or not a pattern lattice node, corresponding to the legal connected entity, is new includes:
1) hashing the legal connected entity;
2) hashing the graphs corresponding to existing lattice nodes of the subcone lattice; and
3) comparing the legal connected entity to the graphs corresponding to existing lattice nodes of the subcone lattice that have the same hash values.

27. The method of claim 24 wherein the step of generating a subcone lattice from the query includes
i) representing the query as a graph having entity nodes and relationship links; and
ii) for each separation link which is an element of the graph representing the query,
  A) determining the largest component of the graph, representing the query, having the separation link, and
  B) determining whether or not a pattern lattice node, corresponding to the determined largest component, is new and if so, adding the pattern lattice node to the subcone and generating a subcone from the added pattern lattice node.

28. The method of claim 27 wherein the step of determining whether or not a pattern lattice node, corresponding to the legal connected entity, is new includes:
1) hashing the legal connected entity;
2) hashing the graphs corresponding to existing lattice nodes of the subcone lattice; and
3) comparing the legal connected entity to the graphs corresponding to existing lattice nodes of the subcone lattice that have the same hash values.

29. The method of claim 24 wherein the step of generating a subcone lattice from the query includes
i) representing the query as a graph having entity nodes and relationship links; and
ii) for each of the levels of the subgraph
  A) for each subgraph of the graph representing the query, determining whether or not the subgraph is a tree and
    1) if so, removing an entity node from the subgraph and determining whether or not the resulting subgraph is legal, and
    2) if not, removing a relationship link from the subgraph, and
  B) determining whether or not the resulting subgraph is connected and if so,
    1) establishing a lattice link from a lattice node corresponding to the subgraph to a lattice node corresponding to the parent of the subgraph, and
    2) inserting the lattice node corresponding to the subgraph into a next level of the lattice.

30. The method of claim 24 wherein at least one atomic subgraph, which may not be broken into smaller subgraphs, is defined.

31. The method of claim 24 wherein at least one subgraph, which must be kept by any and all subgraphs generated, is defined.

32. The method of claim 24 wherein the step of ranking the information lattice nodes reached, includes
i) for each graph corresponding to information,
  A) finding a maximal common pattern in the data graph and the graph corresponding to the query, and
  B) ranking the data graph based on the maximal common pattern.

33. The method of claim 24 wherein the step of ranking the information lattice nodes reached, includes determining a lattice distance between the lattice node corresponding to the graph representing the query and each of the information lattice nodes reached.

34. The method of claim 33 wherein the distances are adjusted based on statistics associated with the information.

35. The method of claim 24 wherein the information represented as graphs is user actions.

36. The method of claim 24 wherein the information represented as graphs is user actions related to maintaining an address book.

37. The method of claim 36 wherein the information represented as graphs includes a least one entity node selected from a group of entity nodes consisting of person, name, contact information, organization, job title, telephone number, room number, e-mail address, personal e-mail address, and alias e-mail address.

38. The method of claim 24 wherein the information represented as graphs is user actions related to processing order forms.

39. The method of claim 38 wherein the information represented as graphs includes a least one entity node selected from a group of entity nodes consisting of order, item, requester, approver, order ID and destination.

40. The method of claim 24 wherein the information represented as graphs is user actions related to maintaining a calendar.

41. The method of claim 40 wherein the information represented as graphs includes a least one entity node selected from a group of entity nodes consisting of name, room, meeting, appointment, time stamp, job title, organization, telephone number, and person.

42. The method of claim 24 wherein the information represented as graphs is user actions related to entertainment.

43. The method of claim 42 wherein the information represented as graphs includes a least one entity node selected from a group of entity nodes consisting of restaurant, restaurant rating, cuisine type, restaurant price rating, company, location, neighborhood, name, theater, movie, and movie rating.

44. The method of claim 24 wherein the information represented as graphs is user actions related to computer events.

45. The method of claim 44 wherein the information represented as graphs includes a least one entity node selected from a group of entity nodes consisting of event, deleted, opened, created, saved, sent, from agent, to agent, time stamp, document, entity, name, mime type, URL location, file location, access type, e-mail message, e-mail address, priority status, message ID, thread ID and description.

46. A machine-readable medium storing machine-executable instructions which, when executed by a machine, effect the method of claim 24.

47. For use in a computing system in which information is represented as graphs, each graph having entity nodes which depict properties or attributes of the information and relationship links which denote relationships among the entity nodes, an apparatus for finding information based on a query, the apparatus comprising:
- a) a lattice generator comprising logic for generating a subcone lattice from the query to a selected one of a set depth and a set number of information lattice nodes, the subcone lattice having lattice nodes corresponding to graphs and lattice links between lattice nodes corresponding to a graph and a sub-graph of the graph; and
- b) a ranker comprising logic that is operatively coupled to the lattice generator and configured to rank the lattice nodes generated in the subcone lattice that correspond to graphs matching the graphs representing the information and the lattice nodes generated in the subcone lattice that correspond to graphs which are subgraphs of the graphs representing the information.

48. For use in a computing system in which information is representable as graphs, each graph having entity nodes which depict properties or attributes of the information and relationship links which denote relationships among the entity nodes, an apparatus for finding information based on a query, the apparatus comprising:
- a) means for determining whether or not a graph corresponding to the query is relatively large;
- b) means for, if it is determined that the graph corresponding to the query is relatively large,
  - i) factoring the graph corresponding to the query, and
  - ii) for each piece of the factored graph,
    - A) generating a subcone lattice from the query to a selected one of a set depth and a set number of information lattice nodes, the subcone lattice having lattice nodes corresponding to graphs and lattice links between lattice nodes corresponding to a graph and a sub-graph of the graph,
    - B) searching the generated subcone lattice for lattice nodes corresponding to information graphs to generate a list of information lattice nodes related to the graph corresponding to the query,
    - C) sorting the list of information lattice nodes into categories, and
    - D) ranking the information lattice nodes in each category;
- c) means for ranking the information lattice nodes across all categories; and
- d) means for storing at least one query result based on the ranking.

* * * * *

UNITED STATES PATENT AND TRADEMARK OFFICE
CERTIFICATE OF CORRECTION

PATENT NO.   : 6,556,983 B1                                       Page 1 of 1
DATED        : April 29, 2003
INVENTOR(S)  : Altschuler et al.

It is certified that error appears in the above-identified patent and that said Letters Patent is hereby corrected as shown below:

Column 19,
Line 2, replace "Lattice" with -- lattice --.

Column 23,
Line 16, replace "co" with -- to --.
Line 17, replace "hew" with -- new --.

Column 30,
Line 49, replace "sec" with -- set --.

Column 47,
Line 10, replace "In" with -- in --.

Signed and Sealed this

First Day of July, 2003

JAMES E. ROGAN
*Director of the United States Patent and Trademark Office*